United States Patent Office 3,054,811
Patented Sept. 18, 1962

3,054,811
RING A UNSATURATED 6,16-DIMETHYL STEROIDS OF THE PREGNANE SERIES
Glen E. Arth, Cranford, N.J., Roger E. Beyler, Carbondale, Ill., and Lewis H. Sarett, Princeton, N.J., assignors to Merck & Co., Inc., Rahway, N.J., a corporation of New Jersey
No Drawing. Filed Sept. 14, 1961, Ser. No. 138,007
2 Claims. (Cl. 260—397.45)

This invention is concerned generally with novel steroid compounds and with processes of preparing the same. More particularly, it relates to novel ring A unsaturated 17α-hydroxy-11-oxygenated-20-keto-steroids of the pregnane series having methyl substituents attached to both the C–6 and C–16 carbon atoms, as for example 6,16-dimethyl - 11 - oxygenated - 1,4 - pregnadiene - 17α,21-diol - 3,20 - dione compounds, 6,16-dimethyl-11-oxygenated-4-pregnene-17α,21-diol-3,20-dione compounds, and to the process of preparing these compounds starting with 16 - methyl - 4 - pregnene - 17α,21 - diol - 3,11,20-trione. These novel ring A unsaturated 6,16-dimethyl-17α-hydroxy-11-oxygenated-20-keto-steroids of the pregnane series possess extremely high anti-inflammatory activity, and are especially effective for the treatment of arthritis and related diseases since they can be administered for their cortisone-like action in extremely low dosage thereby minimizing undesired side effects.

This is a continuation-in-part of application Serial No. 683,923, now Patent No. 3,004,994, filed September 16, 1957.

The novel 6,16-dimethyl-11-oxygenated-1,4-pregnadiene-17α,21-diol-3,20-dione compounds, included in the present invention, may be chemically represented as follows:

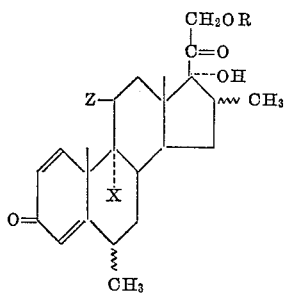

wherein X is hydrogen or halogen, R stands for hydrogen or acyl, and Z is a keto or hydroxy substituent.

These 6,16 - dimethyl-11-oxygenated-1,4-pregnadiene-17α,21-diol-3,20-dione compounds are prepared by reacting 16 - methyl - 4 - pregnene - 17α,21 - diol - 3,11,20-trione, more particularly 16α-methyl-4-pregnene-17α,21-diol - 3,11,20 - trione; 16β - methyl 4 - pregnene - 17α,21-diol-3,11,20-trione; with formaldehyde under acidic conditions to form 17α,20,20,21-bismethylenedioxy-16-methyl-4-pregnene-3,11-dione, more particularly 17α,20,20,21-bismethylenedioxy - 16α - methyl - 4 - pregnene-3,11 - dione; 17α,20,20,21 - bismethylenedioxy - 16β-methyl-4-pregnene-3,11-dione; which is reacted with ethylene glycol in the presence of an acidic catalyst to produce 3 - ethylenedioxy - 17α,20,20,21 - bismethylenedioxy-16-methyl-5-pregnene-11-one, more particularly 3-ethylenedioxy - 17α,20,20,21 - bismethylenedioxy - 16α-methyl - 5 - pregnene - 11 - one; 3 - ethylenedioxy - 17α,20,20,21 - bismethylenedioxy - 16β - methyl - 5 - pregnene-11-one. The latter compound is reacted with perbenzoic acid, perphthalic acid and the like, thereby forming 3 - ethylenedioxy - 17α,20,20,21 - bismethylenedioxy-5,6 - epoxy - 16 - methyl - pregnane - 11 - one, more particularly 3 - ethylenedioxy - 17α,20,20,21 - bismethylenedioxy - 5,6 - epoxy - 16α - methyl - pregnane - 11 - one; 3 - ethylenedioxy - 17α,20,20,21 - bismethylenedioxy - 5,6-epoxy-16β-methyl-pregnane-11-one which is then reacted with formic acid to produce a mixture of 17α,20,20,21-bismethylenedioxy - 16 - methyl - 6 - formyloxy - pregnane-5-ol-3,11-dione, more particularly 17α,20,20,21 - bismethylenedioxy - 16α - methyl - 6 - formyloxy - pregnane - 5 - ol - 3,11 - dione; 17α,20,20,21 - bismethylenedioxy - 16β - methyl - 6 - formyloxy - pregnane - 5 - ol-3,11-dione; and 17α,20,20,21 - bismethylenedioxy - 16-methyl - 5 - formyloxy - pregnane - 6 - ol - 3,11 - dione, more particularly 17α,20,20,21-bismethylenedioxy-16α-methyl - 5 - formyloxy - pregnane - 6 - ol - 3,11 - dione; 17α,20,20,21 - bismethylenedioxy - 16β - methyl - 5-formyloxy-pregnane-6-ol-3,11-dione, which mixture, upon reaction with an aqueous alkali hydroxide solution, is converted to 17α,20,20,21-bismethylenedioxy-16-methyl-allopregnane-3,6,11-trione, more particularly, 17α,20,20,21 - bismethylenedioxy - 16α - methyl - allopregnane-3,6,11 - trione; 17α,20,20,21 - bismethylenedioxy - 16β-methyl-allopregnane-3,6,11-trione. The last-named compound is reacted with butanone dioxolane to produce 3 - ethylenedioxy - 17α,20,20,21 - bismethylenedioxy - 16-methyl-allopregnane-6,11-dione, more particularly 3-ethylenedioxy - 17α,20,20,21 - bismethylenedioxy - 16α-methyl - allopregnane - 6,11 - dione; 3 - ethylenedioxy-17α,20,20,21 - bismethylenedioxy - 16β - methyl - allopregnane-6,11-dione which is reacted with a methyl Grignard reagent to form 3-ethylenedioxy-17α,20,20,21-bismethylenedioxy - 6α,16 - dimethyl - allopregnane - 6β - ol-11-one, more particularly 3-ethylenedioxy-17α,20,20,21-bismethylenedioxy - 6α,16α - dimethyl - allopregnane - 6β-ol - 11 - one; 3 - ethylenedioxy - 17α,20,20,21 - bismethylenedioxy - 6α,16β - dimethyl - allopregnane - 6β - ol - 11-one. This 3-ethylenedioxy-17α,20,20,21-bismethylenedioxy - 6α,16 - dimethyl - allopregnane - 6β - ol - 11 - one, more particularly 3-ethylenedioxy-17α,20,20,21-bismethylenedioxy - 6α,16α - dimethyl - allopregnane - 6β - ol - 11-one; 3 - ethylenedioxy - 17α,20,20,21 - bismethylenedioxy-6α,16β-dimethyl-allopregnane-6β-ol-11-one is reacted with a dehydrating agent such as thionyl chloride in pyridine to form the corresponding 3-ethylenedioxy-17α,20,20,21 - bismethylenedioxy - 6,16 - dimethyl - 5-pregnene-11-one, more particularly 3-ethylenedioxy-17α,20,20,21 - bismethylenedioxy - 6,16α - dimethyl - 5-pregnene - 11 - one; 3 - ethylenedioxy - 17α,20,20,21 - bismethylenedioxy - 6,16β - dimethyl - 5 - pregnene - 11-one, which, upon reaction with p-toluenesulfonic acid monohydrate in acetone is converted to 17α,20,20,21-bismethylenedioxy - 6α,16 - dimethyl - 4 - pregnene - 3,11-dione, more particularly 17α,20,20,21-bismethylenedioxy-6α,16α - dimethyl - 4 - pregnene - 3,11 - dione; 17α,20,20,21 - bismethylenedioxy 6α,16β - dimethyl - 4 - pregnene-3,11-dione; the latter compound is reacted with an aqueous organic acid hydrolyzing agent to form 6α,16-dimethyl - 4 - pregnene - 17α,21 - diol - 3,11,20 - trione, more particularly 6α,16α - dimethyl - 4 - pregnene - 17α,21 - diol - 3,11,20 - trione; 6α,16β-dimethyl 4 - pregnene-17α,21-diol-3,11,20-trione which can be reacted with an acylating agent to form the corresponding 21-acylate. Alternatively, the 3-ethylenedioxy - 17α,20,20,21 - bismethylenedioxy - 6,16 - dimethyl - 5 - pregnene - 11 - one, more particularly 3-ethylenedioxy-17α,20,20,21 - bismethylenedioxy - 6,16α - dimethyl - 5 - pregnene - 11-one; 3 - ethylenedioxy - 17α,20,20,21 - bismethylenedioxy-6,16β-dimethyl-5-pregnene-11-one, above-mentioned, can be reacted with lithium aluminum hydride thereby reducing the 11-keto substituent to an 11β-hydroxy radical to produce 3-ethylenedioxy-17α,20,20,21-bismethylenedioxy - 6,16 - dimethyl - 5 - pregnene - 11β - ol, more particularly 3 - ethylenedioxy 17α,20,20,21 - bismethylenedioxy-6,16α-dimethyl-5-pregnene-11β-ol; 3-ethylenedioxy-17α,20,20,21-bismethylenedioxy-6,16β-dimethyl-5-pregnene-11β-ol which is converted, by reaction with p-toluenesulfonic acid monohydrate in acetone, to 17α,20,20,21-bismethylene-dioxy-6α,16-dimethyl-4-pregnene-11β-ol-3-one, more particularly 17α,20,20,21-bismethylenedioxy-6α,16α-dimethyl-4-pregnene-11β-ol-3-one; 17α,20,20,21-bismethylenedioxy-6α,16β-dimethyl-4-pregnene-11β-ol-3-one; the latter compound is reacted with an aqueous organic acid hydrolyzing agent thereby forming 6α,16-dimethyl-4-pregnene-11β,17α,21-triol-3,20-dione, more particularly 6α,16α-dimethyl-4-pregnene-11β,17α,21-triol-3,20-dione; 6α,16β-dimethyl-4-pregnene-11β,17α,21-triol-3,20-dione which can be reacted with an acylating agent thereby forming the corresponding 21-acylate derivative.

Alternatively, the 3-ethylenedioxy-17α,20,20,21-bismethylenedioxy-5,6-epoxy-16-methyl-pregnane-11-one, more particularly 3-ethylenedioxy-17α,20,20,21-bismethylenedioxy-5,6-epoxy-16α-methyl-pregnane-11-one; 3-ethylenedioxy-17α,20,20,21-bismethylenedioxy-5,6-epoxy-16β-methyl-pregnane-11-one is reacted with methyl magnesium bromide to form 17α,20,20-21-bismethylenedioxy-6β,16-dimethyl-3-ethylenedioxy-allopregnane-5α-ol-11-one; more particularly 17α,20,20,21-bismethylenedioxy-6β,16α-dimethyl-3-ethylenedioxy-allopregnane-5α-ol-11-one; 17α,20,20,21-bismethylenedioxy-6β,16β-dimethyl-3-ethylenedioxy-allopregnane-5α-ol-11-one; which, upon reaction with a dilute aqueous methanolic sulfuric acid solution is converted to 17α,20,20,21-bismethylenedioxy-6β,16-dimethyl-allopregnane-3,11-dione-5α-ol; more particularly 17α,20,20,21-bismethylenedioxy-6β,16α-dimethyl-allopregnane-3,11-dione-5α-ol; 17α,20,20,21-bismethylenedioxy-6β,16β-dimethyl-allopregnane-3,11-dione-5α-ol. The last-named compound, when reacted with dilute methanolic KOH solution (e.g. 0.25%) under reflux for approximately one-half hour, is converted to 17α,20,20,21-bismethylenedioxy-6β,16-dimethyl-4-pregnene-3,11-dione; more particularly 17α,20,20,21-bismethylenedioxy-6β,16α-dimethyl-4-pregnene-3,11-dione; 17α,20,20,21-bismethylenedioxy-6β,16β-dimethyl-4-pregnene-3,11-dione; the latter compound is reacted with an aqueous organic acid hydrolyzing agent (in accordance with the procedures set forth hereinabove in connection with the treatment of 17α,20,20,21-bismethylenedioxy-6α,16-dimethyl-4-pregnene-3,11-dione) to form 6β,16-dimethyl-4-pregnene-17α,21-diol-3,11,20-trione; more particularly 6β,16α-dimethyl-4-pregnene-17α,21-diol-3,11,20-trione; 6β,16β-dimethyl-4-pregnene-17α,21-diol-3,11,20-trione; which can be reacted with an acylating agent such as acetic anhydride to form the corresponding 21-acylate, more particularly the 21-acetate. Instead of hydrolyzing the 17α,20,20,21-bismethylenedioxy-6β,16-dimethyl-3-ethylenedioxy-allopregnane-11-one-5α-ol by treatment with dilute aqueous sulfuric acid, the above-named compound can be reacted with lithium aluminum hydride thereby reducing the 11-keto substituent to an 11β-hydroxy radical to produce 17α,20,20,21-bismethylenedioxy-6β,16-dimethyl-3-ethylenedioxy-allopregnane-5α,11β-diol, more particularly 17α,20,20,21-bismethylenedioxy-6β,16α-dimethyl-3-ethylenedioxy-allopregnane-5α,11β-diol; 17α,20,20,21-bismethylenedioxy-6β,16β-dimethyl-3-ethylenedioxy-allopregnane-5α,11β-diol; which is converted by reaction with dilute aqueous methanolic sulfuric acid solution to 17α,20,20,21-bismethylenedioxy-6β,16-dimethyl-allopregnane-5α,11β-diol-3-one, more particularly 17α,20,20,21-bismethylenedioxy-6β,16α-dimethyl-allopregnane-5α,11β-diol-3-one; 17α,20,20,21-bismethylenedioxy-6β,16β-dimethyl-allopregnane-5α,11β-diol-3-one. The latter compound, when reacted with dilute methanolic potassium hydroxide solution (e.g. 0.25%) under reflux for about one-half hour, is converted to 17α,20,20,21-bismethylenedioxy-6β,16-dimethyl-4-pregnene-11β-ol-3-one, more particularly 17α,20,20,21-bismethylenedioxy-6β,16α-dimethyl-4-pregnene-11β-ol-3-one; 17α,20,20,21-bismethylenedioxy-6β,16β-dimethyl-4-pregnene-11β-ol-3-one; the latter compound is reacted with an aqueous organic acid hydrolyzing agent thereby forming 6β,16-dimethyl-4-pregnene-11β,17α,21-triol-3,20-dione, more particularly 6β,16α-dimethyl-4-pregnene-11β,17α,21-triol-3,20-dione; 6β,16β-dimethyl-4-pregnene-11β,17α,21-triol-3,20-dione; which can be reacted with an acylating agent such as acetic anhydride thereby forming the corresponding 21-acylate derivative such as 6β,16α-dimethyl-4-pregnene-11β,17α,21-triol-3,20-dione 21-acetate; 6β,16β-dimethyl-4-pregnene-11β,17α,21-triol-3,20-dione 21-acetate.

This 6,16-dimethyl-4-pregnene-11β,17α,21-triol-3,20-dione 21-acylate, more particularly 6α,16α-dimethyl-4-pregnene-11β,17α,21-triol-3,20-dione 21-acylate; 6α,16β-dimethyl-4-pregnene-11β,17α,21-triol-3,20-dione 21-acylate; 6β,16α-dimethyl-4-pregnene-11β,17α,21-triol-3,20-dione 21-acylate; 6β,16β-dimethyl-4-pregnene-11β,17α,21-triol-3,20-dione 21-acylate; is reacted with a dehydrating agent such as methane sulfonyl chloride in pyridine, or phosphorous oxychloride dissolved in pyridine, to produce the corresponding 6,16-dimethyl-4,9(11)-pregnadiene-17α,21-diol-3,20-dione 21-acylate, more particulary 6α,16α-dimethyl-4,9(11)-pregnadiene-17α,21-diol-3,20-dione 21-acylate; 6α,16β-dimethyl-4,9(11)-pregnadiene-17α,21-diol-3,20-dione 21-acylate; 6β,16α-dimethyl-4,9(11)-pregnadiene-17α,21-diol-3,20-dione 21-acylate; 6β,16β-dimethyl-4,9(11)-pregnadiene-17α,21-diol-3,20-dione 21-acylate; the latter compound is reacted with hypobromous acid (e.g. N-bromosuccinimide and perchloric acid) to produce 9α-bromo-6,16-dimethyl-4-pregnene-11β,17α,21-triol-3,20-dione 21-acylate, more particularly 9α-bromo-6α,16α-dimethyl-4-pregnene-11β,17α,21-triol-3,20-dione 21-acylate; 9α-bromo-6α,16β-dimethyl-4-pregnene-11β,17α,21-triol-3,20-dione 21-acylate; 9α-bromo-6β,16α-dimethyl-4-pregnene-11β,17α,21-triol-3,20-dione 21-acylate; 6β,16β-dimethyl-4-pregnene-11β,17α,21-triol-3,20-dione 21-acylate; which is reacted with anhydrous potassium acetate in ethanol to produce 6,16-dimethyl-9,11-epoxy-4-pregnene-17α,21-diol-3,20-dione 21-acylate, more particularly 6α,16α-dimethyl-9,11-epoxy-4-pregnene-17α,21-diol-3,20-dione 21-acylate; 6α,16β-dimethyl-9,11-epoxy-4-pregnene-17α,21-diol-3,20-dione 21-acylate; 6β,16α-dimethyl-9,11-epoxy-4-pregnene-17α,21-diol-3,20-dione 21-acylate; 6β,16β-dimethyl-9,11-epoxy-4-pregnene-17α,21-diol-3,20-dione 21-acylate. This 9,11-epoxide is then reacted with hydrogen fluoride in tetrahydrofuran to produce 6,16-dimethyl-19α-fluoro-4-pregnene-11β,17α,21-triol-3,20-dione 21-acylate, more particularly 6α,16α-dimethyl-9α-fluoro-4-pregnene-11β,17α,21-triol-3,20-dione 21-acylate; 6α,16β-dimethyl-9α-fluoro-4-pregnene-11β,17α,21-triol-3,20-dione 21-acylate; 6β,16α-dimethyl-9α-fluoro-4-pregnene-11β,17α,21-triol-3,20-dione 21-acylate; 6β,16β-dimethyl-9α-fluoro-4-pregnene-11β,17α,21-triol-3,20-dione 21-acylate; this compound is reacted with a hydrolyzing agent to form 6,16-dimethyl-9α-fluoro-4-pregnene-11β,17α,21-triol-3,20-dione, more particularly 6α,16α-dimethyl-9α-fluoro-4-pregnene-11β,17α,21-triol-3,20-dione; 6α,16β-dimethyl-9α-fluoro-4-pregnene-11β,17α,21-triol-3,20-dione; 6β,16α-dimethyl-9α-fluoro-4-pregnene-11β,17α,21-triol-3,20-dione; 6β,16β-dimethyl-9α-fluoro-4-pregnene-11β,17α,21-triol-3,20-dione; which can be reacted with an acylating agent to produce 6,16-dimethyl-9α-fluoro-4-pregnene-11β,17α,21-triol-3,20-dione 21-acylate, more particularly 6α,16α-dimethyl-9α-fluoro-4-pregnene-11β,17α,21-triol-3,20-dione 21-acylate; 6α,16β-dimethyl-9α-fluoro-4-pregnene-11β,17α,21-triol-3,20-dione 21-acylate; 6β,16α-dimethyl-9α-fluoro-4-pregnene-11β,17α,21-triol-3,20-dione 21-acylate; 6β,16β-dimethyl-9α-fluoro-4-pregnene-11β,17α,21-triol-3,20-dione 21-acylate.

This 6,16-dimethyl-9α-fluoro-4-pregnene-11β,17α,21-triol-3,20-dione 21-acylate, more particularly 6α,16α-dimethyl-9α-fluoro-4-pregnene-11β,17α,21-triol-3,20-dione 21-acylate; 6α,16β-dimethyl-9α-fluoro-4-pregnene-11β,17α,21-triol-3,20-dione 21-acylate; 6β,16α-dimethyl-9α-fluoro-4-pregnene-11β,17α,21-triol-3,20-dione 21-acylate;

6β,16β-dimethyl-9α-fluoro-4-pregnene - 11β,17α,21 - triol-3,20-dione 21-acylate; is reacted with chromium trioxide in pyridine to form 6,16-dimethyl-9α-fluoro-4-pregnene-17α,21-diol-3,11,20-trione 21-acylate, more particularly 6α,16α-dimethyl-9α-fluoro-4-pregnene-17α,21-diol-3,11,20-trione; 6α,16β-dimethyl-9α-fluoro-4-pregnene-17α,21-diol-3,11,20-trione; 6β,16α-dimethyl-9α-fluoro-4-pregnene-17α,21-diol-3,11,20-trione; 6β,16β-dimethyl-9α - fluoro-4-pregnene-17α,21-diol - 3,11,20 - trione; which, upon reaction with a hydrolyzing agent, forms 6,16-dimethyl-9α-fluoro-4-pregnene-17α,21-diol-3,11,20-trione, more particularly 6α,16α-dimethyl-9α-fluoro-4-pregnene-17α,21-diol-3,11,20-trione; 6α,16β-dimethyl-9α-fluoro-4-pregnene-17α,21-diol-3,11,20-trione; 6β,16α-dimethyl-9α-fluoro-4-pregnene-17α,21-diol-3,11,20-trione; 6β,16β-dimethyl-9α-fluoro-4 - pregnene-17α,21-diol-3,11,20-trione.

The 6,16-dimethyl-11-oxygenated-4 - pregnene - 17α,21-diol-3,20-dione compounds prepared hereinabove (e.g. the 6,16-dimethyl-4-pregnene-17α,21-diol-3,11,20 - trione compounds and the 6,16-dimethyl-4-pregnene-11β,17α,21-triol-3,20-dione compounds) are contacted with the dehydrogenating activity of Schizomycetes micro-organisms, or with selenium dioxide, thereby forming the corresponding 6,16-dimethyl-11-oxygenated-1,4 - pregnadiene-17α,21-diol-3,20-dione compound, more particularly 6α,16α-dimethyl-1,4-pregnadiene-17α,21-diol-3,11,20 - trione; 6α,16α-dimethyl-1,4-pregnadiene-11β,17α,21-triol-3,20-dione; 6α,16α - dimethyl-9α-fluoro-1,4-pregnadiene-17α,21-diol-3,11,20-trione; 6α,16α-dimethyl-9α-fluoro-1,4-pregnadiene - 11β,17α,21 - triol-3,20-dione; 6α,16β-dimethyl-1,4-pregnadiene-17α,21-diol-3,11,20-trione; 6α,16β - dimethyl-1,4-pregnadiene-11β,17α,21-triol - 3,20 - dione; 6α,16β-dimethyl-9α-fluoro-1,4-pregnadiene-17α,21-diol-3,11,20 - trione; 6α,16β-dimethyl-9α-fluoro-1,4-pregnadiene-11β,17α,21-triol-3,20-dione; 6β,16α-dimethyl-1,4-pregnadiene-17α,21-diol-3,11,20-trione; 6β,16α - dimethyl-1,4-pregnadiene-11β,17α,21-triol-3,20-dione; 6β,16α-dimethyl - 9α - fluoro-1,4-pregnadiene-17α,21-diol - 3,11,20 - trione; 6β,16α-dimethyl-9α-fluoro-1,4-pregnadiene-11β,17α,21-triol - 3,20-dione; 6β,16β-dimethyl-1,4-pregnadiene-17α,21-diol-3,11,20-trione; 6β,16β-dimethyl-1,4 - pregnadiene - 11β,17α,21-triol-3,20-dione; 6β,16β - dimethyl-9α-fluoro-1,4-pregnadiene-17α,21-diol-3,11,20-trione; 6β,16β-dimethyl-9α-fluoro-1,4-pregnadiene-11β,17α,21-triol-3,20-dione.

The 16 - methyl - 4 - pregnene - 17α,21 - diol - 3,11,20-trione compounds used as starting materials in the abovementioned procedures are conveniently prepared starting with the known 16-pregnene-3α-ol-11,20-dione 3-acetate in accordance with the following procedure: 16-pregnene-3α-ol-11,20-dione 3-acetate is reacted with methyl magnesium iodide in the presence of cuprous chloride thereby forming 16α-methyl-pregnane-3α-ol-11,20-dione 3-acetate, which is reacted with aqueous methanolic hydrochloric acid to form 16α-methyl-pregnane-3α-ol-11,20-dione. The latter compound, which is a potent anaesthetic, is reacted with acetic anhydride in the presence of p-toluene-sulfonic acid catalyst to form a mixture of enol acetates containing 16α-methyl-17(20)-pregnene-3α,20-diol-11-one 3,20-diacetate; this mixture, after chromatographic purification to remove any unchanged starting material, is reacted with perbenzoic acid and the resulting 16α-methyl-17α,20-epoxy-pregnane-3α,20-diol-11-one 3,20-diacetate is hydrolyzed with methanolic potassium bicarbonate to produce 16α-methyl-pregnane-3α,17α-diol-11,20-dione. The latter compound is reacted with bromine in chloroform to form 21-bromo-16α-methyl-pregnane-3α,17α-diol-11,20-dione which is reacted with sodium iodide in acetone to produce 21-iodo-16α-methyl-pregnane-3α,17α-diol-11,20-dione which is converted without isolation to 16α-methyl-pregnane-3α,17α,21-triol-11,20-dione 21-acetate by reaction with anhydrous potassium acetate; this compound is reacted with chromium trioxide in pyridine to form 16α - methyl - pregnane - 17α,21 - diol - 3,11,20 - trione 21-acetate. The 16α-methyl-pregnane-17α,21-diol-3,11,20-trione 21-acetate is reacted with bromine in glacial acetic acid-chloroform to produce 4-bromo-16α-methyl-pregnane-17α,21-diol-3,11,20-trione, which is then reacted with semicarbazide to form 16α-methyl-4-pregnene-17α,21-diol-3,11,20-trione 3,20-bis-semicarbazone 21-acetate. The 16α-methyl-4-pregnene-17α,21-diol-3,11,20-trione-3,20-bis-semicarbazone 21-acetate is reacted with potassium bicarbonate or potassium hydroxide in aqueous methanol to form 16α-methyl-4-pregnene-17α,21-diol-3,11,20-trione 3,20-bis-semicarbazone which is then hydrolyzed under acid conditions to produce 16α-methyl-4-pregnene-17α,21-diol-3,11,20-trione.

Alternatively, the 16-pregnene-3α-ol-11,20-dione 3-acetate is reacted with diazomethane to form 3α-acetoxy-16α,17α-methyleneazo-pregnane-11,20-dione which, upon heating to an elevated temperature of about 180° C., is converted to 3α-acetoxy-16-methyl-16-pregnene-11,20-dione. The latter compound is then reacted with hydrogen peroxide under alkaline conditions to form 16α,17α-epoxy - 3α - hydroxy - 16β - methyl - pregnane - 11,20-dione which, upon reaction with perchloric acid inaqueous dioxane solution, is converted to a mixture of 3α,17α-dihydroxy - 16 - methyl - 15 - pregnene - 11,20 - dione and 3α,17α - dihydroxy - 16 - methylene - pregnane - 11,20-dione. This mixture is reacted, without separation, with hydrogen in the presence of palladium catalyst to give a mixture of 3α,17α-dihydroxy-16α-methyl-pregnane-11,20-dione and 3α,17α-dihydroxy-16β-methyl-pregnane-11,20-dione, which is chromatographed on activated magnesium silicate using chloroform, and mixtures of chloroform and methanol as diluting solvents to give both the 16α- and 16β-methyl isomers in substantially pure form. The 3α,17α-dihydroxy-16β-methyl-pregnane-11,20-dione thus obtained is then reacted with bromine in chloroform solution to give 21-bromo-3α,17α-dihydroxy-16β-methyl-pregnane-11,20-dione which is, in turn, reacted with anhydrous potassium acetate in acetone containing potassium iodide and acetic acid catalyst to give 3α,17α,21-trihydroxy - 16β - methyl - pregnane - 11,20 - dione 21 - acetate. The last-named compound is reacted with N-bromo-succinimide to form 17α,21-dihydroxy-16β-methyl-pregnane-3,11,20-trione 21-acetate which is reacted with bromine in chloroform-acetic acid solution to form the 4-bromo derivative which is reacted with a dehydrohalogenating agent to form 16β-methyl-4-pregnene-17α,21-diol-3,11,20-trione 21-acetate, which is hydrolyzed by reaction with dilute aqueous methanolic potassium bicarbonate solution to form 16β-methyl-4-pregnene-17α,21-diol-3,11,20-trione.

The reaction between the 16-methyl-4-pregnene-17α,21-diol-3,11,20-trione compound, i.e. the 16α-methyl-4-pregnene-17α,21-diol-3,11,20-trione or 16β-methyl-4-pregnene-17α,21-diol-3,11,20-trione, and formaldehyde to form the corresponding bismethylene-dioxy derivative is conveniently conducted by intimately mixing together a solution of the steroid in an organic solvent, preferably a halogenated hydrocarbon solvent such as chloroform, and a solution of formaldehyde in an aqueous mineral acid such as aqueous hydrochloric acid. The reaction is ordinarily carried out at substantially room temperature under which conditions the formation of the bismethylene-dioxy derivative is substantially complete in about 2–3 days. The non-aqueous layer is recovered, washed with an aqueous alkaline solution until neutral, dried and evaporated to give the corresponding 17α,20,20,21-bis-methylenedioxy-16-methyl-4-pregnene-3,11-dione, i.e. 17α, 20,20,21 - bismethylenedioxy - 16α - methyl - 4 - pregnene-3,11 - dione or 17α,20,20,21 - bismethylenedioxy - 16β-methyl - 4 - pregnene - 3,11 - dione.

The reaction between ethylene glycol and this bismethylenedioxy derivative (irrespective of the configuration of the 16-methyl substituent) is carried out by heating the reactants together in solution in a hydrocarbon solvent such as benzene in the presence of an acidic catalyst such as p-toluenesulfonic acid. Using benzene as the solvent, the reaction is conveniently conducted by heating the reaction solution under reflux for a period of about 15 hours, following which the cooled reaction solution is washed with an aqueous alkaline solution, dried and evaporated to give the 3-ethylenedioxy-17α,20,20,21-bismethylenedioxy-16-methyl-5-pregnene-11-one, more particularly 3-ethylenedioxy - 17α,20,20,21 - bismethylenedioxy-16α-methyl - 5 - pregnene-11-one; 3-ethylenedioxy-17α,20,20,21 - bismethylenedioxy-16β-methyl-5-pregnene-11-one. This 3-ethylenedioxy derivative can be purified if desired by chromatography on acid-washed alumina. While the reaction details, which are set forth hereinbelow for the conversion of this 3-ethylenedioxy-17α,20,20,21-bismethylenedioxy-16-methyl-5-pregnene-11-one to the 6,16-dimethyl - 11 - oxygenated - 1,4 - pregnadiene-17α,21-diol-3,20-dione compounds, are applied to the treatment and production of compounds in which the 16-methyl grouping is in the alpha position, they are equally applicable for the treatment of, and result in the production of, the corresponding 16β-methyl compounds.

The 3-ethylenedioxy-17α,20,20,21-bismethylenedioxy-16α-methyl-5-pregnene-11-one is reacted with perbenzoic acid or perphthalic acid in the presence of a liquid medium, for example a hydrocarbon solvent such as benzene. The reaction is conveniently conducted at room temperature under which conditions the reaction is ordinarily substantially complete in about 2 days. The reaction solution is decanted from a portion of the epoxide product, and the remaining epoxide is recovered from the neutralized and dried reaction solution by evaporation. The epoxide product, that is the 3-ethylenedioxy-17α,20,20,21-bismethylenedioxy - 5,6 - epoxy - 16α - methyl-pregnane-11-one, is dissolved in substantially anhydrous formic acid, and the resulting solution allowed to stand at room temperature for a period of about 2–3 hours. The reaction solution is then poured into water and the aqueous mixture is extracted with a halogenated hydrocarbon solvent such as chloroform. The chloroform extract is neutralized, dried and evaporated to give a mixture of 17α,20,20,21 - bismethylenedioxy - 16α - methyl-6-formyloxy-pregnane-5-ol-3,11-dione and 17α,20,20,21-bismethylenedioxy - 16α - methyl-5-formyloxy-pregnane-6-ol-3,11-dione.

The reaction between the mixed formyloxy derivatives and the alkali hydroxide solution is conveniently conducted by dissolving the formyloxy compounds in a lower alkanol, adding to this solution an aqueous solution of alkali metal hydroxide such as potassium hydroxide, and heating the resulting aqueous alcoholic alkaline solution under reflux and in the presence of a nitrogen atmosphere for a period of approximately one-half hour. The reaction solution is cooled, neutralized with an organic acid such as acetic acid, and evaporated to small volume. The aqueous concentrate is diluted with water, and the aqueous mixture is extracted with a halogenated hydrocarbon solvent such as chloroform. The non-aqueous extract is neutralized, dried and evaporated to give 17α,20,20,21-bismethylenedioxy - 16α - methyl-allopregnane - 3,6,11-trione, which can be purified, if desired, by crystallization from a lower alkanol such as methanol.

The reaction between the 17α,20,20,21-bismethylenedioxy-16α-methyl-allopregnane-3,6,11-trione and butanone dioxolane is conveniently conducted by heating the reactants together under reflux in the presence of an acidic catalyst such as p-toluenesulfonic acid under which conditions the reaction is ordinarily complete in about 10 minutes. The reaction mixture is cooled, diluted with chloroform and the resulting chloroform solution is washed with bicarbonate, dried and evaporated to give 3-ethylenedioxy - 17α,20,20,21 - bismethylenedioxy - 16α-methyl-allopregnane-6,11-dione, which can be purified, if desired, by crystallization from ethyl acetate.

A solution of this 3-ethylenedioxy-17α,20,20,21-bismethylenedioxy - 16α - methyl-allopregnane-6,11-dione in benzene is then added with stirring, over a ten-minute period, to a solution of methyl magnesium iodide in diethyl ether. The resulting mixture is allowed to stir for about one-half hour additional time, water is added followed by additional benzene, and the organic layer is recovered, dried and evaporated to give the corresponding 3-ethylenedioxy - 17α,20,20,21-bismethylenedioxy-6α,16α-dimethyl-allopregnane-6β-ol-11-one.

The reaction between the 3-ethylenedioxy-17α,20,20,21-bismethylenedioxy - 6α,16α - dimethyl-allopregnane-6β-ol-11-one and thionyl chloride, when the latter is used as the dehydrating agent, is conveniently conducted by adding a solution of thionyl chloride in anhydrous pyridine drop-wise to an anhydrous pyridine solution of the steroid, while maintaining the temperature of the solution at approximately 40° C. The resulting solution is stirred for an additional one-half hour period, cooled, poured into ice water, and the aqueous mixture extracted with a halogenated hydrocarbon solvent such as chloroform. The chloroform layer is neutralized, dried, and evaporated to a crude product which is purified by chromatography over alumina to give 3-ethylenedioxy-17α,20,20,21-bismethylenedioxy-6,16α-dimethyl-5-pregnene-11-one.

The 3-ethylenedioxy-17α,20,20,21-bismethylenedioxy-6,16α-dimethyl-5-pregnene-11-one is dissolved in anhydrous acetone containing p-toluenesulfonic acid monohydrate, and the resulting solution is allowed to stand at room temperature for a period of about 15 hours. The resulting solution is then poured into water, the aqueous mixture is extracted with a halogenated hydrocarbon solvent such as chloroform. The chloroform solution is neutralized, dried and evaporated to give 17α,20,20,21-bismethylenedioxy-6α,16α-dimethyl - 4-pregnene-3,11-dione. Similarly, when 3-ethylenedioxy - 17α,20,20,21-bismethylenedioxy-16β-methyl-5-pregnene-11-one is used in the reaction with perbenzoic or perphthalic acid described hereinabove, instead of the 3-ethylenedioxy-17α,20,20,21-bismethylenedioxy-16α-methyl-5-pregnene-11-one therein employed, and the products treated in accordance with the foregoing procedures, there is obtained 17α,20,20,21-bismethylenedioxy-6α,16β-dimethyl-4-pregnene-3,11-dione.

In the alternate procedure for the production of the corresponding 6β,16-dimethyl compounds, the reaction between the 3-ethylenedioxy-17α,20,20,21-bismethylenedioxy-5,6-epoxy-16-methyl-pregnane-11-one, more particularly the 3-ethylenedioxy-17α,20,20,21-bismethylenedioxy-5,6-epoxy-16α-methyl-pregnane-11-one; 3-ethylenedioxy - 17α,20,20,21 - bismethylenedioxy - 5,6 - epoxy-16β-methyl-pregnane-11-one and the methyl magnesium bromide is conveniently conducted by heating the reactants together in benzene solution under nitrogen at a temperature of about 70° C. for a period of about 5 hours. The reaction mixture is cooled, aqueous ammonium chloride solution is slowly added, and the mixture shaken; the benzene layer is separated, dried and evaporated to dryness to give the corresponding 17α,20,20,21-bismethylenedioxy-6β,16-dimethyl - 3 - ethylenedioxy-allopregnane-5α-ol-11-one.

The hydrolysis of the 3-ethylenedioxy-grouping is ordinarily carried out by heating the 17α,20,20,21-bismethylenedioxy-6β,16-dimethyl - 3-ethylenedioxy-allopregnane-5α-ol-11-one with a dilute aqueous alcoholic solution of a mineral acid, preferably a dilute aqueous methanolic solution of sulfuric acid, for a period of about one-half to one hour under reflux in a nitrogen atmosphere. The reaction mixture is cooled, aqueous sodium carbonate solution is added slowly, the mixture is shaken, and the material which precipitates is recovered by filtration and dried to give the corresponding 17α,20,20,21-bismethylenedioxy-6β,16-dimethyl-allopregnane-3,11-dione-5α-ol.

The dehydration of the resulting allopregnane-5α-ol to the corresponding 4-pregnene is preferably conducted by heating the 17α,20,20,21-bismethylenedioxy-6β,16-dimethyl-allopregnane-3,11-dione-5α-ol with an 0.25% solution of potassium hydroxide in methanol at reflux temperature for a period of about 1–2 hours under nitrogen. The reaction mixture is diluted with water, the aqueous mixture is extracted with ethyl acetate, and the ethyl acetate extract is evaporated to dryness to give a mixture which is separated by chromatography on activated alumina followed by elution with mixtures of benzene-ether to give, as the more-ether soluble component, 17α,20,20,21-bismethylenedioxy-6β,16-dimethyl-4-pregnene-3,11-dione, more particularly 17α,20,20,21-bismethylenedioxy-6β,16α-dimethyl-4-pregnene-3,11-dione; 17α,20,20,21-bismethylenedioxy-6β, 16β-dimethyl-4-pregnene-3,11-dione.

The reaction between the 17α,20,20,21-bismethylenedioxy-6,16-dimethyl-4-pregnene-3,11-dione, more particularly the 17α,20,20,21-bismethylenedioxy-6α,16α-dimethyl-4-pregnene-3,11-dione; 17α,20,20,21-bismethylenedioxy-6α, 16β-dimethyl-4-pregnene - 3,11 - dione; 17α,20,20,21 - bismethylenedioxy-6β,16α - dimethyl-4-pregnene-3,11-dione; 17α,20,20,21 - bismethylenedioxy-6β,16α-dimethyl-4-pregnene-3,11-dione and the aqueous organic acid hydrolyzing agent, more particularly an aqueous acetic acid solution, is carried out by heating the reactants together at about 70° C. in a nitrogen atmosphere for a period of about 8 hours. The hydrolysis solution is evaporated to give 6,16-dimethyl-4-pregnene-17α,21-diol-3,11,20-trione, which is then reacted with an acylating agent, e.g. acetic anhydride and pyridine to form the corresponding 6,16-dimethyl-4-pregnene-17α,21-diol-3,11,20-trione 21-acylate.

The reaction between the hereinabove mentioned 3-ethylenedioxy-17α,20,20,21-bismethylenedioxy-6,16-dimethyl-5-pregnene-11-one compound and lithium aluminium hydride is carried out by adding a solution of the steroid in a hydrocarbon solvent such as benzene to an ethereal suspension of the lithium aluminum hydride and heating the resulting suspension under reflux for a period of about 4 hours. Ethyl acetate is added to the cooled reaction mixture to destroy excess lithium aluminum hydride, water is then added, and the ethereal layer is recovered, dried and evaporated to give a crude crystalline material which is purified by chromatography over acid-washed alumina to give 3-ethylenedioxy-17α,20,20,21-bismethylenedioxy-6,16-dimethyl-5-pregnene-11β-ol, more particularly 3-ethylenedioxy-17α,20,20,21-bismethylenedioxy-6,16α-dimethyl-5-pregnene-11β-ol; 3-ethylenedioxy-17α,20,20,21-bismethylenedioxy - 6,16β-dimethyl-5-pregnene-11β-ol. The reaction of the 3-ethylenedioxy-17α,20,20,21-bismethylenedioxy-6,16-dimethyl-5-pregnene-11β-ol and p-toluenesulfonic monohydrate in acetone is conducted in the same manner as described hereinabove in connection with the corresponding 3-ethylenedioxy-17α,20,20,21-bismethylenedioxy-6,16α-dimethyl-5-pregnene-11-one to produce 17α, 20,20,21-bismethylenedioxy - 6,16-dimethyl-4-pregnene-11β-ol-3-one, more particularly 17α,20,20,21-bismethylenedioxy-6α,16α-dimethyl-4 - pregnene-11β-ol-3-one; 17α, 20,20,21-bismethylenedioxy-6α,16β - dimethyl-4-pregnene-11β-ol-3-one.

Similarly, when 17α,20,20,21-bismethylenedioxy-6β,16-dimethyl-3-ethylenedioxy-allopregnane-5α-ol-11-one, more particularly 17α,20,20,21 - bismethylenedioxy - 6β,16α-dimethyl-3-ethylenedioxy-allopregnane-5α-ol-11-one; 17α, 20,20,21 - bismethylenedioxy - 6β,16β - dimethyl - 3 - ethylenedioxy-allopregnane-5α-ol-11-one is reacted with lithium aluminum hydride in accordance with the foregoing procedure and the resulting 11β-ol compound hydrolyzed by reaction with dilute aqueous methanolic sulfuric acid as previously described for the hydrolysis of 17α,20,20,21 - bismethylenedioxy - 6β,16 - dimethyl - 3 - ethylenedioxy-allopregnane-5α-ol-11-one, there is obtained the corresponding 17α,20,20,21-bismethylenedioxy-6β,16-dimethyl-allopregnane-5α,11β-diol-3-one. Dehydration of the latter compound with 0.25% methanolic potassium hydroxide solution, in accordance with the method previously described for the dehydration of the allopregnane-5α-ol-11-one compound, followed by chromatographic separation of the reaction mixture, results in the production of the corresponding 17α,20,20,21-bismethylenedioxy-6β,16-dimethyl-4-pregnene-11β-ol-3-one, more particularly 17α,20,20,21 - bismethylenedioxy - 6β,16α - di- methyl-4-pregnene-11β-ol-3-one; 17α,20,20,21-bismethylenedioxy-6β,16β-dimethyl-4-pregnene-11β-ol-one.

The 17α,20,20,21 - bismethylenedioxy-6,16-dimethyl-4-pregnene-11β-ol-2-one, more particularly 17α,20,20,21-bismethylenedioxy-6α,16α-dimethyl-4-pregnene-11β-ol-3-one; 17α,20,20,21 - bismethylenedioxy - 6α,16β - dimethyl-4-pregnene-11β-ol-3-one; 17α,20,20,21-bismethylenedioxy-6β,16α-dimethyl-4-pregnene-11β-ol-3-one; 17α,20,20,21-bismethylenedioxy - 6β,16β - dimethyl - 4 - pregnene-11β-ol-3-one is then reacted with an aqueous organic acid hydrolyzing agent such as aqueous acetic acid in the same manner as that set forth hereinabove in connection with the hydrolysis of the 17α,20,20,21-bismethylenedioxy-6α,16α-dimethyl-4-pregnene - 3,11 - dione compound, thereby forming the corresponding 6,16-dimethyl-4-pregnene-11β,17α,21-triol-3,20-dione, which is reacted with an acylating agent, e.g. acetic anhydride, propionic anhydride, and the like, in pyridine to form the corresponding 21-acylate such as 6α,16α-dimethyl-4-pregnene-11β,17α, 21-triol-3,20-dione 21-acetate; 6α,16β-dimethyl-4-pregnene-11β,17α,21-triol-3,20-dione 21-propionate; 6β,16α-dimethyl-4-pregnene-11β,17α,21-triol-3,20-dione 21-acetate; 6β,16β - dimethyl - 4 - pregnene - 11β,17α,21 - triol - 3,20-dione 21-butyrate, and the like.

While the reaction details, which are set forth hereinbelow for the introduction of the 9α-fluoro substituent via the Δ⁹⁽¹¹⁾; 9α-bromo; and 9,11-epoxide intermediates, and for the introduction of the Δ¹ double bond microbiologically using Schizomycetes, or chemically using selenium dioxide, are applied to the treatment and production of 6α,16α-dimethyl compounds, these reaction details are equally applicable for the treatment of, and result in the production of, the other 6,16-dimethyl compounds, that is the 6α,16β-dimethyl compounds; the 6β,16α-dimethyl compounds; and the 6β,16β-dimethyl compounds.

The reaction between the 6α,16α-dimethyl-4-pregnene-11β,17α,21-triol-3,20-dione 21-acylate and phosphorous oxychloride or methane sulfonyl chloride is conducted by bringing the reactants together in pyridine solution at room temperature and allowing the solution to stand at that temperature for a period of about 15 hours. The pyridine reaction solution is evaporated in vacuo to small volume, diluted with water and extracted with a water-immiscible organic solvent such as ethyl acetate. Evaporation of the washed and dried ethyl acetate solution gives the corresponding 6α,16α-dimethyl-4,9(11)-pregnadiene-17α,21-diol-3,20-dione 21-acylate which can be purified if desired by crystallization from an organic solvent such as ethyl acetate-ether.

The addition of hypobromous acid to the Δ⁹⁽¹¹⁾-double bond of this 6α,16α-dimethyl-4,9(11)-pregnadiene-17α,21-diol-3,20-dione 21-acylate is conveniently carried out by adding an aqueous solution of perchloric acid to a suspension of the steroid compound and N-bromo-succinimide in aqueous dioxane while maintaining the temperature of the mixture below about 15° C. The reaction mixture is allowed to stand at 15° C. for about 2–3 hours, the yellow solution is treated with allyl alcohol to discharge excess N-bromosuccinimide, and the resulting solution is evaporated in vacuo to small volume. The concentrated solution is diluted with water and the aqueous mixture extracted with a water-immiscible organic solvent such as ethyl acetate. The washed and dried ethyl acetate extract is evaporated to dryness to give the corresponding 9α-bromo-6α,16α-dimethyl-4-pregnene-11β,17α,21-triol-3,20-dione 21-acylate which can be purified, if desired, by crystallization from an organic solvent such as ethyl acetate-ether.

The reaction of this 9,11-bromhydrin with potassium acetate is carried out by heating the reactants together in ethanol under reflux for a period of about two hours. The cooled reaction mixture is evaporated to small volume in vacuo, the concentrated solution is diluted with water, and the aqueous mixture is extracted with ethyl acetate. The washed and dried ethyl acetate extract is evaporated in dryness in vacuo to give the corresponding 6α,16α-dimethyl - 9,11 - epoxy - 4 - pregnene - 17α,21 - diol-3,20-dione 21-acylate which is purified by crystallization from ethyl acetate-ether.

The reaction between this 9,11-epoxide and hydrogen fluoride is conveniently conducted by bringing the reactants together in cold alcohol-free chloroform and allowing the resulting mixture to stand at 0° C. for about two hours. A cold aqueous solution of sodium acetate is added, and the resulting mixture is agitated vigorously. The layers are separated, and the chloroform layer is washed, dried and evaporated to dryness in vacuo to give 6α,16α-dimethyl-9α-fluoro-4-pregnene-11β,17α,21-triol-3,20-dione 21-acylate which can be purified by crystallization from acetone-petroleum ether.

This 16α,16α - dimethyl-9α-fluoro-4-pregnene-11β,17α,21-triol-3,20-dione 21-acylate is then dissolved in a mixture of benzene and dilute methanolic potassium hydroxide and the mixture allowed to stand at room temperature for about 10 minutes. The reaction mixture is acidified with acetic acid, the solvents are evaporated in vacuo and the residual material is crystallized from ethyl acetate-ether to give 6α,16α-dimethyl-9α-fluoro-4-pregnene-11β,17α,21-triol-3,20-dione.

The oxidation of the 11β-hydroxyl group in the 6α,16α-dimethyl-9α-fluoro - 4 - pregnene-11β,17α,21-triol-3,20-dione 21-acylate is conducted by dissolving the steroid ester in pyridine and adding the solution to the complex formed by adding 1 part of chromium trioxide to 5 parts of pyridine. The reactants are mixed thoroughly and the mixture allowed to stand at room temperature about 15 hours. The reaction mixture is poured into water and the aqueous mixture is extracted with ether and then with ethyl acetate. The combined organic extracts are washed, dried and evaporated to dryness in vacuo to give 6α,16α-dimethyl-9α-fluoro-4-pregnene-17α,21-diol-3,11,20-trione 21-acylate which can be purified by crystallization from ethyl acetate-ether. This 21-ester is hydrolyzed with methanolic potassium hydroxide-benzene, in the same manner as described hereinabove in connection with the hydrolysis of 6α,16α-dimethyl-9α-fluoro-4-pregnene-11β,17α,21-triol-3,20-dione 21-acylate, to produce 6α,16α-dimethyl-9α-fluoro-4-pregnene-17α,21-diol-3,11,20-trione.

The microbiological Δ¹ dehydrogenation of these 6α,16α-dimethyl-11-oxygenated - 4 - pregnene-17α,21-diol-3,20-dione compounds, e.g. 6α,16α-dimethyl-4-pregnene-17α,21-diol-3,11,20-trione; 6α,16α - dimethyl-4-pregnene-11β,17α,21-triol-3,20-dione; 6α,16α-dimethyl-9α-fluoro-4-pregnene-11β,17α,21-triol-3,20-dione; 21-esters of these 6α,16α - dimethyl-11-oxygenated-4-pregnene-17α,21-diol-3,20-dione compounds, and the like, is conveniently conducted utilizing Schizomycetes microorganisms. This dehydrogenation- reaction is effected by contacting the steroid compound with the Schizomycetes microorganisms themselves or, if preferred, with enzyme systems of Schizomycetes microorganisms whereby the hydrogen attached to the C–1 and C–2 carbon atoms is selectively removed to produce the corresponding Δ¹-steroid substantially uncontaminated by unwanted products. When the 6α,16α-dimethyl-11-oxygenated-4-pregnene-17α,21-diol-3,20-dione compound is thus subjected to the dehydrogenating activity of Schizomycetes microorganisms, the corresponding 6α,16α - dimethyl-11-oxygenated-1,4-pregnadiene-17α,21-diol-3,20-dione compound is obtained directly and in high yield. This microbiological Δ¹ dehydrogenation procedure is ordinarily carried out by adding the 6α,16α-dimethyl-11-oxygenated-4-pregnene-17α,21-diol-3,20-dione compound as a solid, or as a solution in a solvent as for example a dialkyl ketone such as acetone, a dialkyl-formamide such as dimethyl-formamide, and the like, under sterile conditions to a culture of the microorganism in a nutrient medium and agitating the resulting mixture thereby bringing about growth of the microorganism and dehydrogenation of the steroid compound. The steroid can be added at the time the nutrient medium is inoculated with the culture of Schizomycetes microorganisms or, alternatively, may be added to an established culture. Instead of adding the steroid compound to the established culture in the nutrient medium, the cell growth from such established culture may be filtered from the broth, washed with distilled water, then suspended in buffered aqueous solution containing the 6α,16α-dimethyl-11-oxygenated-4-pregnene-17α,21-diol-3,20-dione compound, and the resulting mixture agitated thereby effecting dehydrogenation of the steroid compound to form the corresponding 6α,16α-dimethyl-11-oxygenated-1,4-pregnadiene-17α,21-diol-3,20-dione. The latter is more readily recovered from this medium than from the mixture obtained when the steroid is incubated with the microorganisms in the original nutrient medium. Alternatively, the 6α,16α-dimethyl-11-oxygenated-4-pregnene-17α,21-diol-3,20-dione compound may be contacted with dehydrogenating enzyme preparations from the growth of Schizomycetes microorganisms.

The nutrient mediums used in carrying out this bacteriological dehydrogenation are those ordinarily utilized in the propagation of Schizomycetes microorganisms. The usual nutrients include a nitrogen and carbon source, inorganic salts and growth factors when required. The carbon can be provided by compounds such as acetates, lactates, and the like. The nitrogen can be provided by an ammonium salt, amino acids, or proteins such as soy beans, oats, yeast, yeast extracts, tryptic digest of casein, meat extract, blood meal, protein meat and bone scrap, salmon meal, fish meals, fish solubles, distillers solubles, and the like. If desired, the Schizomycetes microorganisms can be propagated using proteins (or amino acids) without any carbohydrate being present in the medium, in which case the proteins or amino acids serve as the source of both the carbon and nitrogen required by the microorganisms.

While, as noted hereinabove, the dehydrogenation of the 6α,16α - dimethyl-11-oxygenated-4-pregnene-17α,21-diol-3,20-dione compound may be carried out using dehydrogenating enzyme preparations from the growth of Schizomycetes microorganisms, or by contacting the steroid compound with a suspension of an established culture in distilled water, it is ordinarily preferred to add the 6α,16α - dimethyl-11-oxygenated-4-pregnene-17α,21-diol-3,20-dione compound to a nutrient medium containing a 24-hour growth of Schizomycetes microorganisms. The proportion of steroid compound which may be added to the medium varies depending upon the particular substrate being dehydrogenated, but it is ordinarily preferred to employ a concentration of about 0.005% to 0.2% of 6α,16α - dimethyl-11-oxygenated-4-pregnene-17α,21-diol-3,20-dione compound, although higher or lower concentrations may be employed, if desired. The culture containing the added steroid compound is then incubated, preferably with agitation and aeration for an additional period which ordinarily varies between about 10 hours and 50 hours, although shorter or longer fermentation times may be advantageous for the dehydrogenation of particular substrates. In view of the fact that prolonged fermentations may result in destruction of a portion of the Δ¹-dehydrogenated steroid product, it is ordinarily preferred to employ a fermentation time of about 10 hours to 24 hours which, depending upon the steroid substrate, has been found to result in maximal yields of the Δ¹-dehydrogenated steroid product.

After completion of the dehydrogenation process, the 6α,16α - dimethyl-11-oxygenated-1,4-pregnadiene-17α,21-diol-3,20-dione product is conveniently recovered from the fermented broth by extraction with a water-immiscible solvent as for example a chlorinated hydrocarbon such as chloroform, a ketone such as methyl isobutyl ketone, an alkyl alkanoate such as ethyl acetate, and the like.

The extract of Δ¹-dehydrogenated steroid product and any unreacted starting material which may be present is conveniently purified by chromatography using silica gel, activated alumina, and the like or, if desired, by means of paper chromatograms. After separation of the dehydrogenated product from unreacted starting material, the product can be purified further, if desired, by recrystallization from a solvent such as ethyl acetate, ethyl acetate-petroleum ether, and the like.

In accordance with this microbiological dehydrogenation method, and using the 6,16-dimethyl-11-oxygenated-4-pregnene-17α,21-diol-3,20-dione starting materials enumerated hereinbelow, there are obtained 6,16-dimethyl-11 - oxygenated - 1,4-pregnadiene-17α,21-diol-3,20-dione compounds such as 6α,16α-dimethyl-1,4-pregnadiene-17α, 21-diol-3,11,20-trione; 6α,16β-dimethyl-1,4-pregnadiene-17α,21-diol-3,11,20-trione; 6β,16α-dimethyl-1,4-pregnadiene-17α,21-diol-3,11,20-trione; 6β,16β-dimethyl-1,4-pregnadiene - 17α,21-diol-3,11,20-trione; 6α,16α-dimethyl-1,4-pregnadiene-11β,17α,21-triol-3,20-dione; 6α,16β-dimethyl-1,4 - pregnadiene-11β,17α,21-triol-3,20-dione; 6β,16α-dimethyl - 1,4-pregnadiene-11β,17α,21-triol-3,20-dione; 6β, 16β - dimethyl - 1,4-pregnadiene-11β,17α,21-triol-3,20-dione; 6α,16α-dimethyl-9α-fluoro-17α,21-diol-3,11,20-trione; 6α,16β-dimethyl-9α-fluoro-17α,21-diol-3,11,20-trione; 6β, 16α-dimethyl-9α-fluoro-17α,21-diol-3,11,20-trione; 6β,16β-dimethyl - 9α-fluoro-17α,21-diol-3,11,20-trione; 6α,16α-dimethyl - 9α-fluoro-11β,17α,21-triol-3,20-dione; 6α,16β-dimethyl - 9α-fluoro-11β,17α,21-triol-3,20-dione; 6β,16α-dimethyl - 9α-fluoro-11β,17α,21-triol-3,20-dione; 6β,16β-dimethyl-9α-fluoro-11β,17α,21-triol-3,20-dione.

Irrespective of whether the 6,16-dimethyl-11-oxygenated-4-pregnene-17α,21-diol-3,20-dione starting material employed in this microbiological dehydrogenation reaction is a 21-free alcohol or a 21-ester thereof, the product obtained is ordinarily the corresponding 6,16-dimethyl-11-oxygenated - 1,4-pregnadiene-17α,21-diol-3,20-dione 21-free alcohol, since any 21-ester grouping which may be present is hydrolyzed under conditions customarily employed in the microbiological dehydrogenation reaction. These 6,16 - dimethyl-11-oxygenated-1,4-pregnadiene-17α, 21-diol-3,20-dione 21-free alcohols, as well as the 6,16-dimethyl - 11-oxygenated-4-pregnane-17α,21-diol-3,20-dione 21-free alcohols, can be converted to the corresponding 21-esters by reaction with an acylating agent e.g. a phosphorylating agent, a lower hydrocarbon carboxylic acid acylating agent such as benzoic anhydride, tertiary butyl acetyl chloride, a lower alkanoic anhydride or lower alkanoyl halide such as acetic anhydride, propionic anhydride, a polybasic acid anhydride such as β,β-dimethylglutaric anhydride, succinic anhydride, and the like.

In accordance with this acylation procedure there are obtained 6α,16α - dimethyl-1,4-pregnadiene-17α,21-diol-3, 11,20-trione 21-esters as, for example, 6α,16α-dimethyl-1,4-pregnadiene-17α,21-diol-3,11,20-trione 21 - phosphate; 6α, 16α - dimethyl - 1,4-pregnadiene - 17α,21 - diol - 3,11, 20-trione 21-lower hydrocarbon carbonyl esters such as 6α,16α - dimethyl - 1,4 - pregnadiene - 17α,21 - diol - 3,11, 20-trione 21-benzoate; 6α,16α-dimethyl-1,4-pregnadiene-17α,21 - diol - 3,11,20 - trione 21 - tertiary butyl acetate; 6α,16α - dimethyl - 1,4 - pregnadiene - 17α,21 - diol - 3,11, 20-trione 21-lower alkanoates such as 6α,16α-dimethyl-1,4 - pregnadiene-17α,21 - diol - 3,11,20-trione 21-acetate; 6α,16α - dimethyl - 1,4 - pregnadiene - 17α,21 - diol - 3,11, 20-trione 21-propionate; 6α,16α-dimethyl-1,4-pregnadiene-11β,17α,21-triol-3,20-dione 21-esters as, for example, 6α,16α - dimethyl - 1,4 - pregnadiene - 11β,17α,21 - triol-3,20-dione 21-phosphate; 6α,16α-dimethyl-1,4-pregnadiene-11β,17α,21-triol-3,20-dione 21 - lower hydrocarbon carbonyl esters, such as 6α,16α-dimethyl-1,4-pregnadiene-11β,17α,21-triol-3,20-dione 21-benzoate; 6α,16α-dimethyl-1,4 - pregnadiene - 11β,17α,21 - triol-3,20-dione 21-tertiary butyl acetate; 6α,16α-dimethyl-1,4-pregnadiene-11β,17α, 21-triol-3,20-dione 21-lower alkanoates such as 6α,16α-dimethyl-1,4-pregnadiene-11β,17α,21-triol-3,20-dione 21-acetate; 6α,16α-dimethyl-1,4-pregnadiene-11β,17α,21-triol-3,20-dione 21-propionate; 9α-fluoro-6α,16α-dimethyl-1,4-pregnadiene-17α,21-diol-3,11,20-trione 21-esters as, for example, 9α-fluoro-6α,16α-dimethyl-1,4-pregnadiene-17α, 21-diol-3,11,20-trione 21-phosphate; 9α-fluoro-6α,16α-dimethyl - 1,4 - pregnadiene - 17α,21-diol-3,11,20-trione 21-lower hydrocarbon carbonyl esters such as 9α-fluoro-6α,16α - dimethyl - 1,4 - pregnadiene - 17α,21 - diol - 3,11, 20 - trione 21 - benzoate; 9α-fluoro-6α,16α-dimethyl-1,4-pregnadiene-17α,21-diol-3,11,20-trione 21-tertiary butyl acetate; 9α - fluoro - 6α,16α - dimethyl - 1,4 - pregnadiene-17α,21-diol-3,11,20-trione 21-lower alkanoates such as 9α - fluoro - 6α,16α - dimethyl - 1,4 - pregnadiene - 17α,21-diol-3,11,20-trione 21-acetate; 9α-fluoro-6α,16α-dimethyl-1,4-pregnadiene-17α,21-diol-3,11,20-trione 21-propionate; 9α - fluoro - 6α,16α - dimethyl - 1,4 - pregnadiene - 11β, 17α,21-triol-3,20-dione 21-esters as, for example, 9α-fluoro-6α,16α - dimethyl - 1,4 - pregnadiene - 11β,17α,21 - triol-3,20-dione 21-phosphate; 9α-fluoro-6α,16α-dimethyl-1,4-pregnadiene-11β,17α,21-triol-3,20-dione 21-lower hydrocarbon carbonyl esters, such as 9α-fluoro-6α,16α-dimethyl-1,4-pregnadiene-11β,17α,21-triol-3,20-dione 21-benzoate; 9α - fluoro - 6α,16α - dimethyl - 1,4 - pregnadiene - 11β, 17α,21-triol-3,20-dione 21-tertiary butyl acetate; 9α-fluoro-6α,16α - dimethyl - 1,4 - pregnadiene - 11β,17α,21 - triol-3,20-dione 21-lower alkanoates such as 9α-fluoro-6α16α-dimethyl-1,4-pregnadiene-11β,17α,21-triol-3,20-dione 21-acetate; 9α - fluoro-6α,16α-dimethyl-1,4-pregnadiene-11β, 17α,21-triol-3,20-dione 21-propionate; 6α,16β-dimethyl-1,4-pregnadiene-17α,21-diol-3,11,20-trione 21-esters as, for example, 6α,16β-dimethyl-1,4-pregnadiene - 17α,21 - diol-3,11,20-trione 21-phosphate; 6α,16β-dimethyl-1,4-pregnadiene-17α,21-diol-3,11,20-trione 21-lower hydrocarbon carbonyl esters such as 6α,16β-dimethyl-1,4-pregnadiene-17α,21-diol-3,11,20-trione 21-benzoate; 6α,16β-dimethyl-1,4-pregnadiene-17α,21-diol-3,11,20-trione 21-tertiary butyl acetate; 6α,16β-dimethyl-1,4-pregnadiene-17α,21-diol-3,11,20-trione 21-lower alkanoates such as 6α,16β-dimethyl-1,4-pregnadiene-17α,21-diol-3,11,20-trione 21-acetate; 6α,16β-dimethyl-1,4-pregnadiene-17α,21-diol-3,11,20-trione 21-propionate; 6α,16β-dimethyl-1,4-pregnadiene-11β,17α,21-triol-3,20-dione 21-esters as, for example, 6α,16β - dimethyl - 1,4 - pregnadiene - 11β,17α,21-triol-3,20-dione 21-phosphate; 6α,16β-dimethyl-1,4-pregnadiene-11β,17α,21-triol-3,20-dione 21 - lower hydrocarbon carbonyl esters, such as 6α,16β-dimethyl-1,4-pregnadiene-11β,17α,21-triol-3,20-dione 21-benzoate; 6α,16β-dimethyl-1,4-pregnadiene-11β,17α,21 - triol - 3,20-dione 21-tertiary butyl acetate; 6α,16β-dimethyl-1,4-pregnadiene-11β,17α, 21-triol-3,20-dione 21-lower alkanoates such as 6α,16β-dimethyl-1,4-pregnadiene-11β,17α,21-triol-3,20-dione 21-acetate; 6α,16β-dimethyl-1,4-pregnadiene-11β,17α,21-triol-3,20-dione 21-propionate; 9α-fluoro-6α,16β-dimethyl-1,4-pregnadiene-17α,21-diol-3,11,20-trione 21-esters as, for example, 9α-fluoro-6α,16β-dimethyl-1,4-pregnadiene-17α, 21-diol-3,11,20-trione 21-phosphate; 9α-fluoro-6α,16β-dimethyl - 1,4 - pregnadiene - 17α,21-diol-3,11,20-trione 21-lower hydrocarbon carbonyl esters such as 9α-fluoro-6α,16β - dimethyl - 1,4 - pregnadiene - 17α,21 - diol - 3,11, 20 - trione 21 - benzoate; 9α-fluoro-6α,16β-dimethyl-1,4-pregnadiene-17α,21-diol-3,11,20-trione 21-tertiary butyl acetate; 9α-fluoro-6α,16β-dimethyl-1,4-pregnadiene-17α, 21-diol-3,11,20-trione 21-lower alkanoates such as 9α-fluoro - 6α,16β - dimethyl - 1,4 - pregnadiene - 17α,21-diol-3,11,20-trione 21-acetate; 9α-fluoro-6α,16β-dimethyl-1,4-pregnadiene-17α,21-diol-3,11,20-trione 21-propionate; 9α-fluoro - 6α,16β - dimethyl - 1,4 - pregnadiene - 11β,17α, 21-triol-3,20-dione 21-esters as, for example, 9α-fluoro-6α,16β - dimethyl - 1,4 - pregnadiene - 11β,17α,21 - triol-3,20-dione 21-phosphate; 9α-fluoro-6α,16β-dimethyl-1,4-pregnadiene-11β,17α,21-triol-3,20-dione 21-lower hydrocarbon carbonyl esters, such as 9α-fluoro-6α,16β-dimethyl - 1,4 - pregnadiene-11β,17α,21-triol-3,20-dione 21-benzoate; 9α-fluoro-6α,16β-dimethyl-1,4-pregnadiene-11β, 17α,21-triol-3,20-dione 21-tertiary butyl acetate; 9α-fluoro - 6α,16β - dimethyl - 1,4 - pregnadiene - 11β,17α,21-triol-3,20-dione 21-lower alkanoates such as 9α-fluoro- 6α,16β - dimethyl - 1,4 - pregnadiene - 11β,17α,21 - triol - 3,20-dione 21 - acetate; 9α-fluoro-6α,16β-dimethyl-1,4-pregnadiene - 11β,17α,21-triol-3,20-dione 21 - propionate; 6β,16α - dimethyl - 1,4 - pregnadiene - 17α,21 - diol - 3,11, 20-trione 21-esters as, for example, 6β,16α-dimethyl-1,4-pregnadiene - 17α,21 - diol - 3,11,20 - trione 21-phosphate; 6β,16α - dimethyl - 1,4 - pregnadiene - 17α,21 - diol - 3,11, 20-trione 21-lower hydrocarbon carbonyl esters such as 6β,16α - dimethyl - 1,4 - pregnadiene - 17α,21 - diol - 3,11, 20-trione 21-benzoate; 6β,16α-dimethyl-1,4-pregnadiene-17α,21 - diol - 3,11,20 - trione 21-tertiary butyl acetate; 6β,16α - dimethyl - 1,4 - pregnadiene - 17α,21 - diol - 3,11, 20-trione 21-lower alkanoates such as 6β,16α-dimethyl-1,4 - pregnadiene - 17α,21 - diol-3,11,20-trione 21-acetate; 6β,16α - dimethyl - 1,4 - pregnadiene - 17α,21 - diol - 3,11, 20-trione 21-propionate; 6β,16α-dimethyl-1,4-pregnadiene-11β,17α,21-triol-3,20-dione 21-esters as, for example, 6β,16α - dimethyl - 1,4 - pregnadiene - 11β,17α,21-triol-3,20-dione 21-phosphate; 6β,16α-dimethyl-1,4-pregnadiene-11β,17α,21-triol-3,20-dione 21 - lower hydrocarbon carbonyl esters, such as 6β,16α-dimethyl-1,4-pregnadiene-11β,17α,21-triol-3,20-dione 21-benzoate; 6β,16α-dimethyl-1,4-pregnadiene-11β,17α,21 - triol - 3,20-dione 21-tertiary butyl acetate; 6β,16α-dimethyl-1,4-pregnadiene-11β,17α, 21-triol-3,20-dione 21-lower alkanoates such as 6β,16α-dimethyl-1,4-pregnadiene-11β,17α,21-triol-3,20-dione 21-acetate; 6β,16α-dimethyl-1,4-pregnadiene-11β,17α,21-triol-3,20-dione 21-propionate; 9α-fluoro-6β,16α-dimethyl-1,4-pregnadiene-17α,21-diol-3,11,20-trione 21-esters as, for example, 9α-fluoro-6β,16α-dimethyl-1,4-pregnadiene-17α, 21-diol-3,11,20-trione 21-phosphate; 9α-fluoro-6β,16α-dimethyl - 1,4 - pregnadiene - 17α,21-diol-3,11,20-trione 21-lower hydrocarbon carbonyl esters such as 9α-fluoro-6β,16α - dimethyl - 1,4 - pregnadiene - 17α,21 - diol - 3,11, 20 - trione 21 - benzoate; 9α-fluoro-6β,16α-dimethyl-1,4-pregnadiene-17α,21-diol-3,11,20-trione 21-tertiary butyl acetate; 9α - fluoro-6β,16α-dimethyl-1,4-pregnadiene-17α, 21-diol-3,11,20-trione 21-lower alkanoates such as 9α-fluoro - 6β,16α - dimethyl - 1,4 - pregnadiene-17α,21-diol-3,11,20-trione 21-acetate; 9α-fluoro-6β,16α-dimethyl-1,4-pregnadiene-17α,21-diol-3,11,20-trione 21-propionate; 9α-fluoro - 6β,16α - dimethyl - 1,4 - pregnadiene - 11β,17α, 21-triol-3,20-dione 21-esters as, for example, 9α-fluoro-6β,16α - dimethyl - 1,4 - pregnadiene - 11β,17α,21-triol-3,20-dione 21-phosphate; 9α-fluoro-6β,16α-dimethyl-1,4-pregnadiene-11β,17α,21-triol-3,20-dione 21-lower hydrocarbon carbonyl esters, such as 9α-fluoro-6β,16α-dimethyl-1,4-pregnadiene-11β,17α,21-triol-3,20-dione 21-benzoate; 9α-fluoro-6β,16α-dimethyl-1,4-pregnadiene-11β,17α, 21-triol-3,20-dione 21-tertiary butyl acetate; 9α-fluoro-6β,16α - dimethyl - 1,4 - pregnadiene - 11β,17α,21-triol-3,20-dione 21-lower alkanotes such as 9α-fluoro-6β,16α-dimethyl-1,4-pregnadiene-11β,17α,21-triol-3,20-dione 21-acetate; 9α-fluoro-6β,16α-dimethyl-1,4-pregnadiene-11β, 17α,21-triol-3,20-dione 21-propionate; 6β,16β-dimethyl-1,4-pregnadiene-17α,21-diol-3,11,20-trione 21-esters as, for example, 6β,16β-dimethyl-1,4-pregnadiene-17α,21-diol-3,11,20-trione 21 - phosphate; 6β,16β-dimethyl-1,4-pregnadiene-17α,21-diol-3,11,20-trione 21-lower hydrocarbon carbonyl esters such as 6β,16β-dimethyl-1,4-pregnadiene-17α,21-diol-3,11,20-trione 21-benzoate; 6β,16β-dimethyl-1,4-pregnadiene-17α,21-diol-3,11,20-trione 21-tertiary butyl acetate; 6β,16β-dimethyl-1,4-pregnadiene-17α,21-diol-3,11,20-trione 21-lower alkanoates such as 6β,16β-dimethyl-1,4-pregnadiene - 17α,21 - diol - 3,11,20-trione 21-acetate; 6β,16β-dimethyl-1,4-pregnadiene-17α, 21 - diol - 3,11,20-trione 21-propionate; 6β,16β-dimethyl-1,4-pregnadiene-11β,17α,21-triol-3,20-dione 21-esters as, for example, 6β,16β-dimethyl-1,4-pregnadiene-11β,17α,21-triol-3,20-dione 21 phosphate; 6β,16β-dimethyl-1,4-pregnadiene-11β,17α,21-triol-3,20-dione 21-lower hydrocarbon carbonyl esters, such as 6β,16β-dimethyl-1,4-pregnadiene-11β,17α,21-triol-3,20-dione 21-benzoate; 6β,16β-dimethyl-1,4-pregnadiene-11β,17α,21-triol-3,20-dione 21 - tertiary butyl acetate; 6β,16β-dimethyl-1,4-pregnadiene-11β,17α, 21-triol-3,20-dione 21-lower alkanoates such as 6β,16β-dimethyl-1,4-pregnadiene-11β,17α,21-triol-3,20-dione 21-acetate; 6β,16β-dimethyl-1,4-pregnadiene-11β,17α,21-triol-3,20-dione 21-propionate; 9α-fluoro-6β,16β-dimethyl-1,4-pregnadiene-17α,21-diol-3,11,20-trione 21-esters as, for example, 9α-fluoro-6β,16β-dimethyl-1,4-pregnadiene-17α, 21-diol-3,11,20-trione 21-phosphate; 9α-fluoro-6β16β-dimethyl - 1,4 - pregnadiene - 17α,21-diol-3,11,20-trione 21-lower hydrocarbon carbonyl esters such as 9α-fluoro-6β,16β - dimethyl - 1,4 - pregnadiene - 17α,21 - diol - 3,11, 20 - trione 21 - benzoate; 9α-fluoro-6β,16β-dimethyl-1,4-pregnadiene-17α,21-diol-3,11,20-trione 21-tertiary butyl acetate; 9α-fluoro-6β,16β-dimethyl-1,4-pregnadiene-17α, 21-diol-3,11,20-trione 21-lower alkanoates such as 9α-fluoro - 6β,16β - dimethyl - 1,4 - pregnadiene - 17α,21-diol-3,11,20-trione 21-acetate; 9α-fluoro-6β,16β-dimethyl-1,4-pregnadiene-17α,21-diol-3,11,20-trione 21-propionate; 9α - fluoro - 6β,16β - dimethyl - 1,4 - pregnadiene - 11β, 17α,21-triol-3,20-dione 21-esters as, for example, 9α-fluoro - 6β,16β - dimethyl - 1,4 - pregnadiene - 11β,17α, 21-triol-3,20-dione 21 - phosphate; 9α-fluoro-6β,16β-dimethyl - 1,4 - pregnadiene-11β,17α,21-triol-3,20-dione 21-lower hydrocarbon carbonyl esters, such as 9α-fluoro-6β,16β - dimethyl - 1,4 - pregnadiene - 11β,17α,21 - triol-3,20-dione 21 - benzoate; 9α-fluoro-6β,16β-dimethyl-1,4-pregnadiene-11β,17α,21-triol-3,20-dione 21-tertiary butyl acetate; 9α - fluoro-6β,16β-dimethyl-1,4-pregnadiene-11β, 17α,21-triol-3,20-dione 21-lower alkanoates such as 9α-fluoro - 6β,16β - dimethyl - 1,4 - pregnadiene - 11β,17α,21-triol-3,20-dione 21-acetate; 9α-fluoro-6β,16β-dimethyl-1,4-pregnadiene-11β,17α,21-triol-3,20-dione 21 - propionate; 6α,16α-dimethyl-4-pregnene-17α,21-diol-3,11,20-trione 21-esters as, for example, 6α,16α-dimethyl-4-pregnene-17α, 21-diol-3,11,20-trione 21-phosphate; 6α,16α-dimethyl-4-pregnene-17α,21-diol-3,11,20-trione 21-lower hydrocarbon carbonyl esters such as 6α,16α-dimethyl-4-pregnene-17α,21-diol-3,11,20-trione 21-benzoate; 6α,16α-dimethyl-4-pregnene-17α,21-diol-3,11,20-trione 21 - tertiary butyl acetate; 6α,16α-dimethyl-4-pregnene-17α,21-diol-3,11,20-trione 21-lower alkanoates such as 6α,16α-dimethyl-4-pregnene-17α,21-diol-3,11,20-trione 21-acetate; 6α,16α-dimethyl-4-pregnene-17α,21-diol-3,11,20-trione 21-propionate; 6α,16α-dimethyl-4-pregnene-11β,17α,21-triol-3,20-dione 21-esters as, for example, 6α,16α-dimethyl-4-pregnene-11β,17α,21-triol-3,20-dione 21-phosphate; 6α,16α-dimethyl-4-pregnene-11β,17α,21-triol-3,20-dione 21-lower hydrocarbon carbonyl esters, such as 6α,16α-dimethyl-4-pregnene-11β,17α,21-triol-3,20-dione 21-benzoate; 6α,16α-dimethyl-4-pregnene-11β,17α,21-triol-3,20-dione 21-tertiary butyl acetate; 6α,16α-dimethyl-4-pregnene-11β,17α,21-triol-3,20-dione 21-lower alkanoates such as 6α,16α-dimethyl-4-pregnene-11β,17α,21-triol-3,20-dione 21-acetate; 6α,16α - dimethyl - 4 - pregnene - 11β,17α,21 - triol - 3,20-dione 21-propionate; 9α-fluoro-6α,16α-dimethyl-4-pregnene-17α,21-diol-3,11,20-trione 21-esters as, for example, 9α - fluoro - 6α,16α - dimethyl - 4 - pregnene - 17α,21-diol-3,11,20-trione 21 - phosphate; 9α-fluoro-6α,16α-dimethyl - 4 - pregnene-17α,21-diol-3,11,20-trione 21-lower hydrocarbon carbonyl esters such as 9α-fluoro-6α,16α-dimethyl-4-pregnene-17α,21-diol-3,11,20-trione 21-benzoate; 9α - fluoro - 6α,16α - dimethyl - 4 - pregnene - 17α,21-diol-3,11,20-trione 21-tertiary butyl acetate; 9α-fluoro-6α,16α-dimethyl-4-pregnene-17α,21-diol-3,11,20-trione 21-lower alkanoates such as 9α-fluoro-6α,16α-dimethyl-4-pregnene-17α,21-diol-3,11,20-trione 21-acetate; 9α-fluoro-6α,16α-dimethyl-4-pregnene-17α,21-diol-3,11,20-trione 21-propionate; 9α - fluoro - 6α16α-dimethyl-4-pregnene-11β, 17α,21-triol-3,20-dione 21-esters as, for example, 9α-fluoro - 6α,16α - dimethyl - 4 - pregnene - 11β,17α,21-triol-3,20-dione 21-phosphate; 9α-fluoro-6α,16α-dimethyl-4-pregnene-11β,17α,21-triol-3,20-dione 21-lower hydrocarbon carbonyl esters, such as 9α-fluoro-6α,16α-dimethyl-4-pregnene-11β,17α,21-triol-3,20-dione 21-benzoate; 9α-fluoro - 6α,16α - dimethyl - 4 - pregnene - 11β,17α,21-triol-3,20-dione 21-tertiary butyl acetate; 9α-fluoro-6α,16α- dimethyl-4-pregnene-11β,17α,21-triol-3,20-dione 21-lower alkanoates such as 9α-fluoro-6α,16α-dimethyl-4-pregnene-11β,17α,21-triol-3,20-dione 21-acetate; 9α-fluoro-6α,16α-dimethyl-4-pregnene-11β,17α,21-triol-3,20-dione 21-propionate; 6α,16β - dimethyl-4-pregnene-17α,21-diol-3,11,20-trione 21-esters as, for example, 6α,16β-dimethyl-4-pregnene-17α,21-diol-3,11,20-trione 21-phosphate; 6α,16β-dimethyl - 4 - pregnene-17α,21-diol-3,11,20-trione 21-lower hydrocarbon carbonyl esters such as 6α,16β-dimethyl-4-pregnene-17α,21-diol-3,11,20-trione 21-benzoate; 6α,16β-dimethyl-4-pregnene-17α,21-diol-3,11,20-trione 21-tertiary butyl acetate; 6α,16β-dimethyl-4-pregnene-17α,21-diol-3,11,20-trione 21-lower alkanoates such as 6α,16β-dimethyl-4-pregnene-17α,21-diol-3,11,20-trione 21-acetate; 6α, 16β-dimethyl - 4 - pregnene-17α,21-diol-3,11,20-trione 21-propionate; 6α,16β-dimethyl-4-pregnene-11β,17α,21-triol-3,20-dione 21-esters as, for example, 6α,16β-dimethyl-4-pregnene - 11β,17α,21 - triol-3,20-dione 21-phosphate; 6α,16β-dimethyl-4-pregnene-11β,17α,21-triol-3,20-dione 21-lower hydrocarbon carbonyl esters, such as 6α,16β-dimethyl-4-pregnene-11β,17α,21-triol-3,20-dione 21-benzoate; 6α,16β-dimethyl - 4 - pregnene-11β,17α,21-triol-3,20-dione 21-tertiary butyl acetate; 6α,16β-dimethyl-4-pregnene-11β,17α,21-triol-3,20-dione 21 - lower alkanoates such as 6α,16β-dimethyl-4-pregnene-11β,17α,21-triol-3,20-dione 21-acetate; 6α,16β-dimethyl-4-pregnene-11β,17α,21-triol-3,20-dione 21-propionate; 9α-fluoro-6α,16β-dimethyl-4-pregnene-17α,21-diol-3,11,20-trione 21-esters as, for example, 9α-fluoro-6α,16β-dimethyl-4-pregnene-17α,21-diol-3,11,20-trione 21-phosphate; 9α-fluoro-6α,16β-dimethyl-4-pregnene-17α,21-diol-3,11,20-trione 21-lower hydrocarbon carbonyl esters such as 9α-fluoro-6α,16β-dimethyl-4-pregnene-17α,21-diol-3,11,20-trione 21 - benzoate; 9α-fluoro-6α,16β-dimethyl-4-pregnene-17α,21-diol-3,11,20-trione 21-tertiary butyl acetate; 9α-fluoro-6α,16β-dimethyl-4-pregnene-17α,21-diol-3,11,20-trione 21-lower alkanoates such as 9α-fluoro-6α,16β-dimethyl-4-pregnene-17α,21-diol-3,11,20-trione 21-acetate; 9α-fluoro-6α,16β-dimethyl-4-pregnene-17α,21-diol-3,11,20-trione 21-propionate; 9α-fluoro-6α,16β - dimethyl - 4 - pregnene - 11β,17α,21 - triol - 3,20-dione 21-esters as, for example, 9α-fluoro-6α,16β-dimethyl-4-pregnene-11β,17α,21-triol-3,20-dione 21 - phosphate; 9α - fluoro - 6α,16β - dimethyl - 4 - pregnene - 11β,17α,21-triol-3,20-dione 21-lower hydrocarbon carbonyl esters, such as 9α-fluoro-6α,16β-dimethyl-4-pregnene-11β,17α, 21-triol-3,20-dione 21-benzoate; 9α-fluoro-6α,16β-dimethyl-4-pregnene-11β,17α,21-triol-3,20-dione 21-tertiary butyl acetate; 9α-fluoro-6α,16β-dimethyl-4-pregnene-11β,17α, 21-triol-3,20-dione 21-lower alkanoates such as 9α-fluoro-6α,16β - dimethyl - 4 - pregnene - 11β,17α,21-triol - 3,20-dione 21-acetate; 9α-fluoro-6α,16β-dimethyl-4-pregnene-11β,17α,21-triol-3,20-dione 21-propionate; 6β,16α-dimethyl-4-pregnene-17α,21-diol-3,11,20-trione 21-esters as, for example, 6β,16α-dimethyl-4-pregnene-17α,21-diol-3,11,20-trione 21-phosphate; 6β,16α-dimethyl-4-pregnene-17α,21-diol-3,11,20-trione 21-lower hydrocarbon carbonyl esters such as 6β,16α-dimethyl-4-pregnene-17α,21-diol-3,11,20-trione 21-benzoate; 6β,16α-dimethyl-4-pregnene-17α,21-diol-3,11,20-trione 21-tertiary butyl acetate; 6β,16α-dimethyl-4-pregnene-17α,21-diol-3,11,20-trione 21-lower alkanoates such as 6β,16α-dimethyl-4-pregnene-17α,21-diol-3,11,20-trione 21-acetate; 6β,16α-dimethyl-4-pregnene-17α,21-diol-3,11,20-trione 21-propionate; 6β,16α-dimethyl - 4 - pregnene - 11β,17α,21-triol-3,20-dione 21-esters as, for example, 6β,16α-dimethyl-4-pregnene-11β,17α,21-triol-3,20-dione 21-phosphate; 6β,16α-dimethyl-4-pregnene-11β,17α,21-triol-3,20-dione 21-lower hydrocarbon carbonyl esters such as 6β,16α-dimethyl-4-pregnene-11β, 17α,21-triol-3,20-dione 21-benzoate; 6β,16α-dimethyl-4-pregnene-11β,17α,21-triol-3,20-dione 21-tertiary butyl acetate; 6β,16α-dimethyl-4-pregnene-11β,17α,21-triol-3,20-dione 21-lower alkanoates such as 6β,16α-dimethyl-4-pregnene-11β,17α,21-triol-3,20-dione 21-acetate; 6β,16α-dimethyl-4-pregnene-11β,17α,21-triol-3,20-dione 21-propionate; 9α-fluoro-6β,16α-dimethyl-4-pregnene-17α,21-diol-3,11,20-trione 21-esters as, for example, 9α-fluoro-6β,16α-dimethyl-1,4-pregnadiene-17α,21-diol-3,11,20-trione 21-phosphate; 9α-fluoro-6β,16α-dimethyl-4-pregnene-17α,21-diol-3,11,20-trione 21-lower hydrocarbon carbonyl esters such as 9α-fluoro-6β,16α-dimethyl-4-pregnene-17α,21-diol-3,11,20-trione 21-benzoate; 9α-fluoro-6β,16α-dimethyl-4-pregnene-17α,21-diol-3,11,20-trione 21-tertiary butyl acetate; 9α - fluoro - 6β,16α-dimethyl-4-pregnene-17α,21-diol-3,11,20-trione 21-lower alkanoates such as 9α-fluoro-6β,16α-dimethyl-4-pregnene-17α,21-diol-3,11,20-trione 21-acetate; 9α - fluoro - 6β,16α-dimethyl-4-pregnene-17α,21-diol-3,11,20-trione 21 - propionate; 9α-fluoro-6β,16α-dimethyl-4-pregnene-11β,17α,21-triol-3,20-dione 21 - esters as, for example, 9α-fluoro-6β,16α-dimethyl-4-pregnene-11β,17α,21-triol-3,20-dione 21-phosphate; 9α-fluoro-6β, 16α-dimethyl-4-pregnene-11β,17α,21-triol-3,20-dione 21-lower hydrocarbon carbonyl esters, such as 9α-fluoro-6β,16α - dimethyl - 4 - pregnene - 11β,17α,21-triol - 3,20-dione 21-benzoate; 9α-fluoro-6β,16α-dimethyl-4-pregnene-11β,17α,21-triol-3,20-dione 21-tertiary butyl acetate; 9α-fluoro - 6β,16α - dimethyl - 4 - pregnene - 11β,17α,21-triol-3,20-dione 21-lower alkanoates such as 9α-fluoro-6β,16α - dimethyl - 4 - pregnene - 11β,17α,21 - triol -, 3,20-dione 21-acetate; 9α-fluoro-6β,16α-dimethyl-4-pregnene-11β,17α,21-triol-3,20-dione 21-propionate; 6β,16β-dimethyl-4-pregnene-17α,21-diol-3,11,20-trione 21-esters as, for example, 6β,16β-dimethyl-4-pregnene-17α,21-diol-3,11,20-trione 21-phosphate; 6β,16β-dimethyl-4-pregnene-17α,21-diol-3,11,20-trione 21-lower hydrocarbon carbonyl esters such as 6β,16β-dimethyl-4-pregnene-17α,21-diol-3,11,20-trione 21-benzoate; 6β,16β-dimethyl-4-pregnene-17α,21-diol-3,11,20-trione 21-tertiary butyl acetate; 6β,16β-dimethyl-4-pregnene-17α,21-diol-3,11,20-trione 21-lower alkanoates such as 6β,16β-dimethyl-4-pregnene-17α,21-diol-3,11,20-trione 21-acetate; 6β,16β-dimethyl-4-pregnene-17α,21-diol-3,11,20-trione 21-propionate; 6β,16β-dimethyl-4-pregnene-11β,17α,21-triol-3,20-dione 21-esters as, for example, 6β,16β-dimethyl-4-pregnene-11β,17α,21-triol-3, 20-dione 21-phosphate; 6β,16β-dimethyl-4-pregnene-11β, 17α,21-triol-3,20-dione 21-lower hydrocarbon carbonyl esters, such as 6β,16β-dimethyl-4-pregnene-11β,17α,21-triol-3,20-dione 21-benzoate; 6β,16β-dimethyl-4-pregnene-11β,17α,21-triol-3,20-dione 21 - tertiary butyl acetate; 6β,16β - dimethyl - 4 - pregnene - 11β,17α,21 - triol - 3,20-dione 21-lower alkanoates such as 6β,16β-dimethyl-4-pregnene-11,17α,21-triol-3,20-dione 21-acetate; 6β,16β-dimethyl-4-pregnene-11β,17α,21-triol-3,20-dione 21-propionate; 9α-fluoro-6β,16β-dimethyl-4-pregnene-17α,21-diol-3,11,20-trione 21-esters as, for example, 9α-fluoro-6β,16β-dimethyl-4-pregnene-17α,21-diol-3,11,20-trione 21-phosphate; 9α-fluoro-6β,16β-dimethyl-4-pregnene-17α,21-diol-3,11,20-trione 21-lower hydrocarbon carbonyl esters such as 9α-fluoro-6β,16β-dimethyl-4-pregnene-17α,21-diol-3,11, 20-trione 21-benzoate; 9α-fluoro-6β,16β-dimethyl-4-pregnene-17α,21-diol-3,11,20-trione 21-tertiary butyl acetate; 9α - fluoro - 6β,16β - dimethyl - 4 - pregnene - 17α,21-diol-3,11,20-trione 21-lower alkanoates such as 9α-fluoro-6β,16β-dimethyl-4-pregnene-17α,21-diol-3,11,20-trione 21-acetate; 9α-fluoro-6β,16β-dimethyl - 4 - pregnene-17α,21-diol-3,11,20-trione 21-propionate; 9α-fluoro-6β,16β-dimethyl-4-pregnene-11β,17α,21-triol-3,20-dione 21-esters as, for example, 9α-fluoro-6β,16β-dimethyl-4-pregnene-11β,17α,21-triol-3,20-dione 21-phosphate; 9α-fluoro-6β, 16β-dimethyl-4-pregnene-11β,17α,21-triol-3,20-dione 21-lower hydrocarbon carbonyl esters, such as 9α-fluoro-6β,16β - dimethyl - 4 - pregnene - 11β,17α,21 - triol - 3,20-dione 21-benzoate; 9α-fluoro-6β,16β-dimethyl-4-pregnene-11β,17α,21-triol-3,20-dione 21-tertiary butyl acetate; 9α-fluoro - 6β,16β - dimethyl - 4 - pregnene - 11β,17α,21-triol-3,20-dione 21-lower alkanoates such as 9α-fluoro-6β,16β - dimethyl - 4 - pregnene - 11β,17α,21 - triol - 3,20-dione 21-acetate; 9α-fluoro-6β,16β-dimethyl-4-pregnene-11β,17α,21-triol-3,20-dione 21-propionate, and the like.

Alternatively, instead of the above-mentioned microbiological dehydrogenation method, the 6,16-dimethyl- 11-oxygenated-4-pregnene-17α,21-diol-3,20-dione compound is reacted with selenium dioxide thereby effecting ring A dehydrogenation to form the corresponding 6,16-dimethyl-11-oxygenated-1,4-pregnadiene-17α,21-diol-3,20-dione compound. This selenium dioxide dehydrogenation procedure is conveniently conducted by bringing the 6,16-dimethyl-11-oxygenated-4-pregnene-17α,21-diol-3,20-dione compound, and selenium dioxide together in the presence of an organic solvent such as for example dioxane, an alcohol solvent such as t-butanol, etc., and heating the mixture at an elevated temperature. When t-butanol is used as the solvent, it is ordinarily preferred to carry out this reaction at the boiling point of the solvent, under which conditions the reaction is ordinarily complete in about fifteen hours. The reaction mixture is ordinarily filtered, thereby removing metallic selenium, and the filtered solution is evaporated to dryness in vacuo to give the desired 6,16-dimethyl-11-oxygenated-1,4-pregnadiene-17α,21-diol-3,20-dione compound. The crude material obtained in this way is conveniently purified by paper strip chromatography in accordance with the procedure outlined hereinabove in connection with the purification of the 6,16-dimethyl-11-oxygenated-1,4-pregnadiene-17α,21-diol-3-20-dione compound produced by microbiological dehydrogenation.

The following examples illustrate methods of carrying out the present invention but it is to be understood that these examples are given for purposes of illustration and not of limitation.

*Example 1*

10 grams of 16α-methyl-4-pregnene-17α,21-diol-3,11,20-trione are dissolved in 400 cc. of chloroform. To this solution is added a mixture of 100 cc. of concentrated aqueous hydrochloric acid and 100 cc. of 37% aqueous formaldehyde solution. The resulting mixture is stirred for a period of approximately 3 days at room temperature. The chloroform layer is separated, washed with sodium bicarbonate solution until neutral, then with water, dried over anhydrous sodium sulfate, and evaporated to dryness in vacuo. The residual crude material is purified by crystallization from a mixture of methylene chloride and methanol to give 17α,20,20,21-bismethylenedioxy-16α-methyl-4-pregnene-3,11-dione.

10 grams of 17α,20,20,21-bismethylenedioxy-16α-methyl-4-pregnene-3,11-dione are dissolved in 500 cc. of benzene, to the solution is added 25 cc. ethylene glycol and 1 gram of p-toluenesulfonic acid, and the resulting mixture is heated under reflux for a period of approximately 15 hours. The reaction solution is cooled, washed with aqueous sodium bicarbonate solution, dried over anhydrous sodium sulfate, and evaporated to dryness in vacuo. The residual crude material is adsorbed from its solution in benezene on 250 g. of acid-washed alumina, and the resulting adsorbate is eluted utilizing mixtures of ether-petroleum ether to give 3-ethylenedioxy-17α,20,20,21-bismethylenedioxy-16α-methyl-5-pregnene-11-one.

A mixture of 10 grams of 3-ethylenedioxy-17α,20,20,21-bismethylenedioxy-16α-methyl-5-pregnene-11-one, 4.3 g. perbenzoic acid and 230 cc. benezene is allowed to stand at room temperature for a period of about 2 days. A portion of the epoxide product, which precipitates, is separated from the reaction solution by decantation, and the decanted solution is washed with satured aqueous sodium bicarbonate solution and then dried over anhydrous sodium sulfate. The dried solution is then evaporated in vacuo, and the residual epoxide product is combined with the epoxide product originally separated from the reaction mixture to give 3-ethylenedioxy-17α,20,20,21-bismethylenedioxy-16α-methyl-5,6-epoxy-pregnane-11-one.

The latter product is dissolved in 200 cc. of substantially anhydrous formic acid and the resulting solution is allowed to stand at room temperature for a period of about 2½ hours. The reaction solution is poured into water, and the aqueous mixture is extracted with chloroform. The chloroform solution is washed with saturated aqueous sodium bicarbonate solution, dried over anhydrous sulfate, and evaporated in vacuo to give a mixture of 17α,20,20,21-bismethylenedioxy-16α-methyl-6-formyloxy-pregnane-5-ol-3,11-dione and 17α,20,20,21-bismethylenedioxy-16α-methyl-5-formyloxy-pregnane-6-ol-3,11-dione.

This mixture of 5-formyloxy and 6-formyloxy derivatives is dissolved in about 850 cc. of methanol, to this solution is added a solution containing about 17 grams of potassium hydroxide in 80 cc. of water, and the resulting mixture is heated under reflux in a nitrogen atmosphere for a period of approximately ½ hour. The reaction solution is cooled, neutralized with about 23 cc. of acetic acid and evaporated in vacuo to a small volume. The concentrated solution is poured into water and the aqueous mixture is extracted with chloroform. The chloroform extract is washed with aqueous sodium bicarbonate solution, dried over anhydrous sodium sulfate, and evaporated to dryness in vacuo. The residual material is crystallized from methanol to give 17α,20,20,21-bismethylenedioxy-16α-methyl-allopregnane-3,6,11-trione.

A solution containing about 5 grams of 17α,20,20,21-bismethylenedioxy-16α-methyl-allopregnene-3,6,11-trione and 0.1 g. of p-toluenesulfonic acid in 120 cc. butanone dioxolane is heated under reflux for a period of about 10 minutes. The reaction solution is cooled to about 0-5° C., diluted with chloroform, and the resulting solution is washed with equeous sodium bicarbonate solution and dried over anhydrous sodium sulfate. The resulting dried solution is evaporated to dryness in vacuo, and the residual material is slurried with ether, recovered by filtration and then dried to give a 3-ethylenedioxy-17α,20,20,21-bismethylenedioxy-16α-methyl-allopregnane-6,11-dione.

A solution containing about 5 grams of 3-ethylenedioxy-17α,20,20,21-bismethylenedioxy-16α-methyl-allopregnane-6,11-dione in 70 cc. of benzene is added, with stirring over a period of approximately 10 minutes, to an ethereal solution containing the methyl magnesium iodide, prepared from 5 cc. of methyl iodide and 0.5 gram of magnesium turnings, dissolved in 50 cc. of ether. The reaction mixture is allowed to stir for an additional ½ hour period, and the resulting solution is decomposed with 70 cc. of water. About 170 cc. of benzene is added to the aqueous mixture and the layers are separated. The aqueous layer is extracted with two 100 cc.-portions of chloroform, and the organic layers are combined, dried over anhydrous sodium sulfate, and evaporated to dryness in vacuo to give 3-ethylenedioxy-17α,20,20,21-bismethylenedioxy-6α,16α-dimethyl-allopregnane-6β-ol-11-one.

A solution containing 5.5 cc. of freshly distilled thionyl chloride in 26 cc. of cold anhydrous pyridine is added dropwise, with stirring, to a solution of 5.0 g. of 3-ethylenedioxy-17α,20,20,21-bismethylenedioxy-6α,16α-dimethyl-allopregnene-6β-ol-11-one in 32 cc. of anhydrous pyridine, while maintaining the temperature of the reaction mixture at approximately 40° C. The reaction solution is stirred for an additional 30-minute period following the addition of the thionyl chloride reagent, and the reaction mixture is then cooled to about 0–5° C. and poured into 180 cc. ice water. The aqueous mixture is extracted with chloroform and the chloroform extract is neutralized, dried over anhydrous sodium sulfate, and evaporated to dryness in vacuo. The residual material, dissolved in benzene, is chromatographed on 150 grams of acid-washed alumina; elution of the resulting adsorbate with mixtures of petroleum ether and ether gives 3-ethylenedioxy-17α,20,20,21-bismethylenedioxy-6,16α-dimethyl-5-pregnene-11-one.

A solution containing about 5 grams of 3-ethylenedioxy - 17α,20,20,21 - bismethylenedioxy - 6,16α - dimethyl-5-pregnene-11-one, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21 - bismethylenedioxy - 6α,16α - dimethyl - 4-pregnene-3,11-dione.

About 0.1 gram of 17α,20,20,21-bismethylenedioxy-6α,16α-dimethyl-4-pregnene-3,11-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α-dimethyl-4-pregnene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed wtih 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl - 4 - pregnene - 17α,21 - diol - 3,11,20 - trione 21-acetate.

To a solution of 100 mg. of 6α,16α-dimethyl-4-pregnene-17α,21-diol-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (supercel) to give 6α,16α-dimethyl-1,4-pregnadiene-17α,21-diol-3,11,20-trione 21-acetate.

*Example 2*

To a solution of 100 mg. of 17α,20,20,21-bismethylenedioxy - 6α,16α - dimethyl - 4 - pregnene - 3,11 - dione, prepared as described in Example 1 hereinabove, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (supercel) to give 17α,20,20,21 - bismethylenedioxy - 6α,16α - dimethyl-1,4-pregnadiene,3,11-dione.

About 0.1 gram of 17α,20,20,21-bismethylenedioxy-6α,16α-dimethyl-1,4-pregnadiene-3,11-dione is suspended in 18 cc. of 30% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α-dimethyl-1,4-pregnadiene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-1,4-pregnadiene-17α,21-diol-3,11,20-trione 21-acetate.

*Example 3*

About 5 grams of 3-ethylenedioxy-17α,20,20,21-bismethylenedioxy-6,16α-dimethyl-5-pregnene-11-one, which can be prepared as described in Example 1 hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-17α,20,20,21-bismethylenedioxy - 6,16α - dimethyl-5-pregnene-11β-ol.

A solution containing about 5 grams of 3-ethylenedioxy-17α,20,20,21-bismethylenedioxy - 6,16α-dimethyl-5-pregnene-11β-ol, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21-bismethylenedioxy-6α,16α-dimethyl - 4 - pregnene-11β-ol-3-one.

About 0.1 gram of 17α,20,20,21-bismethylenedioxy-6α,16α-dimethyl-4-pregnene-11β-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α-dimethyl-4-pregnene-11β,17α,21-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-4-pregnene-11β,17α,21-triol-3,20-dione 21-acetate.

To a solution of 100 mg. of 6α,16α-dimethyl-4-pregnene-11β,17α,21-triol-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight then centrifuged and the clear benzene solution is evaporated in vacuo. The residual material thus obtained is separated using partition chromatography on diatomaceous silica (Supercel) to give 6α,16α-dimethyl-1,4-pregnadiene-11β,17α,21-triol - 3,20 - dione 21-acetate.

Example 4

To a solution of 100 mg. of 17α,20,20,21-bismethylenedioxy-6α-16α-dimethyl-4-pregnene-11β-ol-3-one, prepared as described in Example 1 hereinabove, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight then centrifuged and the clear benzene solution in evaporated in vacuo. The residual material thus obtained is separated using partition chromatography on diatomaceous silica (Supercel) to give 17α,20,20,21-bismethylenedioxy-6α,16α-dimethyl-1,4-pregnadiene-11β-ol-3-one.

About 0.1 gram of 17α,20,20,21-bismethylenedioxy-6α,16α-dimethyl-1,4-pregnadiene-11β-ol-3-one is suspended in 18 cc. of 50% aqueous acetic acid, and the suspension is carefully purged with nitrogen, following which the suspension is heated on a stream bath under nitrogen for a period of about 8 hours and then allowed to stand at room temperature for an additional period of 15 hours. The reaction solution is evaporated to dryness in vacuo to give 6α,16α - dimethyl - 1,4 - pregnadiene-11β,17α,21-triol-3,20 dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-1,4-pregnadiene-11β 17α,21-triol-3,20-dione 21-acetate.

Example 5

To a cooled solution of 436 mg. of 6α,16α-dimethyl-4-pregnene-11β,17α,21-triol-3,20-dione 21-acetate (which can be prepared as described in Example 3 hereinabove) in 2.5 cc. dimethyl formamide and 2.0 ml. of dry pyridine is added 1.0 ml. of methane sulfonyl chloride, while maintaining the temperature below 0° C. The resulting mixture is allowed to warm to room temperature, at which point a precipitate appears; the resulting mixture is then heated to a temperature of about 70–100° C. for a period of about 10 minutes. About 15 ml. of water is added slowly to the reaction mixture, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized to give 6α,16α-dimethyl-4,9(11)-pregnadiene-17α,21-diol-3,20-dione 21-acetate. A suspension of 330 mg. of 6α,16α-dimethyl-4,9(11)-pregnadiene-17α, 21-diol-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two-and-one-half hours during which time the solid material slowly dissolves. The resulting yellow solution is treated with 1.0 ml. of allyl alcohol to discharge the color and the remaining N-bromo-succinimide, and the remaining solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-6α,16α-dimethyl-4-pregnene-11β,17α,21-triol-3,20-dione 21-acetate.

A solution of 210 mg. of 9α-bromo-6α,16α-dimethyl-4-pregnene-11β,17α,21-triol-3,20-dione 21-acetate and 240 mg. of potassium acetate in 10 ml. of absolute ethanol is heated under reflux for two hours. The reaction mixture is cooled to room temperature, evaporated in vacuo to a small volume, and diluted with water. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 6α,16α-dimethyl-9,11-epoxy-4-pregnenes-17α,21-diol-3,20-dione 21-acetate.

To a solution of 83 mg. of anhydrous hydrogen fluoride in 4.7 ml. of ice-cold alcohol-free chloroform is added an ice-cold solution of 416 mg. of 6α,16α-dimethyl-9,11 - epoxy-4-pregnene-17α,21 - diol-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 6α,16α-dimethyl-9α-fluoro-4-pregnene-11β,17α,21-triol - 3,20 - dione 21-acetate. Fifty milligrams of 6α,16α-dimethyl-9α-fluoro-4-pregnene- 11β,17α,21-triol-3,20-dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6α,16α-dimethyl-9α-fluoro-4-pregnene-11β,17α,21-triol-3,20-dione.

To a solution of 100 mg. of 6α,16α-dimethyl-9α-fluoro-4-pregnene-11β,17α,21-triol-3,20-dione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated, using partition chromatography on diatomaceous silica (Supercel), to give 6α,16α-dimethyl-9α-fluoro - 1,4 - pregnadiene-11β,17α,21-triol-3,20-dione 21-acetate. This material is hydrolyzed using 1 N methanolic potassium hydroxide in benzene as described above for the hydrolysis of 6α,16α-dimethyl-9α-fluoro - 4-pregnene-11β,17α,21-triol-3,20-dione 21-acetate to give 6α,16α-dimethyl-9α-fluoro-1,4-pregnadiene-11β,17α,21-triol-3,20-dione.

Example 6

A solution of 400 mg. of 6α,16α-dimethyl-9α-fluoro-4-pregnene-11β,17α,21-triol-3,20-dione 21-acetate in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 6α,16α-dimethyl-9α-fluoro - 4-pregnene-17α,21-diol - 3,11,20-trione 21-acetate. Fifty milligrams of 6α,16α-dimethyl-9α-fluoro-4-pregnene-17α,21-diol-3,11,20-trione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6α,16α-dimethyl-9α-fluoro-4-pregnene-17α,21-diol-3,11,20-trione.

To a solution of 100 mg. of 6α,16α-dimethyl-9α-fluoro-4-pregnene-17α,21-diol-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Supercel) to give 6α,16α-dimethyl-9α-fluoro - 1,4 - pregnadiene-17α,21-diol-3,11,20-trione 21-acetate. This material is hydrolyzed using 1 N methanolic potassium hydroxide in benzene as described hereinabove for the hydrolysis of 6α,16α-dimethyl-9α-fluoro-4-pregnene-17α,21-diol-3,11,20-trione 21-acetate to give 6α,16α-dimethyl-9α-fluoro-1,4-pregnadiene-17α,21-diol-3,11,20-trione.

Example 7

Fifty milliliters of a nutrient medium are prepared having the following composition:

| | | |
|---|---|---|
| Cerelose | g | 1 |
| Edmain | g | 1 |
| Cornsteep liquor | ml | 0.25 |
| Distilled water to make 50 ml. | | |

This medium is adjusted to pH 6.5 with KOH, sterilized and inoculated with about 2.5 to 5 ml. of a culture of *Bacillus sphaericus* (ATCC 245) microorganisms, and the inoculated culture is then incubated at a temperature of 28° C., with agitation, for a 24-hour period. To the resulting culture is added a solution containing 10 mg. of 6α,16α-dimethyl-4-pregnene-17α,21-diol-3,11,20-trione dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then streaked on paper chromatograms which are developed using formamide as the stationary phase and 50% benzene–50% chloroform as the mobile phase. After 8 hours development in a descending system, the upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized to give 6α,16α-dimethyl-1,4-pregnadiene-17α,21-diol-3,11-20-trione.

The 6α,16α-dimethyl-1,4-pregnadiene-17α,21-diol-3,11,20-trione is treated with acetic anhydride and pyridine to give the 21-acetyl derivative, which is purified by recrystallization to give substantially pure 6α,16α-dimethyl-1,4-pregnadiene-17α,21-diol-3,11,20-trione 21-acetate.

Example 8

Fifty milliliters of a nutrient medium are prepared having the following composition:

| | | |
|---|---|---|
| Cerelose | g | 1 |
| Edamin | g | 1 |
| Cornsteep liquor | ml | 0.25 |
| Distilled water to make 50 ml. | | |

This medium is adjusted to pH 6.5 with KOH, sterilized and inoculated with about 2.5 to 5 ml. of a culture of *Nocardia asteroides* (ATCC 9970) microorganisms, and the inoculated culture is then incubated at a temperature of 28° C., with agitation, for a 24-hour period. To the resulting culture is added a solution containing 10 mg. of 6α,16α - dimethyl-4-pregnene-11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then streaked on paper chromatograms which are developed using formamide as the stationary phase and 50% benzene–50% chloroform as the mobile phase. The upper bands for each chromatogram corresponding to the $\Delta^1$-dehydro derivative are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized to give 6α,16α-dimethyl-1,4-pregnadiene-11β,17α-21-triol-3,20 dione.

The 6α,16α-dimethyl-1,4-pregnadiene-11β,17α,21-triol- 3,20-dione is treated with acetic anhydride and pyridine, and the acetylated product recrystallized to give substantially pure 6α,16α-dimethyl-1,4-pregnadiene-11β,17α,21-triol-3,20-dione 21-acetate.

*Example 9*

Fifty milliliters of a nutrient medium are prepared having the following composition:

Cerelose _____ g__ 1
Edamin _____ g__ 1
Cornsteep liquor _____ ml__ 0.25
Distilled water to make 50 ml.

This medium is adjusted to pH 6.5 with KOH, sterilized and inoculated with about 2.5 to 5 ml. of a culture of *Mycobacterium smegmatis* (NRRL B–1667) microorganisms, and the inoculated culture is then incubated at a temperature of 28° C., with agitation, for a 24-hour period. To the resulting culture is added a solution containing 10 mg. of 6α,16α-dimethyl-9α-fluoro-4-pregnene-11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and 50% benzene–50% chloroform as the mobile liquid phase. Two bands are secured, one of which corresponds to the more mobile component, the 6α,16α-dimethyl-9α-fluoro-4-pregnene-11β,17α,21-triol-3,20-dione starting material, and the other corresponds to the less mobile component, the Δ¹-dehydro derivative. The paper chromatogram is dried, and the latter band is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the starting material with the major band that corresponding to the less mobile component, the Δ¹-dehydro derivative. The paper chromatogram is thoroughly dried, and the band corresponding to the less mobile component is cut off and extracted with methanol. The methanol extract is evaporated to dryness in vacuo to give 6α,16α-dimethyl-9α-fluoro-1,4-pregnadiene-11β,17α,21-triol-3,20-dione.

The 6α,16α-dimethyl-9α-fluoro-1,4-pregnadiene-11β,17α,21-triol-3,20-dione is reacted with excess acetic anhydride in pyridine to give the 21-acetyl derivative which is purified by recrystallization from benzene-petroleum ether to give substantially pure 6α,16α-dimethyl-9α-fluoro-1,4-pregnadiene-11β,17α,21-triol-3,20-dione 21-acetate.

*Example 10*

The fermentation procedures of Examples 7, 8 and 9 are repeated but using, in place of the microorganisms and the 6α,16α-dimethyl-11-oxygenated-4-pregnene-17α,21-diol-3,20-dione starting material employed in those examples, the microorganism strains and steroid starting compounds indicated in the table hereinbelow. The resulting fermentation broths are treated in accordance with the isolation methods described in Examples 7, 8 and 9 to give, for the particular microorganism strain and steroid substrate used, the 6α,16α-dimethyl-11-oxygenated-1,4-pregnadiene-17α,21-diol-3,20-dione indicated in the following table:

| Expt. No. | Substrate | Microorganism | 6α,16α-dimethyl-11-oxygenated-1,4-pregnadiene-17α,21-diol-3,20-dione product |
|---|---|---|---|
| 1 | 6α,16α-dimethyl-9α-fluoro-4-pregnene-17α,21-diol-3,11,20-trione 21-acetate. | *Bacillus sphaericus* ATCC–7055. | 6α,16α-dimethyl-9α-fluoro-1,4-pregnadiene-17α,21-diol-3,11,20-trione. |
| 2 | 6α,16α-dimethyl-9α-fluoro-4-pregnene-11β,17α,21-triol-3,20-dione 21-acetate. | *Bacillus sphaericus* ATCC–7063. | 6α,16α-dimethyl-9α-fluoro-1,4-pregnadiene-11β,17α,21-triol-3,20-dione. |
| 3 | 6α,16α-dimethyl-9α-fluoro-4-pregnene-17α,21-diol-3,11,20-trione. | *Nocardia leishmanii* ATCC–6855. | 6α,16α-dimethyl-9α-fluoro-1,4-pregnadiene-17α,21-diol-3,11,20-trione. |
| 4 | 6α,16α-dimethyl-9α-fluoro-4-pregnene-11β,17α,21-triol-3,20-dione. | *Nocardia formica* NRRL–2470. | 6α,16α-dimethyl-9α-fluoro-1,4-pregnadiene-11β,17α,21-triol-3-20-dione. |
| 5 | 6α,16α-dimethyl-4-pregnene-11β,17α,21-triol-3,20-dione. | *Mycobacterium phlei* ATCC–12,298. | 6α,16α-dimethyl-1,4-pregnadiene-11β,17α,21-triol-3,20-dione. |
| 6 | 6α,16α-dimethyl-4-pregnene-17α,21-diol-3,11,20-trione. | *Mycobacterium lacticola* ATCC–21,297. | 6α,16α-dimethyl-1,4-pregnadiene-17α,21-diol-3,11,20-trione. |

*Example 11*

About 400 mg. of 3-ethylenedioxy-17α,20,20,21-bismethylenedioxy-16α-methyl-5,6-epoxy-pregnane-11-one is dissolved in about 100 ml. of benzene, and the solution purged with nitrogen. To the resulting solution is added about 3.7 ml. of a 3-molar solution of methyl magnesium bromide, and the resulting mixture is stirred at a temperature of about 70° C. in a nitrogen atmosphere for a period of about 5 hours. The reaction solution is cooled to about 0–5° C., and approximately 9 g. of ammonium chloride in 90 ml. of water is added over a 20-minute period. The layers are separated, and the aqueous layer extracted with a small portion of benzene. The benzene extracts are combined, washed with three 25-ml. portions of water, dried over magnesium sulfate, and evaporated to dryness in vacuo to give 3-ethylenedioxy-17α,20,20,21-bismethylenedioxy - 6β,16α - dimethyl - allopregnane - 5α - ol-11-one.

Approximately 100 mg. of 3-ethylenedioxy-17α,20,20, 21 - bismethylenedioxy - 6β,16α - dimethyl - allopregnane-5α-ol-11-one is dissolved in about 5 ml. of methanol, and the solution is purged with nitrogen. To this solution is then added 0.4 ml. of an 8% aqueous sulfuric acid solution, and the resulting mixture is heated under reflux for a period of about 35 minutes in a nitrogen atmosphere. At the end of this reflux period, the reaction solution is cooled to 0–5° C., and to the solution is slowly added, over a 10-minute period, a solution of approximately 0.4 g. of sodium carbonate in 12 ml. of water. The resulting slurry is cooled, and the precipitated material is recovered and dried to give 17α,20,20,21-bismethylenedioxy - 6β,16α - dimethyl - allopregnane - 3,11 - dione-5α-ol.

About 100 mg. of 17α,20,20,21-bismethylenedioxy-6β,16α-dimethyl-allopregnane-3,11-dione-5α-ol is mixed with about 35 cc. of an 0.25% solution of potassium hydroxide in methanol; the resulting mixture is heated under reflux for a period of approximately 2 hours under a nitrogen atmosphere. The reaction mixture is then diluted with water, and the aqueous mixture extracted with ethyl acetate. The ethyl acetate extracts are dried, evaporated to dryness, and the residual material is subjected to chromatographic purification using about 10 g. of washed alumina, utilizing benzene and mixtures of benzene and ether, as the eluting solvents. The product obtained by evaporation of the ether-rich fractions is recrystallized from mixtures of ethyl acetate and ether to give substantially pure $17\alpha,20,20,21$-bismethylenedioxy-$6\beta,16\alpha$-dimethyl-4-pregnene-3,11-dione.

About 0.1 gram of $17\alpha,20,20,21$-bismethylenedioxy-$6\beta,16\alpha$-dimethyl-4-pregnene-3,11-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give $6\beta,16\alpha$-dimethyl-4-pregnene-$17\alpha,21$-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give $6\beta,16\alpha$-dimethyl-4-pregnene-$17\alpha,21$-diol-3,11,20-trione 21-acetate.

To a solution of 100 mg. of $6\beta,16\alpha$-dimethyl-4-pregnene-$17\alpha,21$-diol-3,11,20-trione 21-acetate, in 6 ml. t-butanol, and 10.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Supercel) to give $6\beta,16\alpha$-dimethyl-1,4-pregnadiene-$17\alpha,21$-diol-3,11,20-trione 21-acetate.

*Example 12*

The procedure of Example 2 is repeated but using, in place of the $17\alpha,20,20,21$-bismethylenedioxy-$6\alpha,16\alpha$-dimethyl-4-pregnene-3,11-dione starting material therein employed, 100 mg. of $17\alpha,20,20,21$-bismethylenedioxy-$6\beta,16\alpha$-dimethyl-4-pregnene-3,11-dione, prepared as described in Example 11 hereinabove. In accordance with this procedure there is obtained, via the intermediate formation of $17\alpha,20,20,21$-bismethylenedioxy-$6\beta,16\alpha$-dimethyl-1,4-pregnadiene-3,11-dione, as final products $6\beta,16\alpha$-dimethyl-1,4-pregnadiene-$17\alpha,21$-diol-3,11,20-trione and $6\beta,16\alpha$-dimethyl-1,4-pregnadiene-$17\alpha,21$-diol-3,11,20-trione 21-acetate.

*Example 13*

About 5 g. of 3-ethylenedioxy-$17\alpha,20,20,21$-bismethylenedioxy-$6\beta,16\alpha$-dimethyl-allopregnane 11-one-$5\alpha$-ol, which can be prepared as described in Example 11 hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-$17\alpha,20,20,21$-bismethylenedioxy-$6\beta,16\alpha$-dimethyl-allopregnane-$5\alpha,11\beta$-diol.

Approximately 100 mg. of 3-ethylenedioxy-$17\alpha,20,20,21$-bismethylenedioxy-$6\beta,16\alpha$-dimethyl-allopregnane-$5\alpha,11\beta$-diol is dissolved in about 5 ml. of methanol, and the solution is purged with nitrogen. To this solution is then added 0.4 ml. of an 8% aqueous sulfuric acid solution, and the resulting mixture is heated under reflux for a period of about 35 minutes in a nitrogen atmosphere. At the end of this reflux period, the reaction solution is cooled to 0–5° C., and to the solution is slowly added, over a 10-minute period, a solution of approximately 0.4 g. of sodium carbonate in 12 ml. of water. The resulting slurry is cooled, and the precipitated material is recovered and dried to give $17\alpha,20,20,21$-bismethylenedioxy-$6\beta,16\alpha$-dimethyl-allopregnane-$5\alpha,11\beta$-diol-3-one.

About 100 mg. of $17\alpha,20,20,21$-bismethylenedioxy-$6\beta,16\alpha$-dimethyl-allopregnane-$5\alpha,11\beta$-diol-3-one is mixed with about 35 cc. of an 0.25% solution of potassium hydroxide in methanol; the resulting mixture is heated under reflux for a period of approximately 2 hours under a nitrogen atmosphere. The reaction mixture is then diluted with water, and the aqueous mixture extracted with ethyl acetate. The ethyl acetate extracts are dried, evaporated to dryness, and the residual material is subjected to chromatographic purification using about 10 g. of washed alumina, utilizing benzene, and mixtures of benzene and ether, as the eluting solvents. The product obtained by evaporation of the ether-rich fractions is recrystallized from mixtures of ethyl acetate and ether to give substantially pure $17\alpha,20,20,21$-bismethylenedioxy-$6\beta,16\alpha$-dimethyl-4-pregnene-$11\beta$-ol-3-one.

About 0.1 gram of $17\alpha,20,20,21$-bismethylenedioxy-$6\beta,16\alpha$-dimethyl-4-pregnene-$11\beta$-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give $6\beta,16\alpha$-dimethyl-4-pregnene-$11\beta,17\alpha,21$-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6β,16α - dimethyl - 4 - pregnene - 11β,17α,21 - triol-3,20-dione 21-acetate.

To a solution of 100 mg. of 6β,16α-dimethyl-4-pregnene-11β,17α,21-triol-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Supercel) to give 6β,16α-dimethyl-1,4-pregnadiene-11β,17α,21-triol-3,20-dione 21-acetate.

Example 14

To a cooled solution of 436 mg. of 6β,16α-dimethyl-4-pregnene-11β,17α,21-triol-3,20-dione 21-acetate (which can be prepared as described in Example 13 hereinabove) in 2.5 cc. dimethyl formamide and 2.0 ml. of dry pyridine is added 1.0 ml. of methane sulfonyl chloride, while maintaining the temperature below 0° C. The resulting mixture is allowed to warm to room temperature, at which point a precipitate appears; the resulting mixture is then heated to a temperature of about 70–100° C. for a period of about 10 minutes. About 15 ml. of water is added slowly to the reaction mixture, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized to give 6β,16α-dimethyl-4,9(11)-pregnadiene-17α-21-diol-3,20 - dione 21-acetate. A suspension of 330 mg. of 6β,16α-dimethyl-4,9(11)-pregnadiene-17α,21-diol-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two-and-one-half hours during which time the solid material slowly dissolves. The resulting yellow solution is treated with 1.0 ml. of allyl alcohol to discharge the color and the remaining N-bromo-succinimide, and the remaining solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-6β,16α-dimethyl-4-pregnene-11β,17α,21 - triol - 3,20-dione 21-acetate.

A solution of 210 mg. of 9α-bromo-6β,16α-dimethyl-4-pregnene-11β,17α,21-triol-3,20-dione 21-acetate and 240 mg. of potassium acetate in 10 ml. of absolute ethanol is heated under reflux for two hours. The reaction mixture is cooled to room temperature, evaporated in vacuo to a small volume, and diluted with water. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 6β,16α-dimethyl-9,11-epoxy-4-pregnene-17α,21-diol-3,20-dione 21-acetate.

To a solution of 83 mg. of anhydrous hydrogen fluoride in 4.7 ml. of ice-cold alcohol-free chloroform is added an ice-cold solution of 416 mg. of 6β,16α-dimethyl-9,11-epoxy-4-pregnene-17α,21-diol-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 6β,16α-dimethyl-9α-fluoro-4-pregnene-11β,17α,21-triol-3,20-dione 21-acetate. Fifty milligrams of 6β,16α-dimethyl-9α-fluoro-4-pregnene-11β,17α,21-triol-3,20-dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6β,16α-dimethyl-9α-fluoro-4-pregnene-11β,17α,21-triol-3,20-dione.

To a solution of 100 mg. of 6β-16α-dimethyl 9α-fluoro-4-pregnene-11β,17α,21-triol-3,20-dione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated, using partition chromatography on diatomaceous silica (Supercel), to give 6β,16α, dimethyl-9α-fluoro-1,4-pregnadiene-11β,17α,21-triol - 3,20-dione 21-acetate. This material is hydrolyzed using 1 N methanolic potassium hydroxide in benzene as described above for the hydrolysis of 6β,16α-dimethyl-9α-fluoro-4-pregnene-11β,17α,21-triol-3,20-dione 21-acetate to give 6β,16α-dimethyl-9α-fluoro-1,4 - pregnadiene - 11β,17α,21-triol-3,20-dione.

Example 15

The procedure of Example 6 is repeated but using, in place of the 6α,16α-dimethyl-9α-fluoro-4-pregnene-11β,17α,21-triol-3,20-dione 21-acetate employed in that example, 400 mg. of 6β,16α-dimethyl-9α-fluoro-4-pregnene-11β,17α,21-triol-3,20-dione 21-acetate, which can be prepared as described in Example 14 hereinabove. In accordance with this procedure there are obtained as products 6β,16α-dimethyl-9α-fluoro-4-pregnene-17α,21-diol-3,11,20-trione 21-acetate; 6β,16α-dimethyl-9α-fluoro-4-pregnene-17α,21-diol-3,11,20-trione; 6β,16α-dimethyl-9α-fluoro-1,4-pregnadiene-17α,21-diol-3,11,20-trione 21-acetate and 6β,16α-dimethyl-9α-fluoro-1,4-pregnadiene-17α,21-diol-3,11,20-trione, respectively.

Example 16

10 grams of 16β-methyl-4-pregnene-17α,21-diol-3,11,20-trione are dissolved in 400 cc. of chloroform. To this solution is added a mixture of 100 cc. of concentrated aqueous hydrochloric acid and 100 cc. of 37% aqueous formaldehyde solution. The resulting mixture is stirred for a period of approximately 3 days at room temperature. The chloroform layer is separated, washed with sodium bicarbonate solution until neutral, then with water, dried over anhydrous sodium sulfate, and evaporated to dryness in vacuo. The residual crude material is purified by crystallization from a mixture of methylene chloride and methanol to give 17α,20,20,21-bismethylenedioxy-16β-methyl-4-pregnene-3,11-dione.

10 grams of 17α,20,20,21-bismethylenedioxy-16β-methyl-4-pregnene-3,11-dione are dissolved in 500 cc. of benzene, to the solution is added 25 cc. ethylene glycol and 1 gram of p-toluenesulfonic acid, and the resulting mixture is heated under reflux for a period of approximately 15 hours. The reaction solution is cooled, washed with aqueous sodium bicarbonate solution, dried over anhydrous sodium sulfate, and evaporated to dryness in vacuo. The residual crude material is adsorbed from its solution in benzene on 250 g. of acid-washed alumina, and the resulting adsorbate is eluted utilizing mixtures of ether-petroleum ether to give 3-ethylenedioxy-17α,20,20,21-bismethylenedioxy-16β-methyl-5-pregnene-11-one.

A mixture of 10 grams of 3-ethylenedioxy-17α,20,20,-21-bismethylenedioxy-16β-methyl-5-pregnene-11-one, 4.3 g. perbenzoic acid and 230 cc. benzene is allowed to stand at room temperature for a period of about 2 days. A portion of the epoxide product, which precipitates, is separated from the reaction solution by decantation, and the decanted solution is washed with saturated aqueous sodium bicarbonate solution and then dried over anhydrous sodium sulfate. The dried solution is then evaporated in vacuo, and the residual epoxide product is combined with the epoxide product originally separated from the reaction mixture to give 3-ethylenedioxy-17α,20,20,21-bismethylenedioxy-16β-methyl-5,6-epoxy-pregnane-11-one.

The latter product is dissolved in 200 cc. of substantially anhydrous formic acid and the resulting solution is allowed to stand at room temperature for a period of about 2½ hours. The reaction solution is poured into water, and the aqueous mixture is extracted with chloroform. The chloroform solution is washed with saturated aqueous sodium bicarbonate solution, dried over anhydrous sodium sulfate, and evaporated in vacuo to give a mixture of 17α,20,20,21-bismethylenedioxy-16β-methyl-6-formyloxy-pregnane-5-ol-3,11-dione and 17α,20,20,21-bismethylenedioxy - 16β - methyl - 5 - formyloxy - pregnane-6-ol-3,11-dione.

This mixture of 5-formyloxy and 6-formyloxy derivatives is dissolved in about 850 cc. of methanol, to this solution is added a solution containing about 17 grams of potassium hydroxide in 80 cc. of water, and the resulting mixture is heated under reflux in a nitrogen atmosphere for a period of approximately ½ hour. The reaction solution is cooled, neutralized with about 23 cc. of acetic acid and evaporated in vacuo to a small volume. The concentrated solution is poured into water and the aqueous mixture is extracted with chloroform. The chloroform extract is washed with aqueous sodium bicarbonate solution, dried over anhydrous sodium sulfate, and evaporated to dryness in vacuo. The residual material is crystallized from methanol to give 17α,20,20,21-bismethylenedioxy-16β-methyl-allopregnane-3,6,11-trione.

A solution containing about 5 grams of 17α,20,20,-21 - bismethylenedioxy - 16β - methyl - allopregnane - 3,-6,11-trione and 0.1 g. of p-toluenesulfonic acid in 120 cc. butanone dioxolane is heated under reflux for a period of about 10 minutes. The reaction solution is cooled to about 0–5° C., diluted with chloroform, and the resulting solution is washed with aqueous sodium bicarbonate solution and dried over anhydrous sodium sulfate. The resulting dried solution is evaporated to dryness in vacuo, and the residual material is slurried with ether, recovered by filtration and then dried to give 3-ethylenedioxy-17α,-20,20,21 - bismethylenedioxy - 16β - methyl - allopregnane-6,11-dione.

A solution containing about 5 grams of 3-ethylenedioxy - 17α,20,20,21 - bismethylenedioxy - 16β - methyl-allopregnane-6,11-dione in 70 cc. of benzene is added, with stirring over a period of approximately 10 minutes, to an ethereal solution containing the methyl magnesium iodide, prepared from 5 cc. of methyl iodide and 0.5 gram of magnesium turnings, dissolved in 50 cc. of ether. The reaction mixture is allowed to stir for an additional ½ hour period, and the resulting solution is decomposed with 70 cc. of water. About 170 cc. of benzene is added to the aqueous mixture and the layers are separated. The aqueous layer is extracted with two 100 cc.-portions of chloroform, and the organic layers are combined, dried over anhydrous sodium sulfate, and evaporated to dryness in vacuo to give 3-ethylenedioxy-17α,20,20,21-bismethylenedioxy-6α,16β-dimethyl-allopregnane-6β-ol-11-one.

A solution containing 5.5 cc. of freshly distilled thionyl chloride in 26 cc. of cold anhydrous pyridine is added dropwise, with stirring, to a solution of 5.0 g. of 3-ethylenedioxy - 17α,20,20,21 - bismethylenedioxy - 6α,16β - dimethyl-allopregnane-6β-ol-11-one in 32 cc. of anhydrous pyridine, while maintaining the temperature of the reaction mixture at approximately 40° C. The reaction solution is stirred for an additional 30-minute period following the addition of the thionyl chloride reagent, and the reaction mixture is then cooled to about 0–5° C. and poured into 180 cc. ice water. The aqueous mixture is extracted with chloroform, and the chloroform extract is neutralized, dried over anhydrous sodium sulfate, and evaporated to dryness in vacuo. The residual material, dissolved in benzene, is chromatographed on 150 grams of acid-washed alumina; elution of the resulting adsorbate with mixtures of petroleum ether and ether gives 3-ethylenedioxy-17α,20,20,21 - bismethylenedioxy - 6,16β - dimethyl - 5 - pregnene-11-one.

A solution containing about 5 grams of 3-ethylenedioxy-17α-20,20,21 - bismethylenedioxy - 6,16β-dimethyl-5-pregnene-11-one, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21-bismethylenedioxy - 6α,16β - dimethyl - 4 - pregnene-3,11-dione.

About 0.1 gram of 17α,20,20,21-bismethylenedioxy-6α,16β-dimethyl-4-pregnene-3,11-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16β-dimethyl-4-pregnene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16β-dimethyl-4-pregnene-17α,21-diol-3,11,20-trione 21-acetate.

To a solution of 100 mg. of 6α,16β-dimethyl-4-pregnene-17α,21-diol-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Supercel) to give 6α,16β-dimethyl-1,4-pregnadiene-17α,21-diol-3,11,20-trione 21-acetate.

Example 17

About 400 mg. of 3-ethylenedioxy-17α,20,20,21-bismethylenedioxy-16β-methyl-5,6-epoxy-pregnane-11-one is dissolved in about 100 ml. of benzene, and the solution purged with nitrogen. To the resulting solution is added about 3.7 ml. of a 3-molar solution of methyl magnesium bromide, and the resulting mixture is stirred at a temperature of about 70° C. in a nitrogen atmosphere for a period of about 5 hours. The reaction solution is cooled to about 0–5° C., and approximately 9 g. of ammonium chloride in 90 ml. of water is added over a 20-minute period. The layers are separated, and the aqueous layer extracted with a small portion of benzene. The benzene extracts are combined, washed with three 25-ml. portions of water, dried over magnesium sulfate, and evaporated to dryness in vacuo to give 3-ethylenedioxy-17α,20,20,21-bismethylenedioxy-6β,16β-dimethylallopregnane-5α-ol-11-one.

Approximately 100 mg. of 3-ethylenedioxy-17α,20,20, 21 - bismethylenedioxy - 6β,16β - dimethyl - allopregnane-5α-ol-11-one is dissolved in about 5 ml. of methanol, and the solution is purged with nitrogen. To this solution is then added 0.4 ml. of an 8% aqueous sulfuric acid solution, and the resulting mixture is heated under reflux for a period of about 35 minutes in a nitrogen atmosphere. At the end of this reflux period, the reaction solution is cooled to 0–5° C., and to the solution is slowly added, over a 10-minute period, a solution of approximately 0.4 g. of sodium carbonate in 12 ml. of water. The resulting slurry is cooled, and the precipitated material is recovered and dried to give 17α,20,20,21-bismethylenedioxy-6β,16β-dimethyl-allopregnane-3,11-dione-5α-ol.

About 100 mg. of 17α,20,20,21-bismethylenedioxy-6β,16β-dimethyl-allophegnane-3,11-dione-5α-ol is mixed with about 35 cc. of an 0.25% solution of potassium hydroxide in methanol; the resulting mixture is heated under reflux for a period of approximately 2 hours under a nitrogen atmosphere. The reaction mixture is then diluted with water, and the aqueous mixture extracted with ethyl acetate. The ethyl acetate extracts are dried, evaporated to dryness, and the residual material is subjected to chromatographic purification using about 10 g. of washed alumina, utilizing benzene, and mixtures of benzene and ether, as the eluting solvents. The product obtained by evaporation of the ether-rich fractions is recrystallized from mixtures of ethyl acetate and ether to give substantially pure 17α,20,20,21 - bismethylenedioxy - 6β, 16β-dimethyl-4-pregnene-3,11-dione.

About 0.1 gram of 17α,20,20,21-bismethylenedioxy-6β,16β-dimethyl-4-pregnene-3,11-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6β,16β-dimethyl-4-pregnene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6β,16β - dimethyl-4-pregnene-17α,21-diol-3,11,20-trione 21-acetate.

To a solution of 100 mg. of 6β,16β-dimethyl-4-pregnene-17α,21-diol-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Supercel) to give 6β,16β-dimethyl-1,4-pregnadiene-17α,21-diol-3,11,20-trione 21-acetate.

Example 18

The procedure of Example 2 is repeated but using, in place of the 17α,20,20,21-bismethylenedioxy-6α,16α-dimethyl-4-pregnene-3,11-dione starting material there employed, 100 mg. of 17α,20,20,21-bismethylenedioxy-6α, 16β-dimethyl-4-pregnene-3,11-dione, which can be prepared as described in Example 16 hereinabove. In accordance with this procedure there are obtained, via the intermediate formation of 17α,20,20,21-bismethylenedioxy-6α,16β-dimethyl-1,4-pregnadiene-3,11-dione, the final products 6α,16β-dimethyl - 1,4 - pregnadiene-17α,21-diol-3,11,20-trione and 6α,16β-dimethyl-1,4-pregnadiene-17α, 21-diol-3,11,20-trione 21-acetate.

Example 19

The procedure of Example 2 is repeated but using, in place of the 17α,20,20,21-bismethylenedioxy-6α,16α-dimethyl-4-pregnene-3,11-dione starting material there employed, 100 mg. of 17α,20,20,21-bismethylenedioxy-6β,16β-dimethyl-4-pregnene-3,11-dione, which can be prepared as described in Example 17 hereinabove. In accordance with this procedure there are obtained, via the intermediate formation of 17α,20,20,21-bismethylenedioxy-6β,16β-dimethyl-1,4-pregnadiene-3,11-dione, the final products 6β,16β-dimethyl-1,4-pregnadiene - 17α,21 - diol-3,11,20 - trione and 6β,16β - dimethyl - 1,4-pregnadiene-17α,21-diol-3,11,20-trione 21-acetate.

Example 20

About 5 grams of 3-ethylenedioxy-17α,20,20,21-bismethylenedioxy-6,16β-dimethyl-5-pregnene-11-one, which can be prepared as described in Example 16 hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy - 17α,20,20,21 - bismethylenedioxy-6,16β-dimethyl-5-pregnene-11β-ol.

A solution containing about 5 g. of 3-ethylenedioxy-17α,20,20,21 - bismethylenedioxy-6,16β-dimethyl-5-pregnene-11β-ol, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21-bismethylenedioxy - 6α,16β-dimethyl-4-pregnene-11β-ol-3-one.

About 0.1 gram of 17α,20,20,21-bismethylenedioxy 6α,16β-dimethyl-4-pregnene-11β-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16β - dimethyl - 4-pregnene-11β,17α,21-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16β-dimethyl-4-pregnene-11β,17α,21-triol-3,20-dione 21-acetate.

To a solution of 100 mg. of 6α,16β-dimethyl-4-pregnene-11β,17α,21-triol-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight then centrifuged and the clear benzene solution is evaporated in vacuo. The residual material thus obtained is separated using partition chromatography on diatomaceous silica (Supercel) to give 6α,16β - dimethyl - 1,4-pregnadiene-11β,17α,21-triol-3,20-dione 21-acetate.

*Example 21*

About 5 g. of 3-ethylenedioxy-17α,20,20,21-bismethylenedioxyl - 6β,16β - dimethyl - allopregnane-11-one-5α-ol, which can be prepared as described in Example 17 hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-17α,20,20,21-bismethylenedioxy - 6β,16β - dimethyl-allopregnane-5α,11β-diol.

Approximately 100 mg. of 3-ethylenedioxy-17α,20,20,21 - bismethylenedioxy - 6β,16β - dimethyl-allopregnane-5α,11β-diol is dissolved in about 5 ml. of methanol, and the solution is purged with nitrogen. To this solution is then added 0.4 ml. of an 8% aqueous sulfuric acid solution, and the resulting mixture is heated under reflux for a period of about 35 minutes in a nitrogen atmosphere. At the end of this reflux period, the reaction solution is cooled to 0–5° C., and to the solution is slowly added, over a 10-minute period, a solution of approximately 0.4 g. of sodium carbonate in 12 ml. of water. The resulting slurry is cooled, and the precipitated material is recovered and dried to give 17α,20,20,21-bismethylenedioxy-6β,16β-dimethyl-allopregnane-5α,11β-diol-3-one.

About 100 mg. of 17α,20,20,21-bismethylenedioxy-6β-16β-dimethyl-allopregnane-5α,11β-diol-3-one is mixed with about 35 cc. of an 0.25% solution of potassium hydroxide in methanol, the resulting mixture is heated under reflux for a period of approximately 2 hours under a nitrogen atmosphere. The reaction mixture is then diluted with water, and the aqueous mixture extracted with ethyl acetate. The ethyl acetate extracts are dried, evaporated to dryness, and the residual material is subjected to chromatographic purification using about 10 g. of washed alumina, utilizing benzene, and mixtures of benzene and ether, as the eluting solvents. The product obtained by evaporation of the ether-rich fractions is recrystallized from mixtures of ethyl acetate and ether to give substantially pure 17α,20,20,21 - bismethylenedioxy - 6β,16β - dimethyl-4-pregnene-11β-ol-3-one.

About 0.1 gram of 17α,20,20,21-bismethylenedioxy-6β,16β-dimethyl-4-pregnene-11β-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6β,16β - dimethyl - 4 - pregnene - 11β,17α,21 - triol - 3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6β,16β-dimethyl-4-pregnene-11β,17α,21-triol-3,20-dione 21-acetate.

To a solution of 100 mg. of 6β,16β-dimethyl-4-pregnene-11β,17α,21-diol-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight then centrifuged and the clear benzene solution is evaporated in vacuo. The residual material thus obtained is separated using partition chromatography on diatomaceous silica (Supercel) to give 6β,16β-dimethyl-1,4-pregnadiene-11β,17α,21-triol-3,20-dione 21-acetate.

*Example 22*

The procedure of Example 5 is repeated but using, in place of the 6α,16α-dimethyl-4-pregnene-11β,17α,21-triol-3,20-dione 21-acetate starting material there employed, about 435 mg. of 6α,16β-dimethyl-4-pregnene-11β,17α,21-triol-3,20-dione 21-acetate, which can be prepared as described in Example 20 hereinabove. In accordance with this procedure, there are obtained, via the intermediate formation of 6α,16β-dimethyl-4,9(11)-pregnadiene-17α,21-diol-3,20-dione 21-acetate; 9α-bromo-6α,16β-dimethyl-4-pregnene-11β,17α,21-triol-3,20-dione 21-acetate and 6α,16β-dimethyl-9,11-epoxy-4-pregnene-17α,21-diol-3,20-dione 21-acetate, as final products 6α,16β-dimethyl-9α-fluoro-4-pregnene-11β,17α,21-triol-3,20-dione 21-acetate; 6α,16β-dimethyl-9α-fluoro-4-pregnene-11β,17α,21-triol-3,20-dione; 6α,16β-dimethyl-9α-fluoro-1,4-pregnadiene-11β,17α,21-triol-3,20-dione 21-acetate and 6α,16β-dimethyl-9α-fluoro-1,4-pregnadiene-11β,17α,21-triol-3,20-dione, respectively.

*Example 23*

The procedure of Example 5 is repeated, but using, in place of 6α,16α-dimethyl-4-pregnene-11β,17α,21-triol-3,20-dione 21-acetate starting material there employed, about 435 mg. of 6β,16β-dimethyl-4-pregnene-11β,17α,21-triol-3,20-dione 21-acetate, which can be prepared as described in Example 21 hereinabove. In accordance with this procedure, there are obtained, via the intermediate formation of 6β,16β-dimethyl-4,9(11)-pregnadiene-17α,21-diol-3,20-dione 21-acetate; 9α-bromo-6β,16β-dimethyl-4-pregnene-11β,17α,21-triol-3,20-dione 21-acetate and 6β,16β-dimethyl-9,11-epoxy-4-pregnene-17α,21-diol-3,20-dione 21-acetate, as final products 6β,16β-dimethyl-9α-fluoro-4-pregnene-11β,17α,21-triol-3,20-dione 21-acetate; 6β,16β-dimethyl-9α-fluoro-4-pregnene-11β,17α,21-triol-3,20-dione; 6β,16β-dimethyl-9α-fluoro-1,4-pregnadiene-11β,17α,21-triol-3,20-dione 21-acetate and 6β,16β-dimethyl-9α-fluoro-1,4-pregnadiene-11β,17α,21-triol-3,20-dione, respectively.

*Example 24*

The procedure of Example 6 is repeated but using, in place of the 6α,16α-dimethyl-9α-fluoro-4-pregnene-11β,17α,21-triol-3,20-dione 21-acetate starting material there employed, 400 mg. of 6α,16β-dimethyl-9α-fluoro-4-pregnene-11β,17α,21-triol-3,20-dione 21-acetate, which can be prepared as described in Example 22 hereinabove. In accordance with this procedure there are obtained as final products 6α,16β-dimethyl-9α-fluoro-4-pregnene-17α,21-diol-3,11,20-trione 21-acetate; 6α,16β-dimethyl-9α-fluoro-4-pregnene-17α,21-diol-3,11,20-trione; 6α,16β-dimethyl-9α-fluoro-1,4-pregnadiene-17α,21-diol-3,11,20-trione 21-acetate and 6α,16β-dimethyl-9α-fluoro-1,4-pregnadiene-17α,21-diol-3,11,20-trione, respectively.

*Example 25*

The procedure of Example 6 is repeated but using, in place of the 6α,16α-dimethyl-9α-fluoro-4-pregnene-11β,17α,21-triol-3,20-dione 21-acetate starting material there employed, 400 mg. of 6β,16β-dimethyl-9α-fluoro-4-pregnene-11β,17α,21-triol-3,20-dione 21-acetate, which can be prepared as described in Example 23 hereinabove. In accordance with this procedure there are obtained as final products, 6β,16β-dimethyl-9α-fluoro-4-pregnene-17α,21-diol-3,11,20-trione 21-acetate; 6β,16β-dimethyl-9α-fluoro-4-pregnene-17α,21-diol-3,11,20-trione; 6β,16β-dimethyl-9α-fluoro-1,4-pregnadiene-17α,21-diol-3,11,20-trione 21-acetate and 6β,16β-dimethyl-9α-fluoro-1,4-pregnadiene-17α,21-diol-3,11,20-trione, respectively.

*Example 26*

A suspension containing 300 mg. of 17α,21-dihydroxy-6α,16α-dimethyl-4-pregnene-3,11,20-trione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 17α,21-dihydroxy-6,16α-dimethyl-4,6-pregnadiene-3,11,20-trione 21-acetate. This product is then hydrolyzed by treatment with a solution of potassium bicarbonate in aqueous methanol to form 17α,21-dihydroxy-6,16α-dimethyl-4,6-pregnadiene-3,11,20-trione.

In accordance with the above procedure but starting with 17α,21-dihydroxy-6α,16β-dimethyl-4-pregnene-3,11,20-trione 21-acetate there are obtained 17α,21-dihydroxy-6,16β-dimethyl-4,6-pregnadiene-3,11,20-trione and its 21-acetate.

*Example 27*

A suspension containing 300 mg. of 11β,17α,21-trihydroxy-6α,16α-dimethyl-4-pregnene-3,20-dione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 11β,17α,21-trihydroxy-6,16α-4,6-pregnadiene-3,20-dione 21-acetate. This product is then hydrolyzed by treatment with a solution of potassium bicarbonate in aqueous methanol to form 11β,17α,21-trihydroxy-6,16α-dimethyl-4,6-pregnadiene-3,20-dione.

In accordance with the above procedure but starting with 11β,17α,21-trihydroxy-6α,16β-dimethyl-4-pregnene-3,20-dione 21-acetate there are obtained 11β,17α,21-trihydroxy-6,16β-dimethyl-4,6-pregnadiene-3,20-dione and its 21-acetate.

*Example 28*

A suspension containing 300 mg. of 9α-fluoro-11β,17α,21-trihydroxy-6α,16α-dimethyl-4-pregnene-3,20-dione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 9α-fluoro-11β,17α,21-trihydroxy-6,16α-dimethyl-4,6-pregnadiene-3,20-dione 21-acetate. This product is then hydrolyzed by treatment with a solution of potassium bicarbonate in aqueous methanol to form 9α-fluoro-11β,17α,21-trihydroxy-6,16α-dimethyl-4,6-pregnadiene-3,20-dione.

In accordance with the above procedure but starting with 9α-chloro-11β,17α,21-trihydroxy-6α,16α-dimethyl-4-pregnene-3,20-dione 21-acetate, there are obtained the corresponding 9α-chloro-11β,17α,21-trihydroxy-6,16α-dimethyl-4,6-pregnadiene-3,20-dione and its 21-acetate.

In accordance with the above procedure but starting with 9α-fluoro-11β,17α,21-trihydroxy-6α,16α-dimethyl - 4 - pregnene-3,20-dione 21-acetate, there are obtained the corresponding 9α-bromo-11β,17α,21-trihydroxy-6,16α-dimethyl-4,6-pregnadiene-3,20-dione and its 21-acetate.

Similarly, in accordance with the above procedure but starting with 9α-fluoro-11β,17α,21-trihydroxy-6α,16β-dimethyl-4-pregnene-3,20-dione 21-acetate, there is obtained the corresponding 9α-fluoro-11β,17α,21-trihydroxy-6,16β-dimethyl-4,6-pregnadiene-3,20-dione and its 21-acetate.

Similarly, in accordance with the above procedure but starting with 9α-chloro-11β,17α,21-trihydroxy-6α,16β-dimethyl-4-pregnene-3,20-dione 21-acetate, there is obtained the corresponding 9α-chloro-11β,17α,21-trihydroxy-6,16β-dimethyl-4,6-pregnadiene-3,20-dione and its 21-acetate.

Similarly, in accordance with the above procedure but starting with 9α-bromo-11β,17α,21-trihydroxy-6α,16β-dimethyl-4-pregnene-3,20-dione 21-acetate, there is obtained the corresponding 9α-bromo-11β,17α,21-trihydroxy-6,16β-dimethyl-4,6-pregnadiene-3,20-dione and its 21-acetate.

*Example 29*

A suspension containing 300 mg. of 9α-fluoro-17α,21-dihydroxy-6α,16α-dimethyl-4-pregnene - 3,11,20 - trione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 9α-fluoro-17α,21-dihydroxy-6,16α-dimethyl-4,6-pregnadiene-3,11,20 - trione 21-acetate. This product is then hydrolyzed by treatment with a solution of potassium bicarbonate in aqueous methanol to form 9α-fluoro-17α,21-dihydroxy-6,16α-dimethyl-4,6-pregnadiene-3,11,20-trione.

In accordance with the above procedure but starting with 9α-chloro-17α,21-dihydroxy-6α,16α-dimethyl-4-pregnene-3,11,20-trione 21-acetate there are obtained the corresponding 9α-chloro-17α,21-dihydroxy 6,16α-dimethyl-4,6-pregnadiene-3,11,20-trione and its 21-acetate.

In accordance with the above procedure but starting with 9α-bromo-17α,21-dihydroxy-6α,16α-dimethyl-4-pregnene-3,11,20-trione 21-acetate there are obtained the corresponding 9α-bromo-17α,21-dihydroxy-6,16α-dimethyl-4,6-pregnadiene-3,11,20-trione and its 21-acetate.

Similarly, in accordance with the above procedure but starting with 9α-fluoro-17α,21-dihydroxy-6α,16β-dimethyl-4-pregnene-3,11,20-trione 21-acetate, there are obtained the corresponding 9α-fluoro-17α,21-dihydroxy-6,16β-dimethyl-4,6-pregnadiene-3,11,20-trione and its 21-acetate.

Similarly, in accordance with the above procedure but starting with 9α-chloro-17α,21-dihydroxy-6α,16β-dimethyl-4-pregnene-3,11,20-trione 21-acetate, there are obtained the corresponding 9α-chloro-17α,21-dihydroxy-6,16β-dimethyl-4,6-pregnadiene-3,11,20-trione and its 21-acetate.

Similarly, in accordance with the above procedure but starting with 9α-bromo-17α,21-dihydroxy-6α,16β-dimethyl-4-pregnene-3,11,20-trione 21-acetate, there are obtained the corresponding 9α-bromo-17α,21-dihydroxy-6,16β-dimethyl-4,6-pregnadiene-3,11,20-trione and its 21-acetate.

*Example 30*

To a solution of 200 mg. of 17α,21-dihydroxy-6,16α-dimethyl-4,6-pregnadiene-3,11,20-trione 21-acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 17α,21-dihydroxy-6,16α-dimethyl-1,4,6-pregnatriene-3,11,20-trione 21-acetate. This product is then hydrolyzed by treatment with a solution of potassium bicarbonate in aqueous methanol to form 17α,21-dihydroxy-6,16α-dimethyl-1,4,6-pregnatriene-3,11,20-trione.

In accordance with the above procedure but starting with 17α,21 - dihydroxy - 6,16β - dimethyl - 4,6 - pregnadiene-3,11,20-trione 21-acetate there are obtained 17α,21 - dihydroxy - 6,16β - dimethyl - 1,4,6 - pregnatriene-3,11,20-trione and its 21-acetate.

*Example 31*

To a solution of 200 mg. of 11β,17α,21-trihydroxy-6,16α - dimethyl - 4,6 - pregnadiene - 3,20 - dione 21-acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 11β,17α,21-trihydroxy - 6,16α - dimethyl - 1,4,6 - pregnatriene - 3,20-dione 21-acetate. This product is then hydrolyzed by treatment with a solution of potassium bicarbonate in aqueous methanol to form 11β,17α,21-trihydroxy-6,16α-dimethyl-1,4,6-pregnatriene-3,20-dione.

In accordance with the above procedure but starting with 11β,17α,21 - trihydroxy - 6,16β - dimethyl - 4,6-pregnadiene-3,20-dione 21-acetate there are obtained 11β,17α,21 - trihydroxy - 6,16β - dimethyl - 1,4,6 - pregnatriene-3,20-dione and its 21-acetate.

*Example 32*

To a solution of 200 mg. of 9α - fluoro - 11β,17α,21-trihydroxy - 6,16α - dimethyl - 4,6 - pregnadiene - 3,20-dione 21-acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 9α-fluoro-11β,17α,21 - trihydroxy - 6,16α - dimethyl - 1,4,6 - pregnatriene-3,20-dione 21-acetate. This product is then hydrolyzed by treatment with a solution of potassium bicarbonate in aqueous methanol to form 9α-fluoro-11β,17α,21 - trihydroxy - 6,16α - dimethyl - 1,4,6 - pregnatriene-3,20-dione.

In accordance with the above procedure but starting with 9α - chloro - 11β,17α,21 - trihydroxy - 6,16α - dimethyl-4,6-pregnadiene-3,20-dione 21-acetate there are obtained 9α - chloro - 11β,17α,21 - trihydroxy - 6,16α - dimethyl - 1,4,6 - pregnatriene - 3,20 - dione and its 21-acetate.

Similarly, in accordance with the above procedure but starting with 9α - bromo - 11β,17α,21 - trihydroxy - 6, 16α - dimethyl - 4,6 - pregnadiene - 3,20 - dione 21-acetate there are obtained 9α-bromo-11β,17α,21-trihydroxy-6,16α - dimethyl - 1,4,6 - pregnatriene - 3,20 - dione and its 21-acetate.

In accordance with the above procedure but starting with 9α - fluoro - 11β,17α,21 - trihydroxy - 6,16β - dimethyl - 4,6 - pregnadiene - 3,20 - dione 21-acetate there are obtained 9α - fluoro - 11β,17α,21 - trihydroxy - 6,16β - dimethyl - 1,4,6 - pregnatriene - 3,20 - dione and its 21-acetate.

In accordance with the above procedure but starting with 9α - chloro - 11β,17α,21 - trihydroxy - 6,16β - dimethyl-4,6-pregnadiene-3,20-dione 21-acetate there are obtained 9α - chloro - 11β,17α,21 - trihydroxy - 6,16β-dimethyl-1,4,6-pregnatriene-3,20-dione and its 21-acetate.

In accordance with the above procedure but starting with 9α - bromo - 11β,17α,21 - trihydroxy - 6,16β - dimethyl-4,6-pregnadiene-3,20-dione 21-acetate there are obtained 9α - bromo - 11β,17α,21 - trihydroxy - 6,16β-dimethyl-1,4,6-pregnatriene-3,20-dione and its 21-acetate.

*Example 33*

To a solution of 200 mg. of 9α-fluoro-17α,21-dihydroxy - 6,16α - dimethyl - 4,6 - pregnadiene - 3,11,20-trione 21-acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 9α-fluoro-17α,21 - dihydroxy - 6,16α - dimethyl - 1,4,6 - pregnatriene-3,11,20-trione 21-acetate. This product is then hydrolyzed by treatment with a solution of potassium bicarbonate in aqueous methanol to form 9α-fluoro-17α,21 - dihydroxy - 6,16α - dimethyl - 1,4,6 - pregnatriene-3,11,20-trione.

In accordance with the above procedure but starting with 9α-chloro-17a,21-dihydroxy-6,16a-dimethyl-4,6-pregnadiene-3,11,20-trione 21-acetate there are obtained 9α-chloro - 17α,17-dihydroxy-6,16a-dimethyl-1,4,6-pregnatriene-3,11,20-trione and its 21-acetate.

Similarly, in accordance with the above procedure but starting with 9α-bromo-17α,21-dihydroxy-6,16a-dimethyl-4,6-pregnadiene-3,11,20-trione 21-acetate there are obtained 9α-bromo-17α,21-dihydroxy-6,16a-dimethyl-1,4,6-pregnatriene-3,11,20-trione and its 21-acetate.

In accordance with the above procedure but starting with 9α-fluoro-17α,21-dihydroxy-6,16β-dimethyl-4,6-pregnadiene-3,11-20-trione 21-acetate there are obtained 9α-fluoro - 17α,21-dihydroxy-6,16β-dimethyl-1.4.6-pregnatriene-3,11,20-trione and its 21-acetate.

In accordance with the above procedure but starting with 9α-chloro-17α,21-dihydroxy-6,16β-dimethyl-4,6-pregnadiene-3,11-20-trione 21-acetate there are obtained 9α-chloro - 17α,21-dihydroxy-6,16β-dimethyl-1,4,6-pregnatriene-3,11-20-trione and its 21-acetate.

In accordance with the above procedure but starting with 9α-bromo-17α,21-dihydroxy-6,16β-dimethyl-4,6-pregnadiene-3,11,20-trione 21-acetate there are obtained 9α-bromo - 17α,21-dihydroxy-6,16β-dimethyl-1,4,6-pregnatriene-3,11,20-trione and its 21-acetate.

*Example 34*

To a solution of 85 mg. of 17α,21-dihydroxy-6,16α-dimethyl-4,6-pregnadiene-3,11,20-trione in 0.5 ml. of pyridine, cooled to 0° C., is added 0.03 ml. of methane-sulfonyl chloride. The resulting mixture is allowed to stand at a temperature of approximately 0° C., for a period of approximately 1 hour. Water is then added to the reaction mixture and the crystalline precipitate which forms is recovered, washed with water, and dried to give 17α,21-dyhydroxy - 6,16α-dimethyl-4,6-pregnadiene-3,11,20-trione 21-methane sulfonate.

To 180 mg. of 17α,21-dihydroxy-6,16α-dimethyl-4,6-pregnadiene-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-17α-hydroxy-6,16α-dimethyl-4,6-pregnadiene-3,11,20-trione.

This 21 - iodo-17α-hydroxy-6,16α-dimethyl-4,6-pregnadiene-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 17α-hydroxy-6,16α-dimethyl-4,6-pregnadiene-3,11,20-trione.

In accordance with the above procedures but starting with 17α,21-dihydroxy-6,16β-dimethyl-4,6-pregnadiene-3,11,20-trione there is obtained, following the reaction with methane-sulfonyl chloride, 17α,21 - dihydroxy-6,16β-dimethyl-4,6-pregnadiene-3,11,20-trione 21-methane sulfonate which upon reaction with sodium iodide in acetone is converted to 21 - iodo-17α-hydroxy-6,16β-dimethyl-4,6-pregnadiene-3,11,20-trione, which upon reaction with sodium bisulfite is converted to 17α-hydroxy-6,16β-dimethyl-4,6-pregnadiene-3,11,20-trione.

*Example 35*

To a solution of 85 mg. of 17α-21-dihydroxy-6,16α-dimethyl-1,4,6-pregnatriene-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 17α,21-dihydroxy - 6,16α-dimethyl-1,4,6-pregnatriene-3,11,20-trione 21-methane sulfonate.

To 180 mg. of 17α,21-dihydroxy-6,16α-dimethyl-1,4,6-pregnatriene-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-17α - hydroxy-6,16α-dimethyl-1,4,6-pregnatriene-3,11,20-trione.

This 21-iodo-17α-hydroxy-6,16α-dimethyl-1,4,6-pregnatriene-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 17α - hydroxy-6,16α-dimethyl-1,4,6-pregnatriene-3,11,20-trione.

In accordance with the above procedures but starting with 17α,21-dihydroxy-6,16β-dimethyl-1,4,6-pregnatriene-3,11,20-trione there is obtained, following the reaction with methane-sulfonyl chloride, 17α,21-dihydroxy-6,16β-dimethyl-1,4,6-pregnatriene-3,11,20-trione 21-methane sulfonate, which upon reaction with sodium iodide in acetone is converted to 21-iodo-17α-hydroxy-6-16β-dimethyl-1,4,6-pregnatriene-3,11,20-trione, which, upon reaction with sodium bisulfite, is converted to 17α-hydroxy-6,16β-dimethyl-1,4,6-pregnatriene-3,11,20-trione.

*Example 36*

To a solution of 85 mg. of 11β,17α,21-trihydroxy-6,16α-dimethyl-4,6-pregnadiene-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 11β,17α,21-trihydroxy - 6,16α-dimethyl-4,6-pregnadiene-3,20-dione 21-methane sulfonate.

To 180 mg. of 11β, 17α,21-trihydroxy-6,16α-dimethyl-4,6-pregnadiene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-11β,17α-dihydroxy-6,16α-dimethyl-4,6-pregnadiene-3,20-dione.

This 21 - iodo - 11β,17α-dihydroxy-6,16β-dimethyl-4,6-pregnadiene-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 11β,17α-dihydroxy-6,16α-dimethyl-4,6-pregnadiene-3,20-dione.

In accordance with the above procedure but starting with 11β,17α,21 - trihydroxy - 6,16β-dimethyl-4,6-pregnadiene-3,20-dione there is obtained, following the reaction with methane-sulfonyl chloride, 11β-17α,21-trihydroxy-6,16β-dimethyl-4,6-pregnadiene-3,20-dione 21-methane sulfonate, which upon reaction with sodium iodide in acetone is converted to 21 - iodo - 11β,17α-dihydroxy-6,16β-dimethyl-4,6-pregnadiene-3,20-dione, which, upon reaction with sodium bisulfite, is converted to 11β,17α-dihydroxy-6,16β-dimethyl-4,6-pregnadiene-3,20-dione.

Example 37

To a solution of 85 mg. of 11β,17α,21-trihydroxy-6,16α-dimethyl-1,4,6-pregnatriene-3,20-dione in 0.5 ml. of pyridine, cooled to 0° C., is added 0.03 ml. of methane-sulfonyl chloride. The resulting mixture is allowed to stand for a temperature of approximately 0° C. for a period of approximately 1 hour. Water is then added to the reaction mixture and the crystalline precipitate which forms is recovered, washed with water, and dried to give 11β,17α,21 - trihydroxy - 6,16α-dimethyl-1,4,6-pregnatriene-3,20-dione 21-methane sulfonate.

To 180 mg. of 11β,17α,21-trihydroxy-6,16α-dimethyl-1,4,6-pregnatriene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21 - iodo - 11β,17α-dihydroxy-6,16α-dimethyl-1,4,6-pregnatriene-3,20-dione.

This 21-iodo-11β,17α-dihydroxy-6,16α-dimethyl-1,4,6-pregnatriene-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 11β,17α - dihydroxy-6,16α-dimethyl-1,4,6-pregnatriene-3,20-dione.

In accordance with the above procedures but starting with 11β,17α,21-trihydroxy-6,16β-dimethyl-1,4,6-pregnatriene-3,20-dione there is obtained, following the reaction with methane-sulfonyl chloride, 11β,17α,21-trihydroxy-6,16α - dimethyl-1,4,6-pregnatriene-3,20-dione 21-methane sulfonate which, upon reaction with sodium iodide in acetone is converted to 21-iodo 11β,17α-dihydroxy-6,16β-dimethyl-1,4,6-pregnatriene-3,20-dione which, upon reaction with sodium bisulfite, is converted to 11β,17α-dihydroxide-6,16β-dimethyl-1,4,6-pregnatriene-3,20-dione.

Example 38

To a solution of 85 mg. of 9α-fluoro-11β,17B,21-trihydroxy-6,16α-dimethyl-4,6-pregnadiene-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hours. Water is then added to the reaction mixture and the crystalline precipitate which forms is recovered, washed with water, and dried to give 9α-fluoro-11β,17α,21-trihydroxy-6,16α-dimethyl-4,6-pregnadiene-3,20-dione 21-methane sulfonate.

To 180 mg. of 9α-fluoro-11β,17α,21-trihydroxy-6,16α-dimethyl - 4,6-pregnadiene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-21-iodo-11β,17α-dihydroxy-6,16α-dimethyl-4,6-pregnadiene-3,20-dione.

This 9α - fluoro - 21 - iodo-11β,17α-dihydroxy-6,16α-dimethyl-4,6-pregnadiene-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro,11β,17α-dihydroxy-6,16α-dimethyl-4,6-pregnadiene-3,20-dione.

In accordance with the above procedure but starting with 9α-chloro-11β,17α-21-trihydroxy-6,16α-dimethyl-4,6-pregnadiene-3,20-dione there is obtained, following the reaction with methane sulfonyl chloride, 9α-chloro-11β,17α,21 - trihydroxy-6,16α-dimethyl-4,6-pregnadiene-3,20-dione 21-methane sulfonate which, upon reaction with sodium iodide in acetone is converted to 9α-chloro-21-iodo - 11β,17α-dihydroxy-6,16α-dimethyl-4,6-pregnadiene-3,20-dione which, upon reaction with sodium bisulfite is converted to 9α-chloro-11β,17α-dihydroxy-6,16α-dimethyl-4,6-pregnadiene-3,20-dione.

In accordance with the above procedure but starting with 9α-bromo-11β,17α-21-trihydroxy-6,16α-dimethyl-4,6-pregnadiene-3,20-dione there is obtained, following the reaction with methane-sulfonyl chloride, 9α-bromo-11β, 17α,21 - trihydroxy-6,16α-dimethyl-4,6-pregnadiene-3,20-dione 21-methane sulfonate which, upon reaction with sodium iodide in acetone is converted to 9α-bromo-21-iodo - 11β,17α-dihydroxy-6,16α-dimethyl-4,6-pregnadiene-3,20-dione which, upon reaction with sodium bisulfite is converted to 9α - bromo - 11β,17α - dihydroxy - 6,16α-dimethyl-4,6-pregnadiene-3,20-dione.

Similarly, in accordance with the above procedure but starting with 9α - fluoro-11β,17α,21-trihydroxy-6,16β-dimethyl-4,6-pregnadiene-3,20-dione, there is obtained following the reaction with methane-sulfonyl chloride 9α-fluoro - 11β,17α-21-trihydroxy-6,16β-dimethyl-4,6-pregnadiene-3,20-dione 21-methane sulfonate which, upon reaction with sodium iodide in acetone is converted to 9α-fluoro - 21 - iodo - 11β,17α - hydroxy-6,16β-dimethyl-4,6-pregnadiene-3,20-dione which, upon reaction with sodium bisulfite, is converted to 9α-fluoro-11β,17α-dihydroxy-6, 16β-dimethyl-4,6-pregnadiene-3,20-dione.

Similarly, in accordance with the above procedure but starting with 9α - chloro-11β,17α,21-trihydroxy-6,16β-dimethyl-4,6-pregnadiene-3,20-dione, there is obtained, following the reaction with methane-sulfonyl chloride 9α-chloro - 11β,17α,21-trihydroxy-6,16β-dimethyl-4,6-pregnadiene-3,20-dione 21-methane sulfonate which, upon reaction with sodium iodide in acetone is converted to 9α-chloro - 21 - iodo-11β,17α-dihydroxy-6,16β-dimethyl-4,6-pregnadiene-3,20-dione which, upon reaction with sodium bisulfite, is converted to 9α-chloro-11β,17α-dihydroxy-6,16β-dimethyl-4,6-pregnadiene-3,20-dione.

Similarly, in accordance with the above procedure but starting with 9α - bromo-11β,17α,21-trihydroxy-6,16β-dimethyl-4,6-pregnadiene-3,20-dione, there is obtained, following the reaction with methane-sulfonyl chloride, 9α-bromo - 11β,17α,21 - trihydroxy-6,16β-dimethyl-4,6-pregnadiene-3,20-dione 21-methane sulfonate which, upon reaction with sodium iodide in acetone is converted to 9α-bromo - 21 - iodo-11β,17α-dihydroxy-6,16β-dimethyl-4,6-pregnadiene-3,20-dione which, upon reaction with sodium bisulfite, is converted to 9α-bromo-11β,17α-dihydroxy-6,16β-dimethyl-4,6-pregnadiene-3,20-dione.

*Example 39*

To a solution of 85 mg. of 9α-fluoro-11β,17α,21-trihydroxy - 6,16α-dimethyl-1,4,6-pregnatriene-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water and dried to give 9α-fluoro-11β,17α,21-trihydroxy-6,16α-dimethyl-1,4,6-pregnatriene-3,20-dione 21-methane sulfonate.

To 180 mg. of 9α-fluoro-11β,17α,21-trihydroxy-6,16α-dimethyl-1,4,6-pregnatriene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-21-iodo-11β,17α-dihydroxy-1,16α-dimethyl-1,4,6-pregnatriene-3,20-dione.

This 9α-fluoro-21-iodo - 11β,17α - dihydroxy - 6,16α-dimethyl-1,4,6-pregnatriene-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-11β,17α-dihydroxy-6,16α-dimethyl-1,4,6-pregnatriene-3,20-dione.

In accordance with the above procedure but starting with 9α-chloro-11β,17α,21 - trihydroxy - 6,16α - dimethyl-1,4,6-pregnatriene-3,20-dione there is obtained, following the reaction with methane-sulfonyl chloride, 9α-chloro-11β,17α,21-trihydroxy-6,16α-dimethyl - 1,4,6-pregnatriene-3,20-dione 21-methane sulfonate which, upon reaction with sodium iodide in acetone is converted to 9α-chloro-21-iodo-11β,17α-dihydroxy-6,16α - dimethyl - 1,4,6 - pregnatriene-3,20-dione which, upon reaction with sodium bisulfite, is converted to 9α-chloro-11β,17α-dihydroxy-6,16α-dimethyl-1,4,6-pregnatriene-3,20-dione.

In accordance with the above procedure but starting with 9α-bromo-11β,17α,21 - trihydroxy - 6,16α - dimethyl-1,4,6-pregnatriene-3,20-dione there is obtained, following the reaction with methane-sulfonyl chloride, 9α-bromo-11β,17α,21-trihydroxy-6,16α - dimethyl - 1.4.6 - pregnatriene-3,20-dione 21-methane sulfonate which, upon reaction with sodium iodide in acetone is converted to 9α-bromo-21-iodo-11β,17α-dihydroxy-6,16α-dimethyl - 1,4,6-pregnatriene-3,20-dione which, upon reaction with sodium bisulfite, is converted to 9α-bromo-11β,17α-dihydroxy-6,16α-dimethyl-1,4,6-pregnatriene-3,20-dione.

Similarly, in accordance with the above procedure but starting with 9α-fluoro - 11β,17α,21 - trihydroxy-6,16β-dimethyl-1,4,6-pregnatriene-3,20-dione, there is obtained, following the reaction with methane-sulfonyl chloride, 9α-fluoro-11β,17α,21-trihydroxy - 6,16β - dimethyl - 1,4,6-pregnatriene-3,20-dione 21-methane sulfonate which, upon reaction with sodium iodide in acetone is converted to 9α-fluoro-21-iodo-11β,17α - dihydroxy - 6,16β - dimethyl-1,4,6-pregnatriene-3,20-dione which, upon reaction with sodium bisulfite is converted to 9α-fluoro-11β,17α-dihydroxy-6,16β-dimethyl-1,4,6-pregnatriene-3,20-dione.

Similarly, in accordance with the above procedure but starting with 9α-chloro - 11β,17α,21 - trihydroxy-6,16β-dimethyl-1,4,6-pregnatriene-3,20-dione, there is obtained, following the reaction with methane-sulfonyl chloride, 9α-chloro-11β,17α,21 - trihydroxy - 6,16β-dimethyl-1,4,6-pregnatriene-3,20-dione 21-methane sulfonate which, upon reaction with sodium iodide in acetone is converted to 9α-chloro-21-iodo-11β,17α - dihydroxy - 6,16β - dimethyl-1,4,6-pregnatriene-3,20-dione which, upon reaction with sodium bisulfite is converted to 9α-chloro-11β,17α-dihydroxy-6,16β-dimethyl-1,4,6-pregnatriene-3,20-dione.

Similarly, in accordance with the above procedure but starting with 9α-bromo-11β,17α,21-trihydroxy-6,16β-dimethyl-1,4,6-pregnatriene-3,20-dione, there is obtained, following the reaction with methane-sulfonyl chloride, 9α-bromo-11β,17α,21-trihydroxy-11β,17α,21 - trihydroxy-6,16β-dimethyl-1,4,6-pregnatriene-3,20-dione 21-methane sulfonate which, upon reaction with sodium iodide in acetone is converted to 9α-bromo-21-iodo-11β,17α-dihydroxy-6,16β-dimethyl-1,4,6-pregnatriene-3,20-dione which, upon reaction with sodium bisulfite is converted to 9α-fluoro-11β,17α-dihydroxy-6,16β-dimethyl - 1,4,6 - pregnatriene-3,20-dione.

*Example 40*

To a solution of 85 mg. of 9α-fluoro-17α,21-dihydroxy-6,16α-dimethyl-4,6-pregnadiene-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-17α,21-dihydroxy-6,16α-dimethyl - 4,6 - pregnadiene-3,11,20-trione 21-methane sulfonate.

To 180 mg. of 9α-fluoro-17α,21-dihydroxy-6,16α-dimethyl-4,6-pregnadiene-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-21-iodo-17α-hydroxy - 6,16α - dimethyl-4,6-pregnadiene-3,11,20-trione.

This 9α-fluoro-21-iodo-17α-hydroxy - 6,16α - dimethyl-4,6-pregnadiene-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-17α-hydroxy-6,16α-dimethyl-4,6-pregnadiene-3,11,20-trione.

In accordance with the above procedure but starting with 9α-chloro-17α,21-dihydroxy-6,16α-dimethyl-4,6-pregnadiene-3,11,20-trione, there is obtained, following the reaction with methane-sulfonyl chloride, 9α-chloro-17α,21-dihydroxy - 6,16α - dimethyl-4,6-pregnadiene-3,11,20-trione 21-methane sulfonate, which, upon reaction with sodium iodide in acetone, is converted to 9α-chloro-21-iodo-17α-hydroxy-6,16α-dimethyl-4,6 - pregnadiene-3,11,20-trione, which, upon reaction with sodium bisulfite is converted to 9α-chloro-17α-hydroxy-6,16α-dimethyl-4,6-pregnadiene-3,11,20-trione.

In accordance with the above procedure but starting with 9α-bromo-17α,21-dihydroxy-6,16α-dimethyl-4,6-pregnadiene-3,11,20-trione, there is obtained, following the reaction with methane-sulfonyl chloride, 9α-chloro-17α,21-dihydroxy-6,16α - dimethyl-4,6-pregnadiene-3,11,20-trione 21-methane sulfonate, which, upon reaction with sodium iodide in acetone, is converted to 9α-bromo-21-iodo-17α-hydroxy-6,16α-dimethyl - 4,6 - pregnadiene-3,11,20-trione which, upon reaction with sodium bisulfite is converted to 9α - bromo-17α - hydroxy-6,16α-dimethyl-4,6-pregnadiene-3,11,20-trione.

Similarly, in accordance with the above procedure but starting with 9α-fluoro-17α,21-dihydroxy-6,16β-dimethyl-4,6-pregnadiene-3,11,20-trione, there is obtained, following the reaction with methane-sulfonyl chloride, 9α-fluoro-17α,21 - dihydroxy - 6,16β - dimethyl-4,6-pregnadiene-3,11,20-trione 21-methane sulfonate which, upon reaction with sodium iodide in acetone, is converted to 9α-fluoro-21-iodo - 17α-hydroxy - 6,16β - dimethyl-4,6-pregnadiene-3,11,20-trione which, upon reaction with sodium bisulfite is converted to 9α-fluoro-17α-hydroxy-6,16β-dimethyl-4,6-pregnadiene-3,11,20-trione.

Similarly, in accordance with the above procedure but starting with 9α-chloro-17α,21-dihydroxy-6,16β-dimethyl-4,6-pregnadiene-3,11,20-trione, there is obtained, following the reaction with methane-sulfonyl chloride, 9α-chloro-17α,21-dihydroxy-6,16β-dimethyl-4,6-pregnadiene - 3,11,20-trione 21-methane sulfonate which, upon reaction with sodium iodide in acetone, is converted to 9α-chloro-21-iodo-17α-hydroxy-6,16β-dimethyl-4,6 - pregnadiene - 3,11,20-trione, which, upon reaction with sodium bisulfite is converted to 9α-chloro-17α-hydroxy-6,16β-dimethyl-4,6-pregnadiene-3,11,20-trione.

Similarly, in accordance with the above procedure but starting with 9α-bromo-17α,21-dihydroxy-6,16β-dimethyl-4,6-pregnadiene-3,11,20-trione, there is obtained, following the reaction with methane-sulfonyl chloride, 9α-bromo-17α,21-dihydroxy-6,16β-dimethyl - 4,6-pregnadiene - 3,11,20-trione 21-methane sulfonate, which, upon reaction with sodium iodide in acetone, is converted to 9α-bromo-21-iodo-17αhydroxy-6,16β-dimethyl - 4,6 - pregnadiene-3,11,20-trione which, upon reaction with sodium bisulfite is converted to 9α-bromo-17α-hydroxy-6,16β-dimethyl-4,6-pregnadiene-3,11,20-trione.

*Example 41*

To a solution of 85 mg. of 9α-fluoro-17α,21-dihydroxy-6,16α-dimethyl - 1,4,6 - pregnatriene-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-17α,21-dihydroxy-6,16α-dimethyl-1,4,6-pregnatriene-3,11,20-trione 21-methane sulfonate.

To 180 mg. of 9α-fluoro-17α,21-dihydroxy-6,16α-dimethyl-1,4,6-pregnatriene-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α - fluoro - 21-iodo-17α-hydroxy-6,16α-dimethyl-1,4,6-pregnatriene-3,11,20-trione.

This 9α-fluoro-21-iodo-17α-hydroxy-6,16α-dimethyl-1,4,6-pregnatriene-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-17α-hydroxy-6,16α-dimethyl-1,4,6-pregnatriene-3,11,20-trione.

In accordance with the above procedure but starting with 9α-chloro-17α,21-dihydroxy - 6,16α - dimethyl-1,4,6-pregnatriene-3,11,20-trione, there is obtained, following the reaction with methane-sulfonyl chloride, 9α-chloro-17α,21-dihydroxy-6,16α-dimethyl - 1,4,6 - pregnatriene-3,11,20-trione 21-methane sulfonate, which, upon reaction with sodium iodide in acetone, is converted to 9α-chloro-21-iodo-17α-hydroxy-6,16α-dimethyl - 1,4,6-pregnatriene-3,11,20-trione which, upon reaction with sodium bisulfite is converted to 9α-chloro-17α-hydroxy-6,16α-dimethyl-1,4,6-pregnatriene-3,11,20-trione.

In accordance with the above procedure but starting with 9α-bromo-17α,21-dihydroxy-6,16α - dimethyl - 1,4,6 - pregnatriene-3,11,20-trione, there is obtained, following the reaction with methane-sulfonyl chloride, 9α-bromo-17α,21-dihydroxy - 6,16α - dimethyl - 1,4,6 - pregnatriene - 3,11,20-trione 21-methane sulfonate which, upon reaction with sodium iodide in acetone, is converted to 9α-bromo-21-iodo - 17α - hydroxy - 6,16α - dimethyl - 1,4,6 - pregnatriene-3,11,20-trione which, upon reaction with sodium bisulfite is converted to 9α-bromo-17α-hydroxy-6,16α-dimethyl-1,4,6-pregnatriene-3,11,20-trione.

Similarly, in accordance with the above procedure but starting with 9α-fluoro-17α,21-dihydroxy-6,16β-dimethyl-1,4,6-pregnatriene-3,11,20-trione, there is obtained, following the reaction with methane-sulfonyl chloride, 9α-fluoro - 17α,21 - dihydroxy - 6,16β - dimethyl - 1,4,6 - pregnatriene-3,11,20-trione 21-methane sulfonate, which, upon reaction with sodium iodide in acetone, is converted to 9α - fluoro - 21 - iodo - 17α - hydroxy - 6,16β - dimethyl-1,4,6-pregnatriene-3,11,20-trione which, upon reaction with sodium bisulfite is converted to 9α-fluoro-17α-hydroxy-6,16β-dimethyl-1,4,6-pregnatriene-3,11,20-trione.

Similarly, in accordance with the above procedure but starting with 9α-chloro-17α-21-dihydroxy-6,16β-dimethyl-1,4,6-pregnatriene-3,11,20-trione, there is obtained, following the reaction with methane-sulfonyl chloride, 9α-chloro - 17α,21 - dihydroxy - 6,16β - dimethyl - 1,4,6-pregnatriene-3,11,20-trione 21-methane sulfonate which, upon reaction with sodium iodide in acetone is converted to 9α - chloro - 21 - iodo - 17α - hydroxy - 6,16β - dimethyl-1,4,6-pregnatriene-3,11,20-trione which, upon reaction with sodium bisulfite is converted to 9α-chloro-17α-hydroxy-6,16β-dimethyl-1,4,6-pregnatriene-3,11,20-trione.

Similarly, in accordance with the above procedure but starting with 9α-bromo-17α,21-dihydroxy-6,16β-dimethyl-1,4,6-pregnatriene-3,11,20-trione, there is obtained, following the reaction with methane-sulfonyl chloride, 9α-bromo - 17α,21 - dihydroxy - 6,16β - dimethyl - 1,4,6-pregnatriene-3,11,20-trione 21-methane sulfonate which, upon reaction with sodium iodide in acetone is converted to 9α - bromo - 21 - iodo - 17α - hydroxy - 6,16β - dimethyl-1,4,6-pregnatriene-3,11,20-trione which, upon reaction with sodium bisulfite is converted to 9α-bromo-17α-hydroxy-6,16β-dimethyl-1,4,6-pregnatriene-3,11,20-trione.

*Example 42*

A suspension containing 300 mg. of 11β,17α,21-trihydroxy-6α,16α-dimethyl-4-pregnene-3,20-dione 21-tertiary butyl acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 11β,17α,21-trihydroxy-6,16α-dimethyl-4,6-pregnadiene - 3,20 - dione 21-tertiary butyl acetate. This product is then hydrolyzed by treatment with a solution of potassium bicarbonate in aqueous methanol to form 11β,17α,21-trihydroxy-6,16α-dimethyl-4,6-pregnadiene-3,20-dione.

In accordance with the above procedure but starting with 11β,17α,21-trihydroxy-6α,16α-dimethyl-4-pregnene-3,20-dione 21-tertiary butyl acetate there are obtained 11β,17α,21 - trihydroxy - 6,16β - dimethyl - 4,6 - pregnadiene-3,20-dione and its 21-tertiary butyl acetate.

*Example 43*

To a solution of 85 mg. of 11β,17α,21-trihydroxy-6,16α-dimethyl-4,6-pregnadiene-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 11β,17α,21 - trihydroxy - 6,16α - dimethyl - 4,6 - pregnadiene-3,20-dione 21-methane sulfonate.

To 180 mg. of 11β,17α,21-trihydroxy-6,16α-dimethyl-4,6-pregnadiene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-11β,17α-dihydroxy-6,16α-dimethyl-4,6-pregnadiene-3,20-dione.

320 mg. of trisilver phosphate are thoroughly mixed with 0.1 ml. of 100% phosphoric acid, and the silver dihydrogen phosphate thus obtained is washed by decantation with two portions of diethyl ether to remove unreacted phosphoric acid. Approximately 2.0 ml. of acetonitrile are added, and the mixture is heated to reflux temperature. To the resulting mixture are then added 21-iodo-11β,17α-dihydroxy - 6,16α - dimethyl-4,6-pregnadiene-3,20-dione, and the mixture is heated under reflux in a nitrogen atmosphere with stirring for a period of approximately 75 minutes. The reaction mixture is cooled to room temperature, about 2.0 g. of ice water are added, and the acetonitrile is evaporated in vacuo at a temperature below about 25° C. The pH of the resulting aqueous suspension is adjusted to 6.4 by the addition of 0.23 ml. of saturated aqueous sodium carbonate solution. The precipitate, which forms, is removed by filtration and washed thoroughly with water. The filtered aqueous solution and washes are combined, and dried from the frozen state, and the residual material is triturated with seven 1.0 ml. portions of methanol. The methanol-insoluble material is separated by filtration, the filtered methanolic solution is evaporated in vacuo to a volume of approximately 0.2 ml., and 2.0 ml. of ether are added to the concentrated methanolic solution. The material which precipitates is recovered, washed with ether, and dried to give 11β,17α,21-trihydroxy-6,16α-dimethyl-4,6-pregnadiene-3,20-dione 21-dihydrogen phosphate.

In accordance with the above procedures but starting with 11β,17α,21-trihydroxy-6,16β-dimethyl-4,6-pregnadiene-3,20-dione there is obtained, following the reaction with methane-sulfonyl chloride, 11β,17α,21-trihydroxy-6,16β-dimethyl-4,6-pregnadiene-3,20-dione 21-methane sulfonate, which upon reaction with sodium iodide in acetone is converted to 21-iodo-11β,17α-dihydroxy-6,16β-dimethyl-4,6-pregnadiene-3,20-dione, which, upon reaction with a mixture of silver phosphate and phosphoric acid, is converted to 11β,17α-dihydroxy-6,16β-dimethyl-4,6-pregnadiene-3,20-dione 21-hydrogen phosphate.

*Example 44*

To a suspension of 25.0 g. of 11β,17α,21-trihydroxy-6,16α-dimethyl-4,6-pregnadiene-3,20-dione (which can be prepared as described in Example 3 hereinabove) in 1.5 l. of alcohol-free chloroform cooled to about 5° C. in an ice bath is added with constant stirring 750 ml. of cold, concentrated aqueous hydrochloric acid solution and then 750 ml. of formalin (low in methanol). The mixture is removed from the ice bath and stirred at room temperature for approximately 7 hours. The layers are separated and the aqueous phase is back-extracted twice with chloroform. The combined chloroform layers are washed twice with a 5% aqueous solution of sodium bicarbonate, and twice with a saturated aqueous solution of sodium chloride. The washed chloroform solution is dried over magnesium sulfate and evaporated under reduced pressure. The residual material is triturated with methanol to give a crystalline solid, which is recrystallized from a mixture of benzene and n-hexane to give 17α,20,20,21-bismethylenedioxy-11β-hydroxy - 6,16α - dimethyl - 4,6-pregnadiene-3-one.

A solution of 400 mg. of 17α,20,20,21-bismethylenedioxy-11β-hydroxy-6,16α-dimethyl-4,6-pregnadiene-3-one in 4 ml. of pyridine is added to the complex formed by the addition of 400 mg. of chromium trioxide to 4 ml. of pyridine. The mixture is swirled until thoroughly mixed and then allowed to stand at room temperature for a period of about 15 hours. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 17α,20,20,21-bismethylenedioxy-6,16α-dimethyl-4,6-pregnadiene-3,11-dione.

Approximately 1.35 g. of 17α,20,20,21-bismethylenedioxy-6,16α-dimethyl-4,6-pregnadiene-3,11-dione is dissolved in 23 ml. of dry, hot benzene, the resulting solution is cooled to room temperature, and to the solution is added 0.96 ml. of freshly-distilled ethyl formate. The air in the system is replaced with nitrogen and 560 mg. of sodium hydride (as a 58% dispersion in mineral oil) is added. The system is again evacuated and filled with nitrogen, and the mixture is stirred at room temperature for a period of about 15 hours. The reaction mixture is poured into an excess of a saturated aqueous solution of sodium dihydrogen phosphate, and the resulting aqueous mixture is extracted four times with benzene. The benzene reaction solution and extracts are combined, washed three times with water, dried over sodium sulfate, and evaporated to dryness. The residual material is dissolved in ether, and the ether solution is extracted with a 10% aqueous solution of sodium carbonate. The aqueous alkaline extracts are acidified with an excess of a saturated aqueous solution of sodium dihydrogen phosphate, and the aqueous acidic mixture extracted with ether and then with chloroform. The combined organic extracts are dried over sodium sulfate, and evaporated to dryness to give 17α,20,20,21-bismethylenedioxy - 2 - hydroxymethylene-6,16α-dimethyl-4,6-pregnadiene-3,11-dione.

Approximately 850 mg. of 17α,20,20,21-bismethylenedioxy-2-hydroxymethylene - 6,16α-dimethyl-4,6-pregnadiene-3,11-dione is dissolved in 9.2 ml. of absolute ethanol, and to the solution is added a solution of 0.16 ml. of hydrazine hydrate dissolved in 0.16 ml. of absolute ethanol. The resulting mixture is heated under reflux in a nitrogen atmosphere for a period of about 45 minutes, and the reaction mixture is then evaporated to dryness under reduced pressure. The residual material is washed with three portions of cold water, and the resulting amorphous solid is dried at a temperature of about 80° C. for 1 hour in high vacuum to give 17α,20,20,21-bismethylenedioxy-6,16α-dimethyl-[3,2-c] pyrazolo-4,6-pregnadiene-11-one.

To a solution of 100 mg. of 17α,20,20,21-bismethylenedioxy-6,16α-dimethyl-[3,2-c] pyrazolo-4,6 - pregnadiene-11-one in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, with ice-cold 1 N sulfuric acid (until the pH of the aqueous layer is 1–3), with saturated aqueous sodium bicarbonate solution (until the pH of the aqueous layer is 8), and with water (until the aqueous layer is neutral). The ethyl acetate solution is then dried with anhydrous sodium sulfate, and the solvent is distilled at a temperature of about 40° C., in vacuo to give 1'-acetyl-17α,20,20,21-bismethylenedioxy - 6,16α-dimethyl-[3,2-c] pyrazolo-4,6-pregnadiene-11-one, which is isolated by the addition of water and filtration.

In accordance with the above procedure, but using an equivalent quantity of another acylating agent in place of the acetic anhydride, there is obtained the corresponding 1'-acyl derivative.

Approximately 720 mg. of 1'-acetyl-17α,20,20,21-bismethylenedioxy-6,16α-dimethyl-[3,2-c] pyrazolo-4,6-pregnadiene-11-one is heated on a steam bath with 24 ml. of a 60% aqueous solution of formic acid for a period of about 30 minutes. The excess reagent is removed in vacuo using a water bath at a temperature of about 50° C. as the source of heat. The residual material is flushed four times with n-hexane, and dried at 60° C. in high vacuum. The amorphous solid thus obtained is dissolved in about 3.4 ml. of pure methanol and allowed to react with 1.3 ml. of a 1.33 N solution of sodium methoxide in methanol at room temperature under a nitrogen atmosphere for ten minutes. The excess sodium methoxide is neutralized with acetic acid, and the mixture is then evaporated to dryness and flushed with n-hexane. The residual material is washed with water, filtered and dried to give 17α,21-dihydroxy-6,16α-dimethyl-[3,2-c] pyrazolo-4,6-pregnadiene-11,20-dione.

In accordance with the above procedures, but starting with the 11β,17α,21-trihydroxy-6,16β-dimethyl-4,6-pregnadiene-3,20-dione (which can be prepared as described in Example 20 hereinabove) in place of the 11β,17α,21-trihydroxy-6,16α-dimethyl-4,6 - pregnadiene - 3,20 - dione, there is obtained as product the corresponding 17α,21-dihydroxy-6,16β-dimethyl-[3,2-c] pyrazolo-4,6-pregnadiene-11,20-dione.

In accordance with the above procedures, but starting with 11β,17α,21-trihydroxy-6,16α-dimethyl-9α-fluoro-4,6-pregnadiene-3,20-dione (which can be prepared as described in Example 28 hereinabove) in place of the 11β,17α,21-trihydroxy-6,16α-dimethyl - 4,6 - pregnadiene-3,20-dione, there is obtained as product, via the intermediate formation of 1'-acetyl-17α,20,20,21-bismethylenedioxy-6,16α-dimethyl-9α-fluoro-[3,2-c] pyrazolo-4,6-pregnadiene-11-one, the corresponding 17α,21-dihydroxy-6,16α-dimethyl-9α-fluoro-[3,2-c] pyrazolo-4,6-pregnadiene-11,20-dione. Alternatively, the intermediate 1'-acetyl-17α,20,20,21-bismethylenedioxy-6,16α-dimethyl-9α-fluoro-[3,2-c] pyrazolo-4,6-pregnadiene-11-one is reacted with sodium borohydride to form 1'-acetyl-17α,20,20,21-bismethylenedioxy-6,16α-dimethyl-9α-fluoro-[3,2-c] pyrazolo-4,6-pregnadiene-11β-ol which is then reacted with 60% aqueous formic acid and the resulting amorphous solid reacted with dilute methanolic sodium methoxide as described hereinabove in this example, thereby forming 11β,17α,21-trihydroxy-6,16α-dimethyl-9α-fluoro-[3,2-c] pyrazolo-4,6-pregnadiene-20-one.

Approximately 1.35 g. of 17α,20,20,21-bismethylenedioxy-11β-hydroxy - 6,16α - dimethyl - 4,6-pregnadiene-3-one (which can be prepared as described hereinabove in this example) is dissolved in 23 ml. of dry, hot benzene, the resulting solution is cooled to room temperature, and to the solution is added 0.96 ml. of freshly-distilled ethyl formate. The air in the system is replaced with nitrogen and 560 mg. of sodium hydride (as a 58% dispersion in mineral oil) is added. The system is again evacuated and filled with nitrogen, and the mixture is stirred at room temperature for a period of about 15 hours. The mixture is poured into an excess of a saturated aqueous solution of sodium dihydrogen phosphate, and the resulting aqueous mixture is extracted four times with benzene. The benzene reaction solution and extracts are combined, washed three times with water, dried over sodium sulfate, and evaporated to dryness. The residual material is dissolved in ether, and the ether solution is extracted with a 10% aqueous solution of sodium carbonate. The aqueous alkaline extracts are acidified with an excess of a saturated aqueous solution of sodium dihydrogen phosphate, and the aqueous acidic mixture extracted with ether and then with chloroform. The combined organic extracts are dried over sodium sulfate, and evaporated to dryness to give 17α,20,20,21-bismethylenedioxy-11β-hydroxy-2-hydroxymethylene - 6,16α-dimethyl-4,6-pregnadiene-3-one.

Approximately 850 mg. of 17α,20,20,21-bismethylenedioxy - 11β-hydroxy-2-hydroxymethylene-6,16α-dimethyl-4,6-pregnadiene-3-one is dissolved in 9.2 ml. of absolute ethanol, and to the solution is added a solution of 0.16 ml. of hydrazine hydrate dissolved in 0.16 ml. of absolute ethanol. The resulting mixture is heated under reflux in a nitrogen atmosphere for a period of about 45 minutes, and the reaction mixture is then evaporated to dryness under reduced pressure. The residual material is washed with three portions of cold water, and the resulting amorphous solid is dried at a temperature of about 80° C. for 1 hour in high vacuum to give 17α,20,20,21-bismethylenedioxy - 6,16α-dimethyl-[3,2-c] pyrazolo-4,6-pregnadiene-11β-ol.

To a solution of 100 mg. of 17α,20,20,21-bismethylenedioxy - 6,16α-dimethyl-[,3,2-c] pyrazolo-4,6-pregnadiene-11β-ol in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, with ice-cold 1 N sulfuric acid (until the pH of the aqueous layer is 1–3), with saturated aqueous sodium bicarbonate solution (until the pH of the aqueous layer is 8), and with water (until the aqueous layer is neutral). The ethyl acetate solution is then dried with anhydrous sodium sulfate, and the solvent is distilled at a temperature of about 40° C. in vacuo to give 1'-acetyl-17α,20,20,21-bismethylenedioxy-6,16α-dimethyl-[3,2-c] pyrazolo-4,6-pregnadiene-11β-ol which is isolated by the addition of water and filtration.

In accordance with the above procedure, but using an equivalent quantity of another acylating agent in place of acetic anhydride there is obtained the corresponding 1'-acyl-steroid.

Approximately 720 mg. of 1'-acetyl-17α,20,20,21-bismethylenedioxy-6,16α-dimethyl-[3,2-c] pyrazolo-4,6-pregnadiene-11β-ol is heated on a steam bath with 24 ml. of a 60% aqueous solution of formic acid for a period of about 30 minutes. The excess reagent is removed in vacuo using a water bath at a temperature of about 50° C. as the source of heat. The residual material is flushed four times with n-hexane, and dried at 60° C. in high vacuum. The amorphous solid thus obtained is dissolved in about 3.4 ml. of pure methanol and allowed to react with 1.3 ml. of a 1.33 N solution of sodium methoxide in methanol at room temperature under a nitrogen atmosphere for ten minutes. The excess sodium methoxide is neutralized with acetic acid, and the mixture is then evaporated to dryness and flushed with n-hexane. The residual material is washed with water, filtered and dried to give 11β,17α,21-trihydroxy-6,16α-dimethyl-[3,2-c] pyrazolo-4,6-pregnadiene-20-one.

Approximately 0.5 g. of 17α,20,20,21-bismethylenedioxy-11β-hydroxy-6,16α-dimethyl-4,6-pregnadiene-3-one is dissolved in 25 cc. of benzene, and about 5 cc. of benzene is removed from the solution by distillation at normal pressure. The resulting solution is cooled to room temperature, and to the solution is added about 0.75 cc. of freshly-distilled ethyl formate. The air in the system is replaced with nitrogen, and about 150 mg. of sodium hydride (as a 57% dispersion in mineral oil) is added. The mixture is stirred under nitrogen at room temperature for a period of about three hours. About 15 cc. of a saturated aqueous solution sodium dihydrogen phosphate is added to the reaction mixture and the resulting aqueous mixture is extracted with ether. The benzene solution and ether extracts are combined, extracted with 2 N aqueous sodium hydroxide, and the aqueous sodium hydroxide extracts are acidified with sodium dihydrogen phosphate. The aqueous acidified solution is extracted with ether, the ether extract is evaporated to dryness and the residual material is crystallized from ether to give 17α,20,20,21-bismethylenedioxy - 11β-formyloxy-2-hydroxymethylene-6,16α-dimethyl-4,6-pregnadiene-3-one. Evaporation of the ether mother liquor, followed by recrystallization of the residual material from ether gives substantially pure 17α,20,20,21 - bismethylenedioxy-11β-hydroxy-2-hydroxymethylene - 6,16α-dimethyl-4,6-pregnadiene-3-one; M.P. 200–204° C.

Approximately 1.19 g. of 17α,20,20,21-bismethylenedioxy - 11β - hydroxy-2-hydroxymethylene-6,16α-dimethyl-4,6-pregnadiene-3-one is dissolved in 25 cc. of ethanol. Three hundred mg. of phenyl hydrazine is added, and the mixture is heated under reflux in a nitrogen atmosphere for one hour. About 25 cc. of water is added. The product is then extracted into 150 cc. of ether. The ether extracts are washed with 2 N aqueous HCl, with saturated sodium bicarbonate, with water, with saturated aqueous sodium chloride solution, and then dried over anhydrous sodium sulfate. The washed and dried ether extracts are evaporated to dryness and the residual material is crystallized from ether to give 17α,20,20,21-bismethylenedioxy-6,16α-dimethyl-1'-phenyl-[3,2-c] pyrazolo-4,6-pregnadiene-11β-ol; M.P. 258–262° C.

Approximately 430 mg. of 17α,20,20,21-bismethylenedioxy - 6,16α - dimethyl - 1' - phenyl - [3,2-c] pyrazolo-4,6-pregnadiene-11β-ol is heated on a steam bath under nitrogen with 40 cc. of a 60% aqueous solution of formic acid for a period of about 30 minutes. About 40 cc. of water is added to the reaction mixture, and the mixture is then extracted into about 200 cc. of chloroform. The chloroform solution is washed with water, with saturated aqueous sodium bicarbonate solution, again with water, and is then dried over anhydrous sodium sulfate. The washed and dried chloroform solution is evaporated under vacuum and the residual product is dissolved in 60 cc. of absolute methanol, and 0.1 equivalent of sodium methoxide in methanol is added. The resulting mixture is stirred under nitrogen at room temperature for 15 minutes. The reaction mixture is acidified with acetic acid, and the solvent is evaporated under vacuum at room temperature. About 20 cc. of water is added to the residual material, and the aqueous mixture is extracted with about 150 cc. of ethyl acetate. The ethyl acetate solution is washed with saturated aqueous sodium bicarbonate solution, with water, and is then dried over anhydrous sodium sulfate and evaporated to dryness to give an amorphous solid. This amorphous solid is dried in a high vacuum, and is then dissolved in 4 cc. of pyridine. About 3 cc. of acetic anhydride is added. The resulting mixture is heated on the steam bath for about 15 minutes and evaporated to dryness in vacuo. About 20 cc. of water is added. The aqueous mixture is then extracted with about 150 cc. of ethyl acetate, the ethyl acetate extract is washed with saturated aqueous sodium bicarbonate solution, and with water, and is then dried over anhydrous sodium sulfate. The washed and dried ethyl acetate solution is evaporated in vacuo, and the residual material is crystallized from ethyl acetate-benzene to give substantially pure 11β,17α,21-trihydroxy-6,16α-dimethyl-1'-phenyl-[3,2-c] pyrazolo-4,6-pregnadiene-20-one 21-acetate; M.P. 225–226° C.

One hundred mg. of 11β,17α,21-trihydroxy-6,16α-dimethyl-1'-phenyl-[3,2-c] pyrazolo-4,6-pregnadiene-20-one 21-acetate is dissolved in 10 cc. of absolute methanol, and 1.1 equivalents of sodium methoxide in methanol is added. The mixture is stirred at room temperature under nitrogen for 15 minutes. The product is acidified with acetic acid and is then evaporated at room temperature under vacuum. The residual material is dissolved in 100 cc. of chloroform, the chloroform solution is washed with water, with saturated aqueous sodium bicarbonate solution, again with water, and is then dried over anhydrous sodium sulfate. The washed and dried chloroform solution is evaporated to dryness to give 11β,17α,21-trihydroxy-6-16α-dimethyl - 1' - phenyl - [3,2-c] pyrazolo - 4,6 - pregnadiene-20-one.

These ring A unsaturated 17α-hydroxy-11-oxygenated-20-keto-steroids of the pregnane series having methyl substituents attached to the C-6 and C-16 carbon atoms prepared as described in Examples 26 through 44 hereinabove possess particularly high anti-inflammatory activity. Moreover the 9α-fluoro-derivatives described hereinabove in Example 44 are especially effective for the treatment of inflammatory conditions since, in addition to the advantage of extremely low dosage, and low salt and water retention, their administration is not accompanied by appreciable adrenal atrophy.

The 17α,21-dihydroxy-16-methyl-11-oxygenated-4-pregnene-3,20-dione compounds and 17α,21-dihydroxy-16-methyl-11-oxygenated-1,4-pregnadiene-3,20-dione compounds used as starting materials in the foregoing examples are prepared, starting with the known 3α-acetoxy-16-pregnene-11,20-dione, in accordance with the following procedures:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 3α-acetoxy-16-pregnene-11,20-dione in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter material is heated for 15 minutes at 60–70° C. with a mixture of 25 ml. acetic anhydride and 25 ml. pyridine and the acetylated product is purified by chromatography on acid-washed alumina followed by crystallization from petroleum ether to give approximately 1.5 g. of substantially pure 3α-acetoxy-16α-methyl-pregnane-11,20-dione.

To a solution of 0.8 g. of 3α-acetoxy-16α-methyl-pregnane-11,20-dione in 40 ml. of methanol is added 1.5 ml. of concentrated aqueous hydrochloric acid and the resulting solution is stirred overnight at about 25° C. The reaction solution is evaporated in vacuo at 25° C. to a small volume, and the concentrated solution is poured into 50 ml. of ice water. The white solid which precipitates is recovered by filtration, washed with water and recrystallized from ethyl acetate to give 3α-hydroxy-16α-methyl-pregnane-11,20-dione.

A solution of 22 g. of 3α-acetoxy-16α-methyl-pregnane-11,20-dione and 1 g. of p-toluene-sulfonic acid in 250 ml. of acetic anhydride is heated at reflux under nitrogen for a period of approximately 3 days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is adsorbed on 660 g. of acid-washed alumina; the alumina adsorbate is then washed with 2 liters of petroleum ether. The adsorbate is then eluted with 85:15 petroleum ether-ether mixture, and the first four liters of eluate is collected, and evaporated to dryness in vacuo to give a mixture of enol acetates containing 3α,20-diacetoxy-16α-methyl-17(20)-pregnene-11-one. This mixture of enolates, weighing approximately 14 g., is dissolved in 50 ml. of benzene and treated with an excess of per-benzoic acid over a 16-hour period. The reaction mixture is shaken with dilute aqueous potassium hydroxide solution until the benzene layer is free of per-benzoic acid; the benzene layer is then washed with water until neutral, dried, and the solvent evaporated in vacuo to give a crystalline material, 17α,20-epoxy-3α,20-diacetoxy-16α-methyl-pregnane-11-one. The latter material is dissolved, without purification, in 200 ml. of methanol, 120 ml. of water and 10 g. of potassium bicarbonate, and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 3α,17α-dihydroxy-16α-methyl-pregnane-11,20-dione.

To a solution of 7.0 g. of 3α,17α-dihydroxy-16α-methyl-pregnane-11,20-dione in 50 ml. of chloroform is added dropwise with stirring a solution containing 3.36 g. of bromine in 24.2 ml. of chloroform over a period of about 60 minutes. The reaction mixture is dissolved in 200 ml. of ethyl acetate, and the resulting solution washed with water until neutral, dried, and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration and washed, by slurrying, with 50:50 ether-petroleum ether mixture to give about 5 g. of 21-bromo-3α,17α-dihydroxy-16α-methyl-pregnane-11,20-dione.

This 5 g. of 21-bromo-3α,17α-dihydroxy-16α-methyl-pregnane-11,20-dione is mixed with 5.0 g. of anhydrous potassium acetate, 4.0 g. of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered, and the insoluble material is washed with acetone. The filtered solution is evaporated in vacuo thereby removing the solvents, and the residual material is slurried with water, and the aqueous mixture extracted with ethyl acetate. The ethyl acetate extract is washed with water to neutrality, dried, and the solvent is evaporated in vacuo to give an oil. This oil is crystallized from ether, and recrystallized from ethyl acetate-ether to give 3α,17α,21-trihydroxy-16α-methyl-pregnane-11,20-dione 21-acetate.

A solution of 400 mg. of 3α,17α,21-trihydroxy-16α-methyl-pregnane-11,20-dione 21-acetate in 4 ml. of pyridine is added to the complex formed by the addition of 400 mg. of chromium trioxide to 4 ml. of pyridine. The mixture is swirled until thoroughly mixed, and then allowed to stand at room temperature overnight. The reaction mixture is poured into water, and the aqueous mixture is extracted with ether, and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate to give 17α,21-dihydroxy-16α-methyl-pregnane-3,11,20-trione 21-acetate.

To 100 mg. of 17α,21-dihydroxy-16α-methyl-pregnane-3,11,20-trione 21-acetate dissolved in 2 ml. of chloroform and 2.25 ml. of glacial acetic acid, at a temperature of —55° C., is added two drops of a 0.001 N solution of dry HBr in glacial acetic acid. To about 0.38 ml. of 0.001 N HBr in glacial acetic acid, at —55° C., is added 0.43 ml. of a solution containing 40 mg. of bromine in chloroform, and the resulting solution is added, over about a 10-minute period, to the solution of the steroid, while maintaining the reaction mixture at about —55° C. The reaction mixture is allowed to stand at —55° C. for about one-half hour; a solution containing 250 mg. of sodium acetate in 3 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml.; petroleum ether is added to this solution, and the crystalline material which separates is recovered and dried to give approximately 90 mg. of 4-bromo-17α,21-dihydroxy-16α-methyl-pregnane-3,11,20-trione 21-acetate.

A mixture of 48 mg. of semicarbazide, 48 mg. of 4-bromo-17α,21-dihydroxy-16α-methyl-pregnane-3,11,20-trione 21-acetate and 0.6 ml. of ethanol is heated under reflux in contact with a nitrogen atmosphere for a period of about three days, and the reaction solution is evaporated to a small volume, diluted with water and the crystalline material recovered and purified by recrystallization from aqueous methanol to give 3,20-bis-semicarbazido-17α,21-dihydroxy-16α-methyl-4-pregnene-3,11,20-trione 21-acetate. Fifty milligrams of 3,20-bis-semicarbazido-17α,21-dihydroxy-16α-methyl-4-pregnene-3,11,20-trione 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give 3,20-bis-semicarbazido-17α,21-dihydroxy-16α-methyl-4-pregnene-3,11,20-trione.

A mixture of 60 mg. of 3,20-bis-semicarbazido-17α,21-dihydroxy-16α-methyl-4-pregnene-3,11,20-trione, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqeous methanol as the stationary phase and benzene-chlorofrom as the moving phase to give 17α,21-dihydroxy-16α-methyl-4-pregnene-3,11,20-trione.

A solution of 45 mg. of 3,20-bis-semicarbazido-17α,21-dihydroxy-16α-methyl-4-pregnene-3,11,20-trione 21-acetate, 17 mg. of sodium borohydride, 1 ml. of tetrahydrofuran and 0.3 ml. of water is maintained at reflux temperature for approximately one hour. The reaction solution is cooled to about 15° C., and the excess sodium borohydride decomposed by the addition of a solution of 27 mg. of glacial acetic acid in 0.2 ml. of water. The tetrahydrofuran is evaporated in vacuo, and the residual material is extracted with ethyl acetate. The ethyl acetate extracts are washed with a saturated salt solution, water, 5% aqueous sodium bicarbonate solution and again with water. The extracts are dried and the ethyl acetate evaporated in vacuo to give 3,20-bis-semicarbazido-11β,17α,21-trihydroxy-16α-methyl-4-pregnene-3,20-dione.

A mixture of 60 mg. of 3,20-bis-semicarbazido-11β,17α,21-trihydroxy-16α-methyl-4-pregnene-3,20-dione, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 11β,17α,21 - trihydroxy - 16α - methyl - 4 - pregnene - 3,20 - dione. The latter material is reacted with an excess of acetic anhydride in pyridine at room temperature for a period of about fifteen hours, and the crude acetylated product is recrystallized from ethyl acetate to give 11β,17α,21-trihydroxy16α-methyl-4-pregnene-3,20-dione 21-acetate.

To a cooled solution of 600 mg. of 11β,17α,21-trihydroxy - 16α - methyl - 4 - pregnene - 3,20 - dione 21-acetate in 5.0 ml. of dry pyridine is added 0.15 ml. of phosphorous oxychloride, and the mixture is allowed to stand at room temperature for a period of approximately 15 hours. The reaction solution is evaporated in vacuo at a temperature of about 20° C. to a volume of 2–3 ml. Seventeen milliliters of water is added slowly to the concentrated solution, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized from ethyl acetate-ether to give 17α,21 - dihydroxy - 16α - methyl - 4,9(11) - pregnadiene-3,20-dione 21-acetate. A suspension of 330 mg. of 17α,21 - dihydroxy - 16α - methyl - 4,9(11) - pregnadiene-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two and one-half hours during which time the solid material slowly dissolves. The resulting yellow solution is treaed with 1.0 ml. of allyl alcohol to discharge the color and decompose the remaining N-bromo-succinimide, and the resulting solution is evaporated to a small volume in vacuo. The concentrated solution is diluted wath water, and the aqueous mixture is extracted with ethyl acetate. The ethyl acetate extracts are washed, dried and evaporated to dryness, and the residual material is crystallized from ethyl acetate-ether to give 9α - bromo - 11β,17α,21 - trihydroxy - 16α - methyl - 4- pregnene-3,20-dione 21-acetate.

A solution of 210 mg. of 9α-bromo-11β,17α-21-trihydroxy - 16α - methyl - 4 - pregnene - 3,20 - dione 21 - acetate and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, evaporated to dryness in vacuo. The residual material is crystallized from ethyl acetate-ether to give 9β,11β-epoxy-17α,21-dihydroxy-16α-methyl-4-pregnene-3,20-dione 21-acetate. To a solution of 83 mg. of anhydrous hydrogen fluoride in 4.7 ml. of ice-cold alcohol-free chloroform is added an ice-cold solution of 416 mg. of 9β,11β-epoxy-17α,21-dihydroxy-16α-methyl-4-pregnene-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 9α-fluoro-11β,17α,21-trihydroxy-16α-methyl-4-pregnene-3,20-dione 21-acetate. Fifty milligrams of 9α - fluoro - 11β,17α,21 - trihydroxy - 16α - methyl-4-pregnene-3,20-dione 21-acetate is dissolved in a mixture of 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-11β,17α,-21-trihydroxy-16α-methyl-4-pregnene-3,20-dione.

A solution of 400 mg. of 9α-fluoro-11β,17α-21-trihydroxy-16α-methyl-4-pregnene-3,20-dione 21-acetate in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate-ether to give 9α-fluoro-17α,21-dihydroxy-16α-methyl-4-pregnene-3,11,20-trione 21-acetate. Fifty milligrams of 9α-fluoro-17α,21-dihydroxy-16α-methyl-4-pregnene-3,11,20-trione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-17α,21 - dihydroxy - 16α - methyl - 4 - pregnene - 3,11,20-trione.

To a solution of 110 mg. of 17α,21-dihydroxy-16α-methyl - 4 - pregnene-3,11,20-trione 21-acetate in 6 ml. t-butanol, 0.01 ml. glacial acetic acid and 0.03 ml. of acetic anhydride is added 70 mg. of selenious acid ($H_2SeO_3$). The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 17α,21-dihydroxy-16α-methyl-1,4-pregnadiene-3,11,20-trione 21-acetate; M.P. 208–212° C. Fifty milligrams of 17α,21-dihydroxy-16α-methyl-1,4-pregnadiene-3,11,20-trione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 17α,21-dihydroxy-16α-methyl-1,4-pregnadiene-3,11,20-trione.

To a solution of 100 mg. of 11β,17α,21-trihydroxy-16α-methyl-4-pregnene-3,20-dione 21-acetate in 6 ml. t-butanol, 0.01 ml. glacial acetic acid and 0.03 ml .of acetic anhydride is added 70 mg. of selenious acid. The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 11β,17α,21-trihydroxy-16α-methyl-1,4-pregnadiene-3,20-dione 21-acetate. Fifty milligrams of 11β,17α,21-trihydroxy-16α-methyl-1,4-pregnadiene-3,20-dione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 11β,17α,21-trihydroxy-16α-methyl-1,4-pregnadiene-3,20-dione.

To a solution of 110 mg. of 9α-fluoro-17α,21-dihydroxy-16α-methyl-4-pregnene-3,11,20-trione 21-acetate in 6 ml. t-butanol, 0.01 ml. glacial acetic acid and 0.03 ml. of acetic anhydride is added 70 mg. of selenious acid ($H_2SeO_3$). The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solution on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate ether to give 9α-fluoro-17α,21-dihydroxy-16α-methyl-1,4-pregnadiene-3,11,20-trione 21-acetate. Fifty milligrams of 9α-fluoro-17α,21-dihydroxy-16α-methyl-1,4-pregnadiene-3,11,20-trione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-17α,21-dihydroxy-16α-methyl-1,4-pregnadiene-3,11,20-trione.

To a solution of 100 mg. of 9α-fluoro-11β,17α,21-trihydroxy-16α-methyl-4-pregnene-3,20-dione 21-acetate in 6 ml. t-butanol, 0.01 ml. glacial acetic acid and 0.03 ml. of acetic anhydride is added 70 mg. of selenious acid. The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 9α-fluoro-11β,17α,21-trihydroxy-16α-methyl-1,4-pregnadiene-3,20-dione 21-acetate. Fifty milligrams of 9α-fluoro-11β,17α,21-trihydroxy-16α-methyl-1,4-pregnadiene-3,20-dione 21 acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give a 9α-fluoro-11β,17α,21-trihydroxy-16α-methyl-1,4-pregnadiene-3,20-dione.

In a 500 ml. 3-neck flask equipped with condenser, dropping funnel and nitrogen inlet are placed 20 g. of potassium hydroxide in 90 ml. of water, 100 ml. of methanol and 100 ml. of ether. A solution of 10 g. of N-methyl-N-nitroso-tosylamide in 50 ml. of ether is placed in the dropping funnel.

Diazomethane is generated by warming the generation flask to 40–45° C. and cautiously adding the N-methyl-N-nitrosotosylamide ether from the dropping funnel. Nitrogen is utilized to sweep the diazomethane into a solution of 20 g. of 3α-acetoxy-16-pregnene-11,20-dione in 100 ml. of tetrahydrofuran and 120 ml. of ether. The process is continued until the steroid solution remains yellow for several hours. The product, 3α-acetoxy-16α,17α-methyleneazo-pregnane-11,20-dione largely precipitates from the reaction mixture. After 16 hours, the mixture is filtered, washed with ether and dried in air. Yield about 14 grams, M.P. 186–190° C.

37.4 g. of 3α-acetoxy-16α,17α-methyleneazo-pregnane-11,20-dione is placed in a 500 ml. round-bottom flask and heated by an oil bath in vacuo (pressure 0.6 mm.). A manometer and 12-liter surge flask are in the line between the reaction flask and pump trap. When the bath temperature reaches 180° C. the 3α-acetoxy-16α,17α-methyleneazo-pregnane-11,20-dione begins to melt with evolution of nitrogen. The maximum pressure reached is 83 mm. After 10 minutes at 180–182° C. the melt is cooled. It has $$\lambda_{max.}^{CH_3OH} 249$$

E percent 191, and is taken up in about 150 ml. of acetone, filtered through diatomaceous earth, concentrated to about 100 ml., and ether is slowly added to the boiling solution until crystallization occurs. These crystals of 3α-acetoxy-16-methyl-16-pregnene-11,20-dione weigh about 19.0 g., M.P. 165–168° C.

A solution of 20.0 g. of 3α-acetoxy-16-methyl-16-pregnene-11,20-dione dissolved in 600 ml. of methanol, is cooled to 18° C., and 80 ml. of 30% hydrogen peroxide followed by 80 ml. of 2.5 N sodium hydroxide are added. Considerable material precipitates from solution, but all redissolves on stirring the reaction mixture at 25–30° C. for 40 minutes. The solution is kept at 15°–20° C. for 18 hours at which time the ultraviolet maximum at 249 has completely disappeared. Then 600 ml. of saturated salt water is slowly added, the crystalline precipitate is filtered, washed with water, and dried in air and in vacuum. The 16α,17α-epoxy-3α-hydroxy-16β-methyl-pregnane-11,20-dione thus formed weighs about 17 g.; M.P. 176–177° C.; hexagonal prisms, M.P. 178–180° C., from acetone-ether.

To a solution of 2.69 g. of 16α,17α-epoxy-3α-hydroxy-16β-methyl-pregnane-11,20-dione in 55 ml. dioxane is added 2.7 ml. of 2 M aqueous perchloric acid. The clear solution is kept at 25–30° C. for 65 hours. Cold water (175 ml.) is added, the slurry chilled to 8° C. and filtered after 30 minutes. The precipitate, containing a mixture of 3α,17α-dihydroxy-16-methyl-15-pregnene-11,20-dione and 3α,17α-dihydroxy-16-methylene-pregnane-11,20-dione is washed with water, and dried in air and finally at 50° C. in vacuum. Yield: approximately 2 g.; M.P. sintering at about 150° C., melting at 158–167° C. The relative proportion of 3α,17α-dihydroxy-16-methyl-15-pregnene-11,20-dione and 3α,17α-dihydroxy-16-methylene-pregnane-11,20-dione is estimated to be of the order of 1:1.

A solution 3.05 g. (8.47 millimols) of the olefin mixture of 3α,17α-dihydroxy-16-methylene-pregnane-11,20-dione in 80 ml. of methanol is reduced in hydrogen at 1 atmosphere and 25° C. in the presence of 2.0 g. of 25% palladium-calcium carbonate catalyst. Modification of the hydrogen conditions, pH, solvent, catalyst, etc. alters the isomer ratio significantly. Uptake of the calculated amount of hydrogen is complete in 45 minutes. The mixture is stirred an additional 30 minutes and filtered through diatomaceous earth. The colorless filtrate is taken to dryness and crystallized from ether; a mixture of 3α,17α-dihydroxy-16α-methyl-pregnane-11,20-dione and 3α,17α-dihydroxy-16β-methyl-pregnane-11,20-dione is obtained; weight about 3 g., sintering at 150° C. melting at 166–182° C.

$$\lambda_{max}^{CHCl_3} 2.79, 2.95, 5.87\mu$$

The product consists of 3α,17α-dihydroxy-16α-methyl-pregnane-11,20-dione and 3α,17α-dihydroxy-16β-methyl-pregnane-11,20-dione in the ratio ca. 7:3 as determined by the amounts of end product isolated below.

One gram of this hydrogenation product containing 3α,17α-dihydroxy-16α-methyl-pregnane-11,20-dione and 3α,17α-dihydroxy-16β-methyl-pregnane-11,20-dione, is chromatographed on 100 g. of activated magnesium silicate. The 100% chloroform eluates give 3α,17α-dihydroxy-16α-methyl-pregnane-11,20-dione, M.P. 188–191° C. The 5% methanol-chloroform eluates give 3α,17α-dihydroxy-16β-methyl-pregnane-11,20-dione, hexagonal plates from benzene-ethyl-acetate; M.P. 192–197° C.

A solution of 3.50 g. (9.7 millimols) of 3α,17α-dihydroxy-16β-methyl-pregnane-11,20-dione in 40 ml. of chloroform is warmed to 40–45° C. A solution of 1.76 g. (11 millimols) of bromine in 25 ml. of chloroform is added dropwise to the stirred solution such that the color is not darker than pale yellow (ca. 2 drops/sec., total time—1 hour). The nearly colorless solution is cooled to 20° C. and 200 ml. of ether is added. The mixture is extracted with excess cold 5% potassium bicarbonate solution, sodium bisulfite solution, and water, and dried over magnesium sulfate. The colorless residue after removal of solvent, 21-bromo-3α,17α-dihydroxy-16β-methyl-pregnane-11,20-dione (about 4 grams) gives a positive tetrazolium test.

To 4.30 g. of 21-bromo-3α,17α-dihydroxy-16β-methyl-pregnane-11,20-dione in 90 ml. of acetone and 0.01 ml. of acetic acid is added 4.83 g. of anhydrous potassium acetate and 3.85 g. of potassium iodide. The stirred mixture is refluxed for 18 hours and concentrated on the water pump to a small volume. Water is added, the product extracted into ethyl acetate, and the organic extract dried over magnesium sulfate to give about 4 grams of a colorless foam that partly crystallizes from acetone-ether to give 3α,17α,21-trihydroxy-16β-methyl-pregnane-11,20-dione 21-acetate.

To a solution of 3α,17α,21-trihydroxy-16β-methyl-pregnane-11,20-dione 21-acetate (4.9 g.) in 100 ml. t-butanol and 20 ml. of water cooled to 10–15° C., is added 3.5 g. N-bromo-succinimide. The suspension is stirred at 15° C. until all the N-bromosuccinimide has dissolved (90 minutes). The reaction mixture is kept at 2° C. for about sixteen hours and at 25° C. for 2 hours. Sodium sulfite solution is added to destroy bromine and the mixture concentrated on the water pump to a low volume. A granular precipitate forms; water is added, the precipitate filtered and washed with water; chromatography on neutral alumina and elution with mixtures of chloroform and benzene gives 17α,21-dihydroxy-16β-methyl-pregnane-3,11,20-trione 21-acetate, M.P. 210–213° C.

To a stirred solution of 585 mg. of 17α,21-dihydroxy-16β-methyl-pregnane-3,11,20-trione 21-acetate in 10 ml. of acetic acid and 8 ml. of chloroform kept at −10° C. is added slowly 230 mg. of bromine in 6 ml. of chloroform. After addition is complete, 1.2 g. of sodium acetate in 7 ml. of cold water is added and the mixture is extracted with chloroform. The chloroform extract is washed with dilute potassium bicarbonate, water and dried over sodium sulfate. The residue is triturated with ether to give 480 mg. of crystalline 4-bromo-17α,21-dihydroxy-16β-methyl-pregnane-3,11,20-trione 21-acetate, M.P. 165–170° C. dec.

To 583 mg. of 4-bromo-17α,21-dihydroxy-16β-methyl-pregnane-3,11,20-trione 21-acetate in 20 ml. of acetonitrile under nitrogen is added a slurry of 600 mg. of semicarbazide hydrochloride and 410 mg. sodium bicarbonate in 4 ml. of water. After 2 hours, the acetonitrile is removed in vacuo, water is added and about 540 mg. of crystalline 3-semicarbazone of 17α,21-dihydroxy-16β-methyl-4-pregnene-3,11,20-trione 21-acetate filtered, washed with water and dried.

540 mg. of the 3-semicarbazone of 17α,21-dihydroxy-16β-methyl-4-pregnene-3,11,20-trione 21-acetate is dissolved in 20 ml. of acetic acid, 1.5 ml. of pyruvic acid and 5 ml. of water. After 18 hours at 25° C., water is added and the mixture extracted with chloroform. The chloroform extract is washed with aqueous potassium bicarbonate, water and dried over sodium sulfate. Removal of solvent gives crude 17α,21-dihydroxy-16β-methyl-4-pregnene-3,11,20-trione 21-acetate which is purified by chromatography on neutral alumina and crystallization from acetone-ether (hexagonal plates). The pure material has M.P. 226–232° C. 100 mg. of 17α,21-dihydroxy-16β-methyl-4-pregnene-3,11,20-trione 21-acetate in 3 ml. of methanol is treated with 0.1 g. of potassium bicarbonate in 1 ml. of water, the methanol is evaporated in vacuo, and the residual material is extracted with ethyl acetate. Evaporation of the ethyl acetate solution gives crystalline 17α,21-dihydroxy-16β-methyl-4-pregnene-3,11,20-trione.

To a stirred solution of 500 mg. of 17α,21-dihydroxy-16β-methyl-4-pregnene-3,11,20-trione 21-acetate in 12.5 ml. of methanol and 3 ml. of dimethylformamide kept under nitrogen is added a slurry of 680 mg. of semicarbazide hydrochloride and 370 mg. of sodium bicarbonate in 1 ml. of water. The stirred mixture is refluxed 3½ hours and maintained at 45° C. for 17 hours. It is then cooled to 20° C. and 50 ml. of 50% saturated aqueous sodium chloride is added. After 2 hours at 0° C. the precipitate of 3,20-bis-semicarbazido-17α,21-dihydroxy-16β-methyl-4-pregnene-3,11,20-trione 21-acetate is filtered, washed with water until free of chloride ion and dried in air.

To a stirred solution of 600 mg. of 3,20-bis-semicarbazido-17α,21-dihydroxy-16β-methyl-4-pregnene-3,11,20-trione 21-acetate in 30 ml. of tetrahydrofuran and 11 ml. of water under nitrogen is added 200 mg. powdered sodium borohydride. The stirred suspension is refluxed 45 minutes and then cooled to 15° C. Aqueous acetic acid (3 ml. of 30%) is added cautiously and most of the tetrahydrofuran is removed in vacuum. Addition of 5 ml. of methanol and 5 ml. of water induces the product to crystallize. Following addition of 10 ml. of a saturated sodium chloride solution and aging at 0° C. the product 3,20 - bis - semicarbazido - 11β,17α,21 - trihydroxy - 16β-methyl-4-pregnene-3,20-dione is filtered, washed with water, and dried in air.

To a solution of 510 mg. of reduced 3,20-bis-semicarbazido - 11β,17α,21 - trihydroxy - 16β - methyl - 4 - pregnene-3,20-dione in 5 ml. of acetic acid is added 1.20 ml. of water and 0.50 ml. of pyruvic acid. The solution is kept at 25° C. for eighteen hours. Water (20 ml.) is added, and the mixture is extracted thoroughly with chloroform. The chloroform extract is dried over magnesium sulfate and taken to dryness. The residue is crystallized from acetone-ether to give pure 11β,17α,21-trihydroxy-16β-methyl-4-pregnene-3,20-dione. A solution of 100 mg. of 11β,17α,21-trihydroxy-16β-methyl-4-pregnene-3,20-dione in 1.0 ml. of pyridine and 0.5 ml. of acetic anhydride is prepared. After 18 hours at 25° C., the solution is taken to dryness in vacuo and the solid residue purified by crystallization from acetone-ether to give 11β,17α,-21-trihydroxy-16β-methyl-4-pregnene-3,20-dione 21-acetate.

A solution of 400 mg. of 11β,17α,21-trihydroxy-16β-methyl-4-pregnene-3,20-dione 21-acetate in 2.0 ml. dimethyl formamide, 0.8 ml. of pyridine and 0.4 ml. of methanesulfonyl chloride is kept at 75° C. for one hour. The mixture is cooled, water added, and the precipitate filtered, washed with water and dried in air. The desired 17α,21 - dihydroxy - 16β - methyl - 4,9(11) - pregnadiene-3,20-dione 21-acetate is purified by chromatography on alumina (20 g.) and elution of the column with benzene. Crystallization of material eluted by benzene gives pure 17α,21 - dihydroxy - 16β - methyl - 4,9(11) - pregnadiene-3,20-dione 21-acetate.

To a mixture of 620 mg. of 17α,21-dihydroxy-16β-methyl-4,9(11)-pregnadiene-3,20-dione 21-acetate and 330 mg. of N-bromosuccinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and crystalline bromohydrin, 9α-bromo-11β,17α,21 - trihydroxy - 16β - methyl - 4 - pregnene-3,20-dione 21-acetate, is filtered, washed with water, and dried in air.

To a stirred solution of 100 mg. of the 9α-bromo-11β,-17α,21-trihydroxy-16β-methyl-4-pregnene-3,20-dione 21-acetate in 3 ml. of tetrahydrofuran and 1 ml. of methanol under nitrogen is added 1.02 ml. of 0.215 N methanolic sodium methoxide. After 10 minutes at 25° C., 0.2 ml. of acetic acid is added and the methanol removed in vacuo. The residue is acetylated with 1.00 ml. of pyridine and 0.5 ml. of acetic anhydride at 60° C. for 70 minutes. The mixture is taken to dryness in vacuo, water added, and the product extracted into chloroform. The residue is crystallized from ether-acetone to give pure 9β,11β - epoxy - 17α,21 - dihydroxy - 16β - methyl - 4-pregnene-3,20-dione 21-acetate.

To a solution of 200 mg. of 9β,11β-epoxy-17α,21-dihydroxy-16β-methyl-4-pregnene-3,20-dione 21-acetate in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase washed with water and dried over magnesium sulfate. The residue on crystallization from acetone-ether gives pure 9α-fluoro-11β,17α,21-trihydroxy-16β-methyl-4-pregnene-3,20-dione 21-acetate.

To a stirred solution of 110 mg. of 9α-fluoro-11β,17α,21-trihydroxy-16β-methyl-4-pregnene-3,20-dione 21-acetate in 5 ml. of methanol under nitrogen at 25° C. is added 1.00 ml. of 0.26 M methanolic sodium methoxide. After 15 minutes, 0.2 ml. of acetic acid in 1 ml. of water is added and the mixture concentrated nearly to dryness. The residue is taken up in ethyl acetate and the ethyl acetate solution is washed with water, dried over magnesium sulfate, and concentrated to dryness. Crystallization of the residue from ethyl acetate gives pure 9α-fluoro-11β,17α,21-trihydroxy-16β-methyl-4-pregnene-3,20-dione.

To a solution of 100 mg. of 9β,11β-expoy-17α,21-dihydroxy-16β-methyl-4-pregnene-3,20-dione 21-acetate in 4 ml. of chloroform is added 5 ml. of concentrated hydrochloric acid. The two-phase mixture is stirred at 25° C. for 1 hour. Addition of water and chloroform extraction gives a crude crystalline product which is partly deacetylated. Treatment with 1 ml. of pyridine and 0.5 ml. of acetic anhydride at 25° C. for 18 hours followed by concentration in vacuo and crystallization of the residue from acetone-ether affords pure 9α-chloro-11β,17α,21-trihydroxy - 16β - methyl-4-pregnene-3,20-dione 21-acetate. This compound is hydrolyzed by treatment with potassium bicarbonate in aqueous methanol to give 9α-chloro-11β,17α,21-trihydroxy-16β-methyl-4-pregnene-3,20-dione.

To a stirred solution of 682 mg. of 17α,21-dihydroxy-16β-methyl-pregnane-3,11,20-trione 21-acetate in 20 ml. of chloroform and 2.25 ml. of acetic acid maintained at −20° C. is added dropwise one-half of a solution of 540 mg. of bromine in 2 ml. of chloroform and 3 ml. of acetic acid. The mixture is warmed to 0° C. and the remainder of the bromine added. Sodium acetate (0.4 g.) in 2 ml. of water is added followed by 20 mg. of sodium sulfite. The mixture is concentrated in vacuo to remove the chloroform and 20 ml. of water is added. The white powdery precipitate of 2,4-dibromo-17α,21-dihydroxy-16β-methyl-pregnane-3,11,20-trione 21-acetate is filtered, washed with water and dried in air. Yield: 920 mg., M.P. 122–130° C. dec.

To a solution under nitrogen of 900 mg. of the 2,4-dibromo - 17α,21 - dihydroxy-16β-methyl-pregnane-3,11,20-trione 21-acetate in 5 ml. dimethyl formamide is added 200 mg. of sodium bromide. After 1 hour at 25° C., 1 ml. of dimethylaniline is added and the mixture maintained at 135° C. for 2½ hours. The mixture is cooled, added dropwise to dilute hydrochloric acid, and solid crude product filtered, washed with dilute hydrochloric acid, water and dried in air. Treatment with charcoal, followed by crystallization from acetone gives 17α,21-dihydroxy - 16β - methyl-1,4-pregnadiene-3,11,20-trione 21-acetate, M.P. 230°–233° C.

1.0 g. of 17α,21-dihydroxy-16β-methyl-1,4-pregnadiene-3,11,20-trione 21-acetate in 30 ml. of methanol is treated with 1 g. of potassium bicarbonate in 10 ml. of water under nitrogen at reflux temperature for 7 minutes. The mixture is cooled, neutralized with 1 ml. of acetic acid in 10 ml. of water, the methanol removed in vacuo and the product extracted into ethyl acetate. Removal of the ethyl acetate gives crystals (about 0.9 g.) of the desired 17α,21 - dihydroxy - 16β-methyl-1,4-pregnadiene-3,11,20-trione; M.P. 195°–200° C.

To 100 mg. 11β,17α,21 - trihydroxy - 16β - methyl-4-pregnene-3,20-dione 21-acetate in 5 ml. of acetic acid is added 50 mg. of selenium dioxide. The mixture is refluxed under nitrogen 18 hours, 50 mg. of selenium dioxide is added and the mixture refluxed an additional 24 hours. The mixture is filtered, and the filtrate taken to dryness. The residue is taken up in ethyl acetate and washed successively with aqueous sodium bicarbonate, ammonium sulfide, dilute ammonia water, water, dilute hydrochloric acid and water and dried over magnesium sulfate. It is then treated with activated charcoal and concentrated to dryness. Crystallization of the residue from acetone-ether gives pure 11β,17α,21-trihydroxy-16β-methyl-1,4-pregnadiene-3,20-dione 21-acetate. 100 mg. of 11β,17α,21 - trihydroxy - 16β - methyl-1,4-pregnadiene-3,20-dione 21-acetate in 3 ml. of methanol is treated with 0.1 g. of potassium bicarbonate in 10 ml. of water under nitrogen at reflux temperature for 7 minutes. The mixture is cooled, neutralized with 0.1 ml. of acetic acid in 1 ml. of water, the methanol is evaporated in vacuo and the residual material is extracted with ethyl acetate. Evaporation of the ethyl acetate gives crystalline 11β,17α,21-trihydroxy-16β-methyl-1,4-pregnadiene-3,20-dione.

In a similar manner, 100 mg. of 9α-fluoro-11β,17α,21-trihydroxy-16β-methyl-4-pregnene-3,20-dione 21-acetate is treated with selenium dioxide to produce the corresponding 9α - fluoro - 11β,17α,21 - trihydroxy - 16β - methyl-1,4-pregnadiene-3,20-dione 21-acetate. This compound is hydrolyzed with potassium bicarbonate in aqueous methanol in accordance with the procedure described in the preceding paragraph to give 9α-fluoro-11β,17α,21-trihydroxy - 16β - methyl - 1,4 - pregnadiene -3,20 - dione. Similarly, 100 mg. of 9α-chloro-11β,17α,21-trihydroxy-16β-methyl-4-pregnene-3,20-dione 21-acetate is treated with selenium dioxide to produce 9α-chloro-11β,17α,21-trihydroxy - 16β - methyl - 1,4 - pregnadiene - 3,20 - dione 21-acetate, which is hydrolyzed by treatment with potassium bicarbonate in aqueous methanol to give 9α-chloro-11β,17α,21 - trihydroxy - 16β - methyl - 1,4 - pregnadiene-3,20 dione.

A solution of 100 mg. of 9α-fluoro-11β,17α,21-trihydroxy - 16β - methyl - 1,4 - pregnadiene - 3,20 - dione 21-acetate in 1 ml. of pyridine is added to the complex formed by the addition of 100 mg. of chromium trioxide to 1 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulphuric acid at about 0° C., and then with water until neutral. The organic solvent layer is then dried, the solvents are evaporated therefrom in vacuo, and the residual crystalline material is purified by crystallization from ethyl acetate-ether to give 9α-fluoro-1α,21-dihydroxy - 16β - methyl - 1,4 - pregnadiene - 3,11,20-trione 21-acetate. This compound is hydrolyzed by treatment with potassium bicarbonate in aqueous methanol to form 9α - fluoro - 17α,21 - dihydroxy - 16β - methyl - 1,4 - pregnadiene-3,11-20-trione.

In a similar manner, 9α-chloro-11β,17α,21-trihydroxy-16β-methyl-1,4-pregnadiene-3,20-dione 21-acetate is reacted with chromium trioxide-pyridine complex to give 9α - chloro - 17α,21 - dihydroxy - 16β - methyl - 1,4-pregnadiene-3,11,20-trione 21-acetate, which is hydrolyzed by treatment with potassium bicarbonate in aqueous methanol to give 9α-chloro-17α,21-dihydroxy-16β-methyl-1,4-pregnadiene-3,11,20-trione.

Similarly, 9α - fluoro - 11β,17α,21 - trihydroxy - 16β-methyl-4-pregnene-3,20-dione 21-acetate is reacted with chromium trioxide-pyridine complex to form 9α-fluoro-17α,21 - dihydroxy - 16β - methyl - 4 - pregnene - 3,11,20-trione 21-acetate which is hydrolyzed by treatment with potassium bicarbonate in aqueous methanol to produce 9α - fluoro - 17α,21 - dihydroxy - 16β - methyl - 4 - pregnene-3,11,20-trione.

Similarly, 9α - chloro - 11β,17α,21 - trihydroxy - 16β-methyl-4-pregnene-3,20-dione 21-acetate is reacted with chromium trioxide-pyridine complex to form 9α-chloro-17α,21 - dihydroxy - 16β - methyl - 4 - pregnene - 3,11,20-trione 21-acetate which is hydrolyzed by treatment with potassium bicarbonate in aqueous methanol to produce 9α - chloro - 17α,21 - dihydroxy - 16β - methyl - 4 - pregnene-3,11,20-trione.

Various changes and modifications may be made in carrying out the present invention without departing from the spirit and scope thereof. Insofar as these changes and modifications are within the purview of the annexed claims, they are considered as part of our invention.

We claim:

1. Ring A unsaturated 17α-hydroxy-11-oxygenated-20-keto-steroids of the pregnane series having methyl substituents attached to both the C–6 and C–16 carbon atoms.

2. Ring A unsaturated 17α-hydroxy-11-oxygenated-20-keto-steroids of the pregnane series having α-methyl substituents attached to both the C–6 and C–16 carbon atoms.

No references cited.